(12) United States Patent
Dolinar et al.

(10) Patent No.: US 8,935,057 B2
(45) Date of Patent: Jan. 13, 2015

(54) ROADWAY MARK DATA ACQUISITION AND ANALYSIS APPARATUS, SYSTEMS, AND METHODS

(71) Applicant: LimnTech LLC, Souderton, PA (US)

(72) Inventors: Douglas D. Dolinar, Doylestown, PA (US); William R. Haller, Bethlehem, PA (US)

(73) Assignee: LimnTech LLC, Souderton, PA (US)

( * ) Notice: Subject to any disclaimer, the term of this patent is extended or adjusted under 35 U.S.C. 154(b) by 0 days.

(21) Appl. No.: 13/741,573

(22) Filed: Jan. 15, 2013

(65) Prior Publication Data

US 2013/0190981 A1 Jul. 25, 2013

Related U.S. Application Data

(63) Continuation-in-part of application No. 13/728,062, filed on Dec. 27, 2012, which is a continuation-in-part of application No. 13/351,829, filed on Jan. 17, 2012, now Pat. No. 8,467,968.

(51) Int. Cl.
*B60R 22/00* (2006.01)

(52) U.S. Cl.
USPC ............ 701/49; 701/41; 701/469; 404/93; 427/137

(58) Field of Classification Search
USPC .......... 701/534, 41, 439, 446, 448, 533, 469, 701/49; 455/66.1; 382/244; 404/75, 93; 427/256, 427.2, 137; 348/148
See application file for complete search history.

(56) References Cited

U.S. PATENT DOCUMENTS 4,219,092 A * 8/1980 Richter ............................ 378/45
4,460,127 A * 7/1984 Hofmann ..................... 239/126

(Continued)

FOREIGN PATENT DOCUMENTS

| CA | 2151672 A | * | 12/1995 |
| EP | 688802 B1 | * | 8/2000 |
| JP | 02009223220 A | * | 10/2009 |
| JP | 02009223817 A | * | 10/2009 |
| JP | 02009258651 A | * | 11/2009 |
| JP | 02009259215 A | * | 11/2009 |
| JP | 02010175756 A | * | 8/2010 |

OTHER PUBLICATIONS

GeoLANMAR: geo assisted landmark routing for scalable, group motion wireless ad hoc networks; Zhou, B.; De Rango, F.; Gerla, M.; Marano, S.; Vehicular Technology Conference, 2005. VTC 2005-Spring. 2005 IEEE 61st ; vol. 4; Digital Object Identifier: 10.1109/VETECS.2005.1543769; Publication Year: 2005 , pp. 2420-2424 vol. 4.*

(Continued)

*Primary Examiner* — Cuong H Nguyen
(74) *Attorney, Agent, or Firm* — Stradley Ronon Stevens & Young, LLP

(57) ABSTRACT

An apparatus, system, and method for determining characteristics of a roadway mark at a remote location. The system includes a vehicle having at least one imager for producing image data containing at least one actual roadway mark evident on a roadway surface. A GPS antenna is mounted on the vehicle. A GPS receiver is responsive to the GPS antenna for determining a GPS location of the GPS antenna. An apparatus responsive to the imager and the GPS receiver determines a GPS location of the roadway mark and filters and compresses the image data, the filtered and compressed image data containing the image data of the roadway mark. An apparatus communicates the filtered and compressed image data to the remote location for analyzing the roadway mark characteristics from the image data.

32 Claims, 24 Drawing Sheets

(56) References Cited

U.S. PATENT DOCUMENTS

| | | | |
|---|---|---|---|
| 4,832,331 | A | 5/1989 | Brandli |
| 5,220,876 | A | 6/1993 | Monson et al. |
| 5,296,256 | A * | 3/1994 | Hartman .................... 427/10 |
| 5,375,059 | A | 12/1994 | Kyrtsos et al. |
| 5,529,433 | A | 6/1996 | Huynh et al. |
| 5,540,516 | A | 7/1996 | Nicodemo et al. |
| 5,549,412 | A | 8/1996 | Malone |
| 5,599,133 | A | 2/1997 | Costello et al. |
| 5,653,389 | A | 8/1997 | Henderson et al. |
| 5,746,539 | A | 5/1998 | Mara |
| 5,771,169 | A | 6/1998 | Wendte |
| 5,836,398 | A | 11/1998 | White |
| 5,838,277 | A | 11/1998 | Loomis et al. |
| 5,857,066 | A | 1/1999 | Wyche et al. |
| 5,995,902 | A | 11/1999 | Monson |
| 6,038,346 | A * | 3/2000 | Ratnakar .................... 382/239 |
| 6,074,693 | A * | 6/2000 | Manning .................... 427/137 |
| 6,115,481 | A | 9/2000 | Wiens |
| 6,299,934 | B1 * | 10/2001 | Manning .................... 427/137 |
| 6,330,503 | B1 | 12/2001 | Sharp et al. |
| 6,480,115 | B2 * | 11/2002 | Ghahramani ............. 340/815.4 |
| 6,723,375 | B2 | 4/2004 | Zeck et al. |
| 6,729,706 | B1 | 5/2004 | Patton et al. |
| 6,951,375 | B2 | 10/2005 | Patton et al. |
| 7,029,199 | B2 | 4/2006 | Mayfield et al. |
| 7,370,818 | B2 | 5/2008 | Ward et al. |
| 7,552,008 | B2 | 6/2009 | Newstrom et al. |
| 7,640,105 | B2 | 12/2009 | Nielsen et al. |
| 7,698,032 | B2 | 4/2010 | Matsumoto et al. |
| 7,832,762 | B2 | 11/2010 | Breed |
| 7,866,917 | B2 | 1/2011 | Malit |
| 7,899,611 | B2 | 3/2011 | Downs et al. |
| 7,970,529 | B2 | 6/2011 | Mori et al. |
| 7,981,462 | B2 | 7/2011 | Bustgens |
| 8,190,362 | B2 | 5/2012 | Barker et al. |
| 8,467,968 | B1 * | 6/2013 | Dolinar et al. ............. 701/534 |
| 2002/0001413 | A1 * | 1/2002 | Ratnakar .................... 382/240 |
| 2002/0044087 | A1 * | 4/2002 | Krasner ................. 342/357.09 |
| 2003/0095155 | A1 * | 5/2003 | Johnson .................... 345/864 |
| 2003/0139879 | A1 * | 7/2003 | Krasner .................... 701/213 |
| 2004/0124260 | A1 | 7/2004 | Ward et al. |
| 2007/0128899 | A1 | 6/2007 | Mayer |
| 2007/0208497 | A1 | 9/2007 | Downs et al. |
| 2008/0046174 | A1 | 2/2008 | Johnson |
| 2008/0177994 | A1 * | 7/2008 | Mayer .............................. 713/2 |
| 2008/0178431 | A1 * | 7/2008 | Schmitz et al. ............. 19/106 R |
| 2008/0203187 | A1 | 8/2008 | Ward et al. |
| 2009/0118994 | A1 | 5/2009 | Mori et al. |
| 2010/0049431 | A1 * | 2/2010 | Zetune .................... 701/200 |
| 2010/0104199 | A1 | 4/2010 | Zhang et al. |
| 2010/0185382 | A1 | 7/2010 | Barker et al. |
| 2010/0256912 | A1 | 10/2010 | Nielsen et al. |
| 2010/0257029 | A1 | 10/2010 | Nielsen et al. |
| 2010/0259609 | A1 | 10/2010 | Takahashi |
| 2010/0262470 | A1 | 10/2010 | Nielsen et al. |
| 2010/0263591 | A1 | 10/2010 | Nielsen et al. |
| 2010/0295668 | A1 | 11/2010 | Kataoka |
| 2011/0039021 | A1 * | 2/2011 | Persson et al. ............. 427/137 |
| 2011/0128403 | A1 * | 6/2011 | Easwar et al. ............. 348/222.1 |
| 2012/0054028 | A1 * | 3/2012 | Tengler et al. ............. 705/14.49 |
| 2012/0072080 | A1 * | 3/2012 | Jeromin et al. ............. 701/49 |
| 2012/0098657 | A1 | 4/2012 | Bogatine |
| 2012/0113244 | A1 * | 5/2012 | Nielsen et al. ............. 348/82 |

OTHER PUBLICATIONS

A comparative study of location aided routing protocols for MANET; Hnatyshin, V.; Ahmed, M.; Cocco, R.; Urbano, D.; Wireless Days (WD), 2011 IFIP; Digital Object Identifier: 10.1109/WD.2011.6098169 ; Publication Year: 2011 , pp. 1-3.*

Click4BuildingID@NTU: Click for Building Identification with GPS-enabled Camera Cell Phone; Chai Kiat Yeo; Liang-Tien Chia; Tat Jen Cham; Rajon, D.; Multimedia and Expo, 2007 IEEE International Conference on; Digital Object Identifier: 10.1109/ICME.2007.4284836; Publication Year: 2007 , pp. 1059-1062.*

Implementation of GPS for location tracking; Ariffin, A.A.B.; Aziz, N.H.A.; Othman, K.A.; Control and System Graduate Research Colloquium (ICSGRC), 2011 IEEE, Digital Object Identifier: 10.1109/ICSGRC.2011.5991833; Publication Year: 2011 , pp. 77-81.*

Map-based lane identification and prediction for autonomous vehicles; Martinez, Leonardo ; Paulik, Mark ; Krishnan, Mohan ; Zeino, Eyad; Electro/Information Technology (EIT), 2014 IEEE International Conference on; DOI: 10.1109/EIT.2014.6871806 Publication Year: 2014 , pp. 448-453.*

Mapping and localization using GPS, lane markings and proprioceptive sensors; Tao, Z. ; Bonnifait, P. ; Fremont, V. ; Ibanez-Guzman, J.; Intelligent Robots and Systems (IROS), 2013 IEEE/RSJ International Conference on; DOI: 10.1109/IROS.2013.6696383; Publication Year: 2013 , pp. 406-412.*

Stop-line detection and localization method for intersection scenarios; Marita, T. ; Negru, M. ; Danescu, R. ; Nedevschi, S. Intelligent Computer Communication and Processing (ICCP), 2011 IEEE International Conference on; DOI: 10.1109/ICCP.2011.6047883; Publication Year: 2011 , pp. 293-298.*

Light-weight localization for vehicles using road markings; Ranganathan, A. ; Ilstrup, D. ; Tao Wu; Intelligent Robots and Systems (IROS), 2013 IEEE/RSJ International Conference on; DOI: 10.1109/IROS.2013.6696460; Publication Year: 2013 , pp. 921-927.*

Performance analysis of a shipborne gyrocompass with a multi-antenna GPS system; Lu, G.,; Lachapelle, G.; Cannon, M.E.; Vogel, B.; Position Location and Navigation Symposium, 1994., IEEE; Digital Object Identifier: 10.1109/PLANS, 1994.303334; Publication Year: 1994, pp. 337-343.

A Comparative Study of Location Aided Routing Protocols for MANET; Hnatyshin, V. et al.; Wireless Days (WD) 2011 IFIP; Digital Object Identifier; Publication Year 2011; pp. 1-3.

Click4BuildingID@NTU: Click for Building Identification with GPS-enabled Camera Cell Phone; Chai Kiat Yeo; Liang-Tien Chia; Tat Jen Cham; Rajon, D.; Multimedia and Expo, 2007 IEEE International Conference on; Digital Object Identifier: 10.1109/ICME.2007.4284836; Publication Year: 2007, pp. 1059-1062.

GeoLANMAR: Geo Assisted Landmark Routing for Scalable, Troup Motion Wireless Ad Hoc Networks; Zhou B. et al.; Vehicular Technology Conference 2005; 2005 IEEE 61st; vol. 4; Digital Object Identifier; Publication Year 2005; pp. 2420-2424 vol. 4.

Implementation of GPS for Location Tracking; Ariffin et al.; Control and System Graduate Research Colloquium (ICSGRC), 2011 IEEE; Digital Object Identifier; 10.1109/ICSGRC.2011.5991833; Publication Year 2011; pp. 77-81.

International Search Report issued May 9, 2013 for international application No. PCT/US2013/021684.

GPS Multipath Mitigation for Urban Area Using Omnidirectional Infrared Camera; Meguro, J.; Murata, T.; Takiguchi, J.; Amano, Y.; Hashizume, T.; Intelligent Transportation Systems, IEEE Transactions on; vol. 10, Issue 1; Digital Object Identifier: 10.1109/TITS.2008.2011688; Publication Year 2009; pp. 22-30.

Lane detection with roadside structure using on-board monocular camera; Watanabe, A.; Naito, T.; Ninomiya, Y.; Intelligent Vehicles Symposium, 2009 IEEE; Digital Object Indentifier: 10.1109/IVS.2009.5164276; Publication Year 2009; pp. 191-196.

Supporting Drivers in Keeping Safe Speed and Safe Distance: The SASPENCE Subproject Within the European Framework Frogramme 6 Integrating Project PReVENT; Bertolazzi, E. et al.; Intelligent Transportation Systems, IEEE Trans. on; vol. 11, Issue 3; Digital Object ID: 10.1109/TITS.2009.2035925; Pub. Yr. 2010; pp. 525-538.

* cited by examiner

ROADWAY MARK DATA ACQUISITION AND ANALYSIS APPARATUS, SYSTEMS, AND METHODS

CROSS REFERENCE TO RELATED APPLICATIONS

This application is a continuation-in-part of U.S. patent application Ser. No. 13/728,062, filed on Dec. 27, 2012, which, in turn, is a continuation-in-part of U.S. application Ser. No. 13/351,829, filed on Jan. 17, 2012, and issued as U.S. Pat. No. 8,467,968. Both prior applications are incorporated by reference into this document, in their entirety and for all purposes.

FIELD OF THE INVENTION

The present invention relates generally to GPS-based machine vision locating and inspection systems and to devices for making a visual indicia in or on top of pavement. More particularly, the present invention relates to vehicle mounted locating and inspection systems for determining the geographical location and condition of roadway marks, GPS-based systems used for painting or otherwise "marking" roadway traffic lane demarcation lines, and apparatus, systems, and methods for acquiring and remotely analyzing roadway mark location and inspection data.

BACKGROUND OF THE INVENTION

New or repaved roadway surfaces almost always require the application of roadway surface markings as a mechanism for visually providing motorists with lane demarcation lines for controlling and directing traffic. In the past, the process of applying new roadway surface markings consisted of first manually determining, for example in the case of center lines, the center of the roadway surface and painting small dots to visually define the roadway center. A driver of a paint vehicle would then use the roadway center to guide a paint sprayer which would deposit paint along the path defined by the small dots.

Currently, this task is accomplished by determining the center of the roadway at a first location point by manually measuring the width of the roadway and placing a mark at the center point. This process is then repeated to determine the center point of the roadway at a second point which is displaced from the first point. These two points now define the starting and ending points for a line segment which identifies the center path of the roadway. A chain or string line is then stretched between the first and second center points and small white (or other colored) painted dots are manually sprayed and spaced along the stretched chain giving a visual indication of the center line of the roadway. The chain or string line is then removed from the roadway surface. This entire process is then repeated for the next segment of the roadway using the ending position of the first segment as the starting position for the second segment. This process is continuously repeated until the location of the center of the entire roadway has been defined. The roadway center line is used as a reference to define the roadway mark path (i.e., the roadway center line defines the mark path).

Having defined the position of the center of the roadway, a truck equipped with line painting equipment is positioned over the white dots. The driver of the truck then uses the white dots as a visual guide along with a pointer for coarsely positioning the truck over the defined segments. A second operator sits at the rear of the truck and positions a side moveable paint carriage directly over the dots for all defined segments of the roadway center. The side moveable carriage allows the second operator to apply the roadway marking at the desired location and to correct for any slight misalignment of the truck position with respect to the guide dots. A controlled paint spray nozzle array positioned on the side moveable carriage then applies the paint onto the roadway surface as the truck follows each center segment of the roadway. As the truck follows the mark path (the center of the roadway), the nozzle array applies the desired roadway mark (a single or multiple, solid or dashed, roadway marking) which may be offset from the mark path.

Although the current technology achieves the desired goal of providing a system for applying roadway markings, the current system is manually intensive and places the personal safety of workers at significant risk. For example, two workers are required to measure the starting and ending position of the segments, and two workers are required to actually paint the roadway markings (one worker is required to drive the truck and the other worker is required to operate both the carriage and paint dispensing equipment). In addition, to minimize the impact of applying the roadway surface markings to actively traveled roads and highways, the application of roadway markings is often done in the late evening hours. During this time, traffic visibility is impeded and there is a significant potential for oncoming traffic to collide with those workers manually defining the starting and ending positions for each segment.

Previous attempts to automate the process of marking roadways included guiding the road marking equipment along a predetermined mark path using electromagnetic beams. Unfortunately, these methods required the placement of transmitters along the roadway. Other previous attempts have included the use of light beams arranged in a manner to define the proper path. Again, this attempt proved difficult to implement because of sunlight interference. Other attempts have included using radioactive marking material which would emit a characteristic fingerprint to define the roadway mark path. There are many disadvantages with using radioactive marking material, including health and safety issues, longevity (half-life) of the radioactive material, and disposal problems.

Other attempts to re-mark roadway surfaces have included using a drawing application program in combination with a global positioning system (GPS)-based paint sprayer. A drawing pattern is created using the application program and geographical coordinates for the pattern which are manually defined and then used by the GPS paint sprayer to mark the roadway surface. This attempt requires that the drawing pattern for the roadway be predetermined and fails if the exact location of the roadway marking is inaccurately defined, or if the drawing pattern does not correspond exactly with the geographical position of the actual roadway.

U.S. Pat. No. 6,074,693 and No. 6,299,934 (related as a divisional) each disclose one example of a paint sprayer for marking roadways and fields with a drawing pattern. Both issued to Manning and titled "Global Positioning System Controlled Paint Sprayer," the patents teach a system having an external computer and a GPS paint sprayer. The drawing pattern is created by a designer using either a geographical information system (GIS) which runs, or drawing application programs which run, on the external computer. A print file of the drawing pattern is created by the operating system software and is passed to the GPS paint sprayer. The print file may contain the geographical mapping of pixel data; instead, the geographical mapping of the pixel data may be completed within the GPS paint sprayer. In either case, the geographical mapping of the drawing image is determined and then stored in memory within the GPS paint sprayer. The GPS paint sprayer further includes a GPS receiver and a location comparator. The GPS receiver determines the geographical location of the GPS paint sprayer and the location comparator determines if a match occurs between the current GPS location of the paint sprayer and the geographical mapping of the drawing image. If a location match between the current GPS location of the GPS paint sprayer and geographical mapping data of the drawing image is detected, a control signal is sent to a spray nozzle which deposits paint or other material at the match location. Both lines and picture-like drawings can be marked onto a surface using this patented system.

The '934 patent issued to Manning refers to fifteen earlier patents. Each patent is briefly summarized as follows. First, U.S. Pat. No. 4,219,092, titled "Automatic Guidance Apparatus" and issued to Richter, discloses an apparatus for automatically guiding a moving object such as a vehicle along a predetermined path. The predetermined path is defined by a stripe of material capable of emitting a secondary X-ray wave excited by a first X-ray emitted from the vehicle. Two detectors, a comparison mechanism, and a servo mechanism mounted within the vehicle correct the vehicle's path and maintain the vehicle on the desired path.

U.S. Pat. No. 4,460,127, titled "Device for Applying Uniform Traffic Lines" and issued to Hofmann, discloses a device operable from a moving vehicle for uniformly applying traffic marks by preventing the occurrence of substantial pressure fluctuations during the opening and closing of the paint nozzle. U.S. Pat. No. 4,832,331, titled "Athletic Field Marker" and issued to Brandli, discloses a resilient marker strip which is imbedded into a sports playing field. The top portion of the strip is exposed and visible for marking boundary lines. U.S. Pat. No. 5,220,876, titled "Variable Rate Application System" and issued to Monson et al., teaches a fertilizer blending and dispensing apparatus and method for fertilizing agricultural fields based upon field location and soil type, desired soil fertilizer content, current soil fertilizer status, and vehicle speed. A GPS or other vehicle location mechanism is incorporated into the apparatus.

U.S. Pat. No. 5,296,256, titled "Method and Apparatus for Painting Highway Markings" and issued to Hartman, discloses a method and apparatus for painting traffic marking lines over old paint markings on road pavement. Normally installed on a marking vehicle having a paint gun and a paint supply, the apparatus includes a detector which illuminates the pavement and utilizes a spectroscope to analyze the return inspection for the presence of one or more known preselected constituents of the old paint marking to control actuation of the valve on the paint gun and also track the old pavement marking. The apparatus also provides a paint gun delay function to account for the lead distance between the detector and paint gun and enables the application of new paint markings directly over the old markings at a relatively high rate of vehicle speed.

U.S. Pat. No. 5,529,433, titled "Apparatus and Method for Marking a Surface" and issued to Huynh et al., teaches an apparatus and method for dispensing material to mark a predetermined pattern onto a surface. The dispenser is manipulated in the x, y, and z directions. In addition, the dispenser can rotate and form a tilt angle with a w-axis.

U.S. Pat. No. 5,540,516, titled "Method for Marking Grass Fields and Apparatus for Applying Such Method" and issued to Nicodemo et al., teaches an apparatus and method for marking sports fields by bending grass blades in different directions. The location of the apparatus can be determined by using GPS or transceivers.

U.S. Pat. No. 5,549,412, titled "Position Referencing, Measuring and Paving Method and Apparatus for a Profiler and Paver" and issued to Malone, discloses a road working apparatus for determining the levelness of a road surface (surface profile) as a function of position and a leveler for forming a substantially level mat of material on a base surface of a road.

U.S. Pat. No. 5,653,389, titled "Independent Flow Rate and Droplet Size Control System and Method for Sprayer" and issued to Henderson et al., teaches a flow rate and droplet size control system for spraying a liquid (agricultural fertilizer) onto a surface. A position-responsive control system receives information pertaining to the boundaries of spray zones and spray conditions. The position of the sprayer may be determined by a GPS system.

U.S. Pat. No. 5,746,539, titled "Rapid Road Repair Vehicle" and issued to Mara, discloses a rapid road repair vehicle for quickly repairing a road surface and recording the position and time of the repair. A GPS system is used to determine the location of the repair.

U.S. Pat. No. 5,771,169, titled "Site-Specific Harvest Statistics Analyzer" and issued to Wendt, discloses both an apparatus and method for allowing a farmer to analyze site-specific data for optimizing crop yield as a function of any number of inputs. Geo-referenced maps along with data representative of a spatially variable characteristic are used to analyze statistical data for at least one given region of a farming field. A GPS-based location system may be used to define regions of interest for the analysis.

U.S. Pat. No. 5,836,398, titled "Vehicle Mounted Fire Fighting System" and issued to White, discloses a vehicle for fighting fires which may have a GPS/GIS system to determine the location of the vehicle relative to the proximity of a fire and other surroundings.

U.S. Pat. No. 5,838,277, titled "GPS-Based Controller Module" and issued to Van Wyck Loomis, discloses a zone-based GPS controller module. The apparatus includes a GPS receiver, a zoned map, and controller logic. The GPS location is used to determine a particular zone location. In response to a particular zone location, the controller produces analog or logic signal outputs.

U.S. Pat. No. 5,857,066, titled "Method and System for Producing an Improved Hiking Trail Map" and issued to Wyche et al., discloses a method for producing a hiking trail map using a GPS receiver for determining the positions at the beginning and end of each approximately linear trail segment.

U.S. Pat. No. 6,115,481, titled "User Modifiable Land Management Zones for the Variable Application of Substances Thereto" and issued to Wiens, discloses an apparatus and method for applying one or more formulations of substances (such as fertilizers, pesticides, and the like) to farmland, forest, and other areas based upon the specific geographical location (i.e., a particular zone within the land area). A GPS system may be used for graphically tracking a representation of a vehicle traversing the land area for determining the particular zone and formulations for that zone.

The following seven patents reference the Manning patents. Each is briefly identified as follows. First, U.S. Pat. No. 6,723,375, titled "Portable Locator Including a Ground Marking Arrangement" and issued to Zeck et al., discloses a method for locating an underground cable and marking the surface above the buried cable.

U.S. Pat. No. 6,729,706, titled "Large Area Marking Device and Method for Printing" and issued to Patton et al., discloses an apparatus and method for printing an image over a large surface area such as driveways, fields, and decks or patios. U.S. Pat. No. 6,951,375, titled "Large Area Marking Device and Method for Printing" and issued to Patton et al., discloses a method and apparatus for printing an enhanced image on a large surface area using a scanned approximation (crude image) of the desired image. These two patents specifically refer to the '693 patent and characterize GPS systems as lacking the accuracy for printing an image.

U.S. Pat. No. 7,029,199, titled "Automatic Ground Marking Method and Apparatus" and issued to Mayfield et al., discloses an apparatus for marking an even or uneven surface with complex patterns or logos. A GPS-based guidance system may be used for determining the location of the marker apparatus.

U.S. Pat. No. 7,640,105, titled "Marking System and Method with Location and/or Time Tracking" and issued to Nielsen et al., discloses an apparatus and method for marking ground or pavement to provide a visual indication of a buried utility. A GPS-based system is used to record the geographical location of marks placed on the surface. The time that the mark was made may also be recorded.

U.S. Pat. No. 7,866,917, titled "Trailing System for Dispensing Paint" and issued to Malit, teaches a device and method for marking roadways. The device has a mechanism for uniquely identifying the road which may include selectively visible paint. The paint (or other marks) are used to compliment a computer-assisted transportation system and other applications.

U.S. Pat. No. 7,981,462, titled "Method for Applying Paints and Varnishes" and issued to Bustgens, teaches a method for applying paint to buildings and other objects while avoiding protrusions, balconies, and the like which may be incorporated into the desired surface, according to an image template.

The current roadway marking technology has several problems. One problem is that a significant amount of manual labor is required to accurately paint lines on roadways, and as a result workers are placed in an unsafe working environment during the roadway marking process. Another problem with current technology is the inability to easily and quickly obtain sampled geographical coordinates of the existing roadway line marks using GPS or GPS-based pseudolite arrays. A related problem is the inability to use this sampled data to generate a continuous function of the geographical coordinates for the entire mark path. Additional problems are the lack of an offsetting capability to determine other substantially parallel mark paths for line marking and, therefore, the inability to uniformly deposit paint or other material along the first (or second) mark path duplicating the previous mark.

The '693 patent expressly notes certain disadvantages with the current roadway marking technology. Under the heading "Description of the Prior Art," as column 1, lines 11-40, the '693 patent states: "Road markings are produced to a great extent with the assistance of so called 'road marking' machines which apply paint under pressure from spray nozzle jets onto the road surface. In marking the road it is quite important that the horizontal registration of the paint be accurate with respect to the position of the road. In the past even experienced machine operators have found it difficult to manually guide a road marking machine with sufficient accuracy even where old markings are available. Heretofore, attempts have been made to automatically detect the presence of old markings and to use their detection for automatically guiding the road marking machine and switching the spray nozzle on and off as required. However, such attempts have not been wholly satisfactory because a break in the old marking does not give steering guidance during breaks. Moreover, this approach is of no use whatsoever where the old marks have disappeared or for new markings. Various arrangements have been disclosed for solving these problems by automatically guiding the road marking machine along a pre-determined path using light or electromagnetic beams. However, these arrangements require transmitters to be placed along the road, and in the case of light beams, are degraded by the effect of sunlight. In order to overcome these problems, it has been proposed to embed material [that] emitting radiation in the path that is to be marked. However, this method suffers from the disadvantage that embedding the radiating material in the road surface can be costly. Furthermore, radiating materials tend to lose their effectiveness after a time period. Similar issues pertain to parking lots, air landing fields, and the like."

Although Manning identifies certain disadvantages with the known roadway marking technology, the GPS-controlled paint spray system disclosed by Manning in the '693 and '934 patents has its own disadvantages. First, a designer must generate a drawing and it must be assumed that the designer has accurately generated the drawing pattern. It must be further assumed that the actual constructed road matches the content of the drawing pattern. And the system fails if a discrepancy exists between the actual and drawing pattern road position.

In addition, the disclosed system cannot maintain the accurate horizontal registration of the paint markings which is required when the drawing pattern does not accurately match the actual constructed roadway. This situation occurs where on-site construction changes are prompted by unforeseen construction problems. Such problems include, for example, bedrock formations, unstable ground structure, water runoff, and the like.

The designer using the system disclosed by Manning must determine and enter data corresponding to the reference geographical location for the center of the drawing, scaling information, orientation information, and other aspect ratio information to accurately determine the marking size and orientation. Thus, the system may require registration, orientation, and size input. The designer also must enter data manually for road markings, such as end points for a line, or an equation using known geographical location coordinates. This includes known coordinates from a previous survey. The system assumes that the designer can accurately determine geographical mark locations.

For an arc, the designer must select the end points and a radius. Such selection does not allow for a smoothly constructed functional fit. The designer must manually join line segments used to make a relatively long continuous painted line. The track line, which is a line, is produced from individual points and is not a smoothly derived curve from a mathematically derived function.

The system disclosed by Manning relies on an available equation. It does not sample pre-existing roadway marks (or produce a set of spaced points). The system does not record cross track position relative to a GPS receiver. The '693 patent does not disclose any mechanism for producing a curved line. Finally, the system disclosed by Manning paints only when there is a location match between the current GPS-based location and one of the data points in the geographical mark location data.

Others have attempted to use a combination of video-grammetry (imagers) and navigation tools (GPS systems for example) to map roadway features including roadway marks. For example, a study of precise road feature localization using a mobile mapping system has been completed. To determine the location of a roadway mark, however, an operator must manually select the feature position (i.e., roadway mark) on the camera's u-v coordinates using a manual digitizing tool. The conventionally defined east, north, up (ENU) coordinates of the manually selected feature are then determined by the mobile mapping system.

This system is prone to positional inaccuracies of the operator and is not completely automated. Individual selection of each roadway mark is time consuming and dependent upon the skill and experience of the operator. Furthermore, no mechanism is provided to automatically inspect the roadway marks for reflectivity and contrast; length and width dimensions; mark fill percentage; and other important quality standards.

Thus, there is a need in the industry for a roadway surface marking system that requires less manual labor, increases the operational safety factor for workers, and is less expensive than the current roadway marking technology, and which will accurately and uniformly mark roadway repaved surfaces.

BRIEF SUMMARY OF THE INVENTION

To meet the needs identified above and others which will be apparent from a review of the current technology, and in view of its purposes, the present invention provides GPS-based systems used for painting or otherwise "marking" roadway traffic lane demarcation lines, vehicle mounted locating and inspection systems for determining the geographical location and condition of roadway marks, and apparatus, systems, and methods for acquiring and remotely analyzing roadway mark location and inspection data.

To overcome the shortcomings of current roadway marking technology, a new apparatus and method for placing marks on a resurfaced (or repaved) roadway are provided. A basic object of the present invention is to provide an improved apparatus for automatically marking repaved roadways. A related object is to sample the geographical position of a pre-existing roadway mark path. A further related object is to sample the geographical position of a pre-existing roadway mark path using a GPS or GPS-based pseudolite array system.

It is another object of the invention to determine a continuous mark path based upon the sampled geographical mark path. It is still another object of the present invention to quickly determine the pre-existing roadway mark characteristics, pattern, and geographical position. An additional object is to accurately deposit paint or other marking material onto a repaved roadway replicating the pre-existing mark at locations determined by the continuous mark path.

Yet another object of the invention is to automatically create a second continuous roadway mark path substantially parallel to the original mark path. It is a further object of the invention to accurately deposit paint or other marking material onto a repaved roadway at the location determined by the second continuous roadway mark path. It is yet another object of the invention to provide a system for guiding the driver of the roadway marking vehicle. A related object is to dispense an even and consistent paint mark irrespective of vehicle speed. The invention has as another object automatically guiding the paint vehicle along the mark path based upon a mark path continuous function.

The present invention also provides an apparatus and method for automatically determining the geographical location of a pre-existing roadway mark. The present invention provides for an apparatus and method for automatically determining the geographical location of a pre-existing roadway mark from a moving vehicle. For example, the geographical location of a pre-existing roadway mark may be determined from an image of the mark. It is another object of the invention to determine the GPS geographical location of a pre-existing mark from an image of the mark. It is yet another object of the invention to sample the geographical location of a roadway mark.

The present invention provides for an apparatus and method to image roadway marks from a moving vehicle. It is another object of the invention to image roadway marks to the left and to the right sides of a moving vehicle. It is still yet another object of the invention to image roadway lane demarcation marks from a moving vehicle travelling within the lane. One or more imagers may be mounted onto the side of the moving vehicle to image roadway marks. It is another object of the invention to provide for a rotational mount for affixing the imager to the side of the vehicle. It is another object of the invention to provide for a removable rotational mount which is quickly and easily affixed to, and removed from, the side of a vehicle.

Another object of the invention is to accurately synchronize mark images with their respective GPS geographical locations. Additional objects of the invention are to automatically determine the quality of roadway marks and to automatically compare the actual image of a roadway mark with a standard image of the roadway mark. A related object of the invention is to automatically determine the length and width of roadway marks and the relative spacing between consecutive or adjacent roadway marks from the roadway mark images. A further object of the invention is to determine the area of the roadway mark. For example, the apparatus and method may automatically determine the area fill percentage of a roadway mark. A still further object of the invention is to automatically determine the reflective contrast between the roadway surface and the roadway mark. Yet another object of the invention is to automatically determine the geographical position of roadway marks which do not meet the acceptable standards. The invention has as an object to provide for an imaging system to image roadway marks during low ambient light conditions.

The invention further provides an apparatus for placing marks on a resurfaced roadway. The apparatus includes a GPS-based locator for sampling discrete geographical location data of a pre-existing roadway mark evident on the roadway before resurfacing. A computer determines a continuous smooth geographical location function fitted to the sampled geographical location data. And a marker is responsive to the GPS-based locator and geographical location function for replicating automatically the pre-existing roadway mark onto the resurfaced roadway. The apparatus is typically part of a moving vehicle. A related method is disclosed for placing marks on a resurfaced roadway. A similar apparatus can be used to guide a vehicle having a snow plow, paver, or other similar equipment along a roadway.

According to another aspect, the present invention provides an apparatus and method for minimizing the amount of imaged roadway area data needed for analyzing roadway mark images. It is an object of the invention to provide an apparatus and method for filtering the imaged roadway area to minimize the amount of imaged roadway area data needed for analyzing roadway mark images. The present invention also provides an apparatus and method for compressing the roadway mark image to minimize the amount of imaged roadway mark data needed for analysis. It is another object of the invention to provide an apparatus and method for encrypting the roadway mark image to provide for secure roadway mark data storage and transmission of roadway mark data.

One object of the invention is to provide an apparatus and method for minimizing the amount of roadway mark image data while also preserving the fidelity (e.g., accuracy) of the roadway mark image. The invention provides an apparatus and method for minimizing the amount of roadway image data while preserving the fidelity of the roadway mark image for further analysis. It is a further object of the invention to provide an apparatus and method for minimizing the amount of roadway image data while preserving the fidelity of the roadway mark image for further computer-based image analyses. An apparatus and method for minimizing the amount of roadway image data while preserving the fidelity of the roadway mark image for further computer-based image analyses may include determining the characteristics of the roadway mark.

It is a further object of the invention to provide an apparatus and method for minimizing the amount of roadway image data collected by a moving vehicle while preserving the fidelity of the roadway mark image for further computer-based image analyses including determining the characteristics of the roadway mark. The invention provides an apparatus and method for minimizing the amount of roadway image data collected by a moving vehicle while preserving the fidelity of the roadway mark image and further, to transmit these data to a remotely located facility for performing computer-based image analyses including determining the characteristics of the roadway mark. It is a further object of the invention to provide an apparatus and method for minimizing the amount of roadway image data collected by a moving vehicle while preserving the fidelity of the roadway mark image and further, to transmit these data to a remotely located facility for performing computer-based image analyses including determining the characteristics of the roadway mark, the geographical location of the roadway mark, and a best-fit roadway mark path function. The present invention also provides an apparatus and method for minimizing the amount of roadway image data collected by a moving vehicle while preserving the fidelity of the roadway mark image and further, to transmit these data to a remotely located facility for performing computer-based image analyses including determining the characteristics of the roadway mark, the geographical location of the roadway mark, the best-fit roadway mark path function, and the quality of the roadway mark.

According to another aspect of the present invention, an apparatus and method are provided for minimizing the amount of roadway image data collected by a moving vehicle while preserving the fidelity of the roadway mark image and further, for transmitting these data to a remotely located facility for performing computer-based image analyses including comparing the roadway mark characteristics against a set of roadway mark standards for determining the quality of the roadway marks. It is a further object of the invention to provide an apparatus which minimizes the amount of memory necessary to remotely store roadway mark images. In particular, the invention provides an apparatus which minimizes the amount of computer memory necessary to store roadway mark images.

The invention also provides an apparatus which minimizes the amount of computer memory necessary to store roadway mark images while preserving the fidelity of the roadway mark image. It is a further object of the invention to provide an apparatus which minimizes the amount of computer memory necessary to store roadway mark images while preserving the fidelity of the roadway mark image for further analysis. In particular, the invention provides an apparatus which minimizes the amount of computer memory necessary to store roadway mark images while preserving the fidelity of the roadway mark image for further computer-based analysis.

It is yet another object of the invention to provide an apparatus which minimizes the amount of roadway image data for transmission to a remote site from one or more imaging vehicles. The invention provides an apparatus which minimizes the amount of roadway mark image data for transmission to a remote site from one or more imaging vehicles. In particular, the invention provides an apparatus which minimizes the amount of roadway mark image data for transmission to a remote site while maintaining the roadway mark image fidelity.

According to yet another aspect, the invention provides an apparatus which computes the roadway mark characteristics from one or more imaging vehicles. In one embodiment, the invention provides an apparatus which remotely computes the roadway mark characteristics from one or more imaging vehicles. It is one object of the invention to provide an apparatus which remotely computes the continuous mark path and roadway mark characteristics from one or more imaging vehicles. It is yet another object of the invention to provide an apparatus which remotely computes the continuous mark path and roadway mark characteristics from one or more imaging vehicles and transmits the continuous mark path and roadway mark characteristics to a remotely located vehicle. It is still yet another object of the invention to provide an apparatus which remotely computes the continuous mark path and roadway mark characteristics from one or more imaging vehicles and transmits the continuous mark path and roadway mark characteristics to a remotely located vehicle via the internet. In particular, the invention provides an apparatus which remotely computes the continuous mark path and roadway mark characteristics from one or more imaging vehicles and transmits the continuous mark path and roadway mark characteristics to a remotely located vehicle via a wireless communication link.

In one embodiment, the invention provides an apparatus which remotely computes the continuous mark path and roadway mark characteristics from one or more imaging vehicles and performs quality comparisons. For example, the invention provides for an apparatus which remotely computes the continuous mark path and roadway mark characteristics from one or more imaging vehicles and performs an image stitching process which generates a complete, accurate, and contiguous replication of the pre-existing roadway mark along the roadway mark path.

Other objects and advantages of the present invention will become more clear following a review of the specification and drawings. It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 9b is a side view of the adjustable imager mount shown in FIG. 9a;

DETAILED DESCRIPTION OF THE INVENTION

Figure 1:
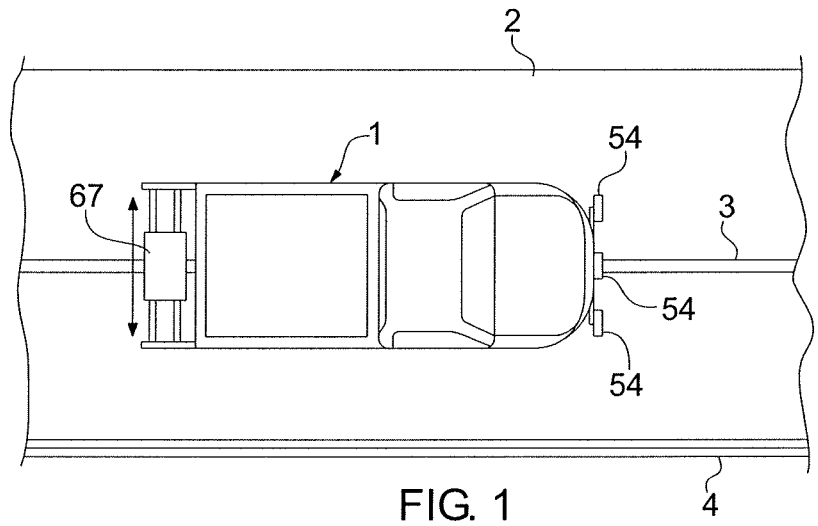
FIG. 1 is a diagrammatic plan view of a vehicle fitted with the apparatus according to the present invention and moving along a road.

The present invention provides GPS-based systems used for painting or otherwise marking roadway traffic lane demarcation lines, vehicle mounted locating and inspection systems for determining the geographical location and condition of roadway marks, and apparatus, systems, and methods for acquiring and remotely analyzing roadway mark location and inspection data. Referring now to the drawing, in which like reference numbers refer to like elements throughout the various figures that comprise the drawing, FIG. 1 shows a moving or self-propelled vehicle 1 which is located on a road or roadway 2 near a line 3 applied to the surface of the road 2. Also shown is a roadway edge boundary line 4. The term "vehicle" used in this document is given its broadest meaning, including any conveyance, motorized device, or moving piece of mechanical equipment for transporting passengers or apparatus. More specific and preferred examples of vehicles 1 are cars, vans, trucks, snow plows, construction equipment, and road marking machines. The terms "road" and "roadway" are used interchangeably in this document to include any road, highway, street, avenue, alley, boulevard, bridge, viaduct, trestle, or the like, and approaches to them (including public and private roads and parking lots) designed or ordinarily used for vehicular travel.

Roadway Marking

According to one embodiment, the present invention provides an apparatus for placing marks on a resurfaced roadway 2. The apparatus includes a GPS-based locator for sampling discrete geographical location data of a pre-existing roadway mark evident on the roadway 2 before resurfacing; a computer 27 for determining a continuous smooth geographical location function fitted to the sampled geographical location data; and a marker responsive to the GPS-based locator and geographical location function for replicating automatically the pre-existing roadway mark onto the resurfaced roadway 2.

Figure 2:
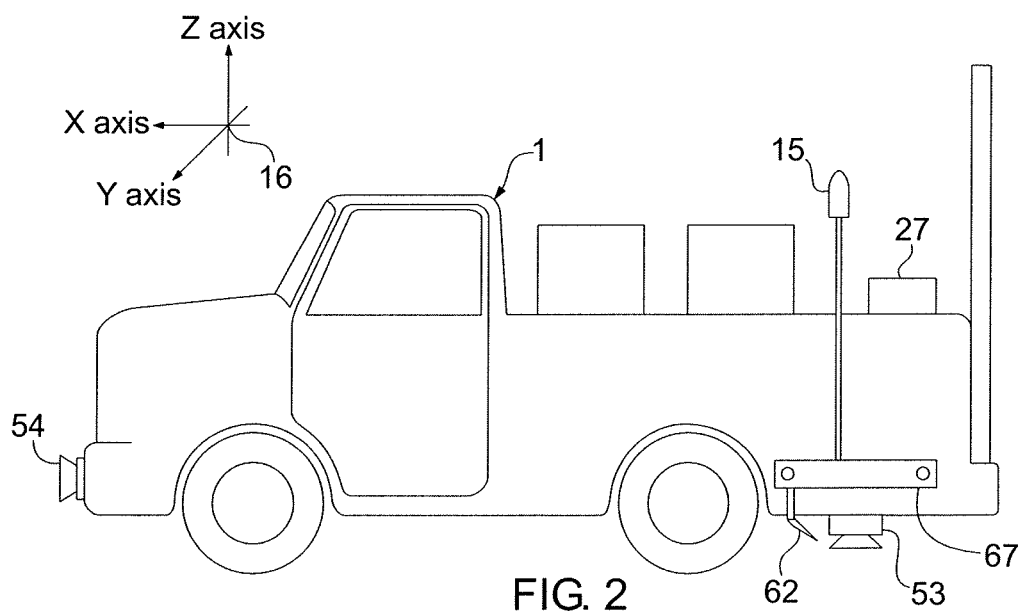
FIG. 2 is a diagrammatic side view of a vehicle fitted with the apparatus according to the present invention, illustrating additional components of the apparatus.

As illustrated in FIG. 2, the vehicle 1 is fitted with a number of components. Specifically illustrated in FIG. 2 are a GPS antenna 15, a computer 27, a first imager 53, a second imager 54, a nozzle array and control system 62, and a moveable cross track carriage 67. FIG. 1 shows that the vehicle 1 may be fitted with any number of second imagers 54 (three are shown).

Figure 3:
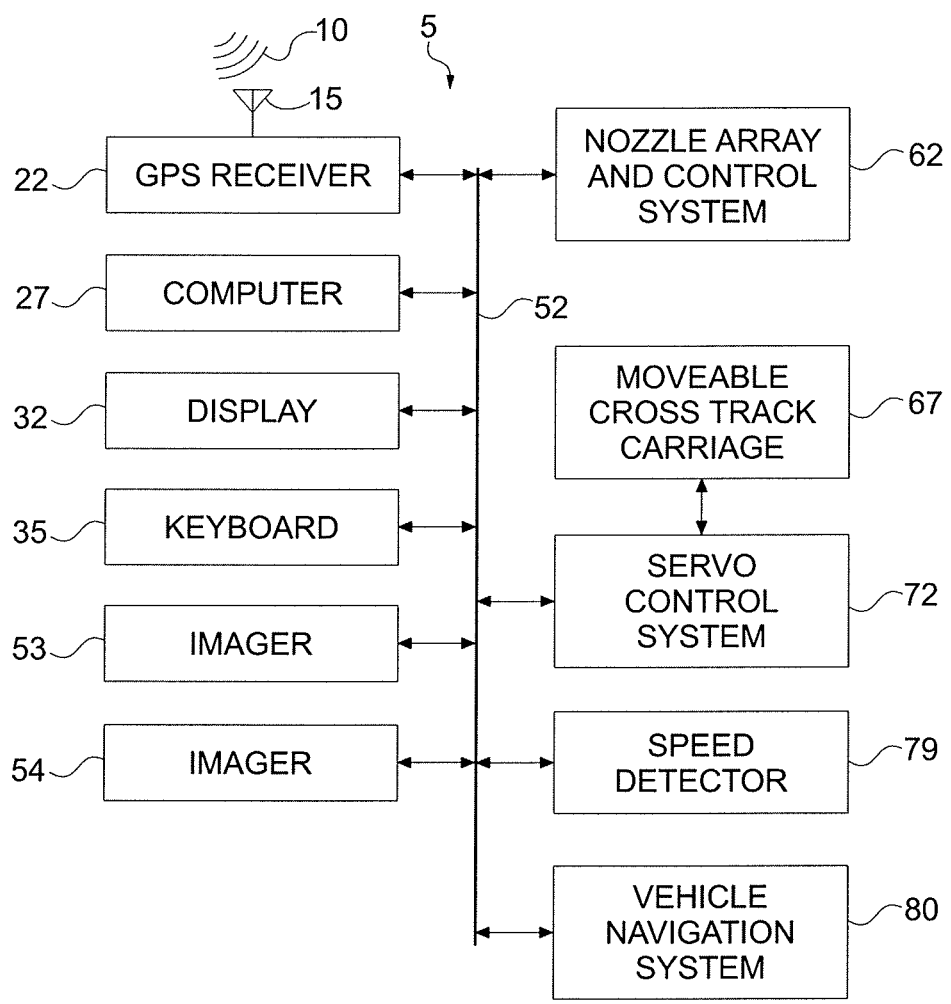
FIG. 3 is a schematic block diagram illustrating components of a preferred embodiment of the apparatus according to the present invention.

FIG. 3 is a schematic block diagram 5 illustrating components of a preferred embodiment of the apparatus according to the present invention. The preferred embodiment comprises a number of components and systems which include the GPS antenna 15, a GPS receiver 22, the computer 27, a visual display 32, a keyboard 35, the first imager 53, the second imager 54, the nozzle array and control system 62, the moveable cross track carriage 67, a servo control system 72, a speed detector 79, and a vehicle navigation and control system 80. All of the components and systems with the exception of the moveable cross track carriage 67 are electrically interconnected, and in communication with each other, for example, via a bus 52.

The GPS antenna 15 receives GPS radio wave signals 10 which originate from a GPS satellite system or a GPS-pseudolite array (not shown). "Pseudolite" is a contraction of the term "pseudo-satellite," used to refer to something that is not a satellite which performs a function commonly in the domain of satellites. Pseudolites are typically small transceivers that are used to create a local, ground-based GPS alternative. The range of each transceiver's signal depends on the power available to the unit. Being able to deploy one's own positioning system, independent of the GPS, can be useful in situations where the normal GPS signals are either blocked or jammed (e.g., in deference to military conflicts), or simply not available.

The GPS antenna 15 is connected to the input of the GPS receiver 22, which decodes the GPS signals 10 for determining its geographical location. The receiver 22 is further electrically connected to the bus 52, and is in bi-directional communication with the other components and systems connected to the bus 52. The GPS geographic position of the antenna 15 is adjusted to account for any physical separation of the nozzle array and control system 62 from the antenna 15, so that the actual geographical position of the nozzle array and control system 62 is determined by the decoded GPS signals 10.

Figure 4:
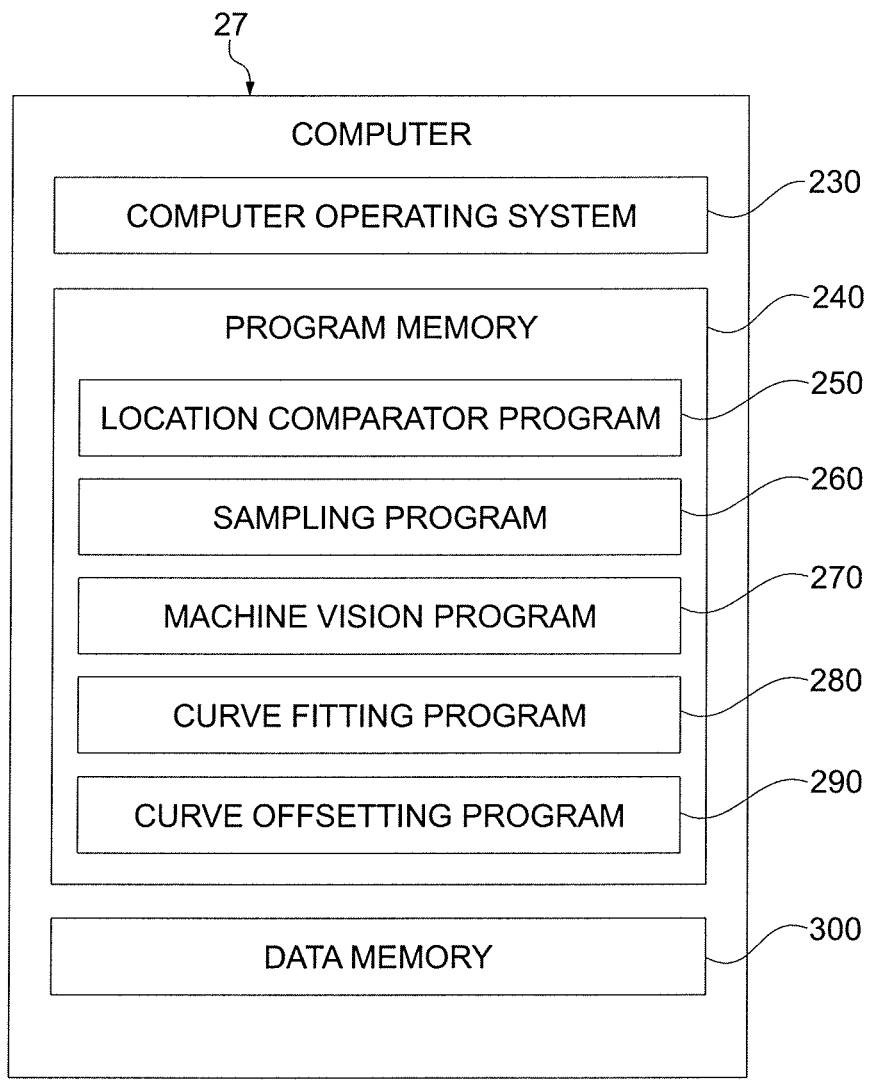
FIG. 4 is a schematic block diagram illustrating components of a computer of a preferred embodiment of the apparatus shown in FIG. 3.

The computer 27 is a conventional computer having data and program memory as shown in FIG. 4. Operating system (OS) software 230 is a conventional operating system such as Windows 7 manufactured by Microsoft, a Unix-based OS, or an Apple Computer OS X Lion operating system. The computer 27 also has program memory 240 and data memory 300, in addition to the memory required by the operating system 230. The computer 27 further has a real-time time base for calculating accurate time intervals (not shown).

The program memory 240 comprises a location comparator program 250, a sampling program 260, a machine vision program 270, a curve fitting program 280, and a curve offsetting program 290. The location comparator program 250 compares the current adjusted GPS location received by the antenna 15 and decoded by the GPS receiver 22 to previous GPS locations stored in data memory 300 (along with the characteristics of the pre-existing roadway mark, including type, geometry, and dimensions). The location comparator program 250 then determines the difference between the current adjusted and the stored GPS locations.

The sampling program 260 receives a GPS reference location and constructs an orthogonal Cartesian (or other conventional) coordinate system (grid system) 16 (see FIG. 2) having the origin defined at the reference location and further, based upon the constructed grid system and the distance sampling interval, samples the geographical location of the pre-existing roadway mark. The machine vision program 270 inputs data from the imagers 53 and 54 and performs edge detection, geometric computations, and other generic machine vision operations on the image data from the imagers 53 and 54.

The curve fitting program 280 inputs discrete GPS coordinate data stored in the data memory 300 and determines a first continuous mathematical function which fits the discrete GPS coordinate data. The curve offsetting program 290 inputs the continuous function determined by the curve fitting program 280 and generates a second continuous function similar and parallel to the first function but offset from the first function by a given distance. For example, the first function may represent the center mark line 3 on the road 2. A second function defining a roadway edge mark line 4 may be derived from the first function by offsetting the first function by a distance, or the first function may represent a roadway edge mark line 4 and the center mark line 3 may be derived from the first function by offsetting the first function by a distance.

Thus, the present invention can further be embodied in the form of computer-implemented processes and apparatus for practicing such processes, for example, and can be embodied in the form of computer program code embodied in tangible media, such as floppy diskettes, fixed (hard) drives, CD ROM's, magnetic tape, fixed/integrated circuit devices, or any other computer-readable storage medium, such that when the computer program code is loaded into and executed by the computer 27, the computer 27 becomes an apparatus for practicing the invention. The program also may be embodied in a carrier where the carrier may be a tangible media or a transmitted carrier wave.

Figure 5:
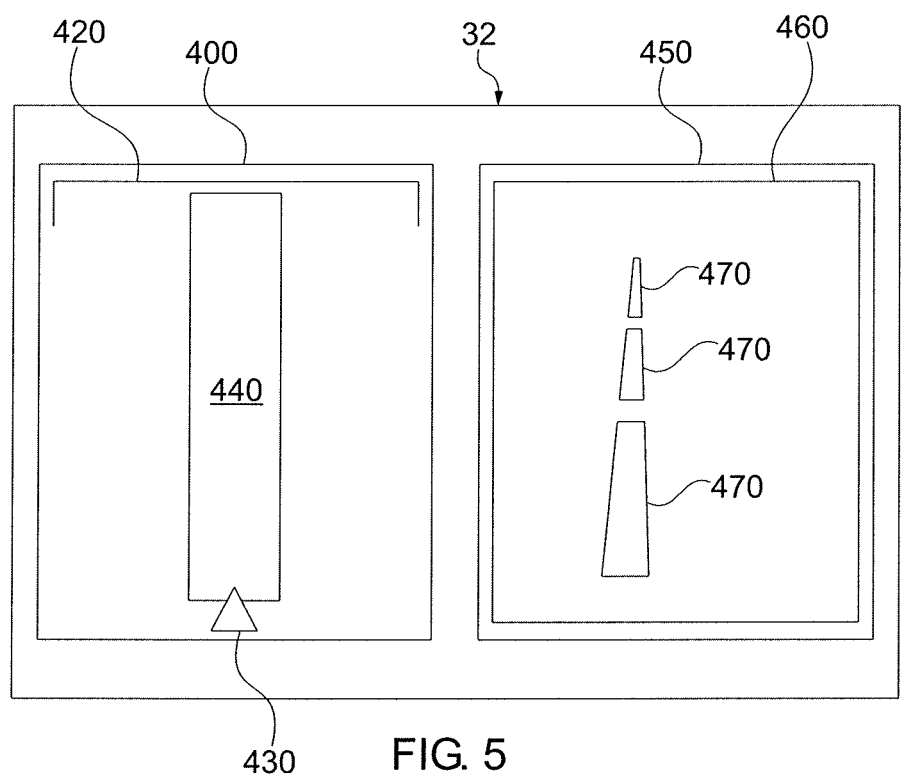
FIG. 5 is a schematic block diagram illustrating components of a display of the preferred embodiment of the apparatus shown in FIG. 3.

The display 32 is a conventional or heads-up computer display adapted to present information to an operator. The display 32 is capable of displaying one or more windows such as an operator may view using a windows-based operating system. Preferably the display 32 contains a left window 400 and a right window 450 as shown in FIG. 5. The left window 400 displays the image from the first imager 53. Displayed within the left window 400 are a cross travel bar 420; a yellow, rectangle-shaped roadway mark 440 imaged by the first imager 53 located proximate the rear of the vehicle 1; and the position of the nozzle array and control system 62 represented by the arrow 430. The right window 450 of the display 32 depicts the image from the second imager 54 which images the roadway mark path 470 in front of the vehicle 1. Also displayed within the right window 450 is a red alignment box 460.

The keyboard 35 permits the operator to manually enter data similar to a conventional computer keyboard. The keyboard 35 is connected to the bus 52. Alternatively, the keyboard 35 may be directly connected to the computer 27.

The first imager 53 may be fixedly attached to the vehicle 1. As illustrated in FIG. 2, the first imager 53 is downwardly focused onto the surface of the road 2 such that its field of view includes the entire roadway surface under the moveable cross track carriage 67. The second imager 54 is also fixedly attached to the vehicle 1 and, as illustrated in FIGS. 1 and 2, focused to image the roadway surface in front of the vehicle 1 so that a clear image of the roadway mark is visible.

The nozzle array and control system 62 is mounted onto the moveable cross track carriage 67. One or more nozzle jets may be incorporated into the nozzle array and control system 62 for spraying (or otherwise placing or delivering) one of more lines of paint (or any other suitable marking material).

The paint may be the same or a different color. Other material may be sprayed onto the surface of the road 2 with the paint, such as glass beads instead of just the paint. In addition, the nozzle array and control system 62 is responsive to the speed of the vehicle 1, as determined by the speed detector 79, and adjusts the dispensing rate of the paint dependent upon the speed of the vehicle 1 to maintain the same paint thickness irrespective of the speed of the vehicle 1. The nozzle array and control system 62 compensates for positional offsets of the individual jets, such that the GPS coordinates for the individual jets are determined.

The moveable cross track carriage 67 may be (although not necessarily) mounted on the rear (as shown in FIG. 1) or on the back driver's side (as shown in FIG. 2) of the vehicle 1. The moveable cross track carriage 67 laterally moves to position the nozzle array over the roadway mark line. Hydraulic or electrical actuators mounted on the vehicle 1 are used to position the moveable cross track carriage 67 over the roadway mark line.

The servo control system 72 is responsive to control signals placed onto the bus 52 and is responsive to the machine vision program 270. The servo control system 72 controls the hydraulic or electrical actuators. Thus, the servo control system 72 controllably moves the moveable cross track carriage 67 to a desired cross track position.

The speed detector 79 determines the speed of the vehicle 1. The vehicle speed may be determined by conventional mechanisms such as an electronic speedometer.

The vehicle navigation system 80 is a conventional automated system for controlling the direction, speed, and acceleration of the vehicle 1 along a predetermined path. As used in this document, "predetermined" is meant determined beforehand, so that the predetermined characteristic must be determined, i.e., chosen or at least known, in advance of some event. The navigation system 80 includes both the hardware and software necessary to completely control the movement of the vehicle 1 along a path without human intervention. The apparatus described above forms a GPS-based system used for painting, or otherwise "marking," roadway traffic lane demarcation lines.

In operation, the apparatus according to the present invention can be used as follows. The operator of the vehicle 1 first positions the vehicle 1 at the start of the desired roadway mark and in a direction of travel for recording the mark path. The first imager 53 images the surface of the road 2 under the complete moveable cross track carriage 67 travel distance and the operator positions the vehicle 1 so that an image of the roadway mark appears in the left window 400 of the display 32. The machine vision program 270 recognizes the roadway mark and determines the amount of cross travel necessary to align the cross travel carriage 67 to the mark center. A control signal is then sent to the servo control system 72 from the machine vision program 270 to move and align the moveable cross track carriage 67 having the attached nozzle array and control system 62 to the center of the mark. Alignment is displayed as a red arrow 430 centered on the imaged roadway mark 440. The imaged mark along with the aligned red arrow relative to the cross travel bar 420 is shown in FIG. 5. The cross travel bar 420 gives the operator a visual indication of the maximum cross travel distance of the moveable cross track carriage 67.

The operator then enters the positional sampling interval by using the keyboard 35, which is then sent by the computer 27 to the sampling program 260. The operator then depresses a "Start-to-Record" key on the keyboard 35 which begins the process of recording the geographical location and characteristics of the mark. The reference location is determined as the geographical position of the aligned moveable cross track carriage 67 (corrected for any positional offsets of the antenna 15) when the Start-to-Record key is depressed. The roadway mark may be a solid or dashed, single or double line, or any combination thereof. For example, a roadway mark may consist of a solid line and a parallel dashed line in close proximity to the solid line, such as a conventional roadway mark to indicate that passing in one direction is allowed but passing in the opposite direction is not allowed.

Once the Start-to-Record key is depressed, the computer 27 begins to input the vehicle speed data from the speed detector 79. The operator then begins to move the vehicle 1 in the direction of the roadway mark path 470 and uses the right window 450 of the display 32 to assist in maintaining the vehicle path coincident with the roadway mark path 470 (shown for a middle rear mounted cross track carriage 67, see FIG. 1). The operator steers the vehicle 1 so that the roadway mark path 470 is maintained within the red alignment box 460. Maintaining the vehicle 1 within the red alignment box 460 insures that the servo control system 72 along with the machine vision program 270 will be able to position the moveable cross track carriage 67 within the cross travel limitations indicated by the cross travel bar 420 of the moveable cross track carriage 67 along the roadway mark path 470.

Geographical position data of the mark are sequentially sampled and stored in the data memory 300 of the computer 27 using the sampling program 260 and the Cartesian coordinate system (see the orthogonal x, y, and z axes shown in FIG. 2). The geographical positional sampling occurs at a distance interval previously defined by the operator along one of the Cartesian coordinate system axis. Sampling of the geographical position for the roadway mark path 470 occurs when the vehicle 1 has travelled the sampling interval which is calculated by the sampling program 260 using the decoded GPS positional data from the GPS receiver 22 and the Cartesian coordinate system. Alternatively, the sampling distance can be calculated using the speed detector 79 and the time base of the computer 27.

As the vehicle 1 passes over the mark, the computer 27 determines the length, width, color, and the number of lines (single, double) of the mark by using the machine vision program 270 and the speed of the vehicle 1 derived from the speed detector 79 and the time base of the computer 27. The characteristics of the mark are also stored within the data memory 300. If the mark characteristics change from one form to another as the vehicle 1 transverses the roadway mark path 470, the machine vision program 270 recognizes the change in the mark characteristics and stores the geographical location of the change, along with the new mark characteristics. For example, dashed marks may change to a solid line mark, and a double solid line mark may change to a single dashed line mark. The geographical position of the change in mark characteristics is recorded along with the sampled mark path.

At the end of the roadway mark path 470, the operator depresses a "Stop-Record" key on the keyboard 35, which terminates the process of sampling and storing the mark geographical location and mark characteristics. In addition, upon depression of the Stop-Record key, the curve fitting program 280 determines a continuous mark path function using a curve fitting algorithm over the mark path interval using the Cartesian coordinate system determined by the sampling program 260. The original mark path is now defined as a continuous function referenced to the start location and to the grid pattern of the Cartesian coordinate system.

The roadway is now ready to be repaved. The process of repaving completely covers all remnants of the old roadway mark. Alternatively, the old roadway mark is removed by physical mechanisms such as by wire brushing, by grinding, by water jetting or blasting, or by some other conventional mechanism.

To re-establish or replicate the roadway mark at the same location, the location comparator program 250 compares the current GPS location of the moveable cross track carriage 67 (along with the nozzle array and control system 62 with positional offset correction) with the reference location previously stored in the data memory 300. The location comparator program 250 then further displays positional instructions to the operator of the vehicle 1 in the left window 400 of the display 32 for assisting the operator in positioning the red arrow of the moveable cross track carriage 67 in close proximity to the reference position.

Once the vehicle 1 has been approximately positioned at the reference point, the machine vision program 270 displays the original mark previously stored in the data memory 300 into the left window 400 of the display 32 and commands the servo control system 72 to move the cross travel carriage 67 into alignment with the reference position. In addition, the right window 450 of the display 32 now displays the original mark path for the operator to follow along with the red alignment box 460 to assist the operator in maintaining alignment of the cross track carriage 67 to the desired position given by the previously determined mark path continuous function.

After the cross track carriage 67 has been aligned with the reference position, the operator depresses the "Start-to-Repaint" key on the keyboard 35 and begins to move the vehicle 1 along the roadway mark path 470 displayed (along with the actual mark) in the right window 450 of the display 32. The displayed roadway mark path 470 is now derived from the mark path continuous function.

As the vehicle 1 moves, the location comparator program 250 compares the position of the cross track carriage 67 with the roadway mark path 470 defined by the continuous function and generates an error signal representing the difference between the actual cross track carriage 67 geographical position and the continuous function mark path geographical position. This error signal is used by the servo control system 72 to move the cross track carriage 67 back onto the roadway mark path 470 defined by the continuous function. As the vehicle 1 moves along the roadway mark path 470 defined by the continuous function, the previously stored mark location and characteristic data are compared to the current (position corrected) GPS location of the cross track carriage 67 and the respective mark is replicated onto the surface of the road 2 by the nozzle array and control system 62.

Depending upon the speed of the vehicle 1, the nozzle array and control system 62 dispenses the appropriate volume of paint responsive to the speed of the vehicle 1 derived from the speed detector 79 to maintain the desired paint thickness. For example, a slow moving vehicle 1 would dispense paint at a slower rate than that for a fast moving vehicle 1 which would require dispensing paint at a faster rate to maintain consistency of paint thickness.

The apparatus and method described above in accordance with a preferred embodiment of the invention give the operator the ability to sample an existing roadway mark using GPS or pseudolite technology. Sampling of the roadway mark requires discrete geographical points which may be accomplished, depending upon the acquisition speed of the geographical positioning system, at a sampling vehicle speed which will minimally impact the flow of regular traffic.

The apparatus and method use conventional curve fitting techniques to produce a continuous function representing the mark path from the sampled data points and yield a consistently smooth curve. Such curve fitting techniques are unlike the joining of linear line segments which have a tendency to have a jagged, or "put-together," appearance. The curve fitting of only one roadway mark (e.g., the centerline of a mark) is required and any additional roadway marks (e.g., the roadway edge boundary line 4) may be obtained by offsetting the continuous function derived from a first continuous mark path by an amount consistent with the desired relative position of the second mark path. For example, to define a side roadway mark using a centered defined functional mark path requires only a simple mathematical operation of offsetting the original functional mark path by a desired distance (typically the width of the traffic lane). This technique guarantees exact parallel placement of the side mark with respect to the center mark.

In addition, the actual sampling of a pre-existing roadway mark ensures that, after repavement of the roadway 2 is completed, the new repainted mark will be placed in exactly the same position on the roadway 2 as the previous mark. For known systems that convert a drawing pattern into geographical coordinates for painting a surface, a problem arises in the field where the actual drawn pattern is not compatible with the actual field requirements. For example, sometimes the roadway must be changed as the result of a rock formation or other obstructions. Further, roadway positions are frequently changed to accommodate commercial or residential development in a particular area. A predetermined drawing pattern unfortunately does not reflect the reality of changes in the road position as the result of field-induced changes. Thus, any system using a drawing pattern may not reflect the actual road position and, therefore, may not accurately mark the roadway 2. The apparatus and method according to a preferred embodiment of the invention avoid these problems.

Another improvement over the known systems is that the original roadway mark is characterized according to type (color, dashed, continuous, or other) and geometrical dimensions (length, width, and the like). This is an important consideration for maintaining the exact mark sequence for a mark path. For example, a portion of the mark path may have a dashed yellow mark and another portion of the mark path may have a continuous white mark. This information is used to selectively choose the correct color and also to control the spray width and dispensing cycle so that the original mark may be exactly reproduced.

The apparatus and method for placing (printing) marks on a resurfaced roadway 2, according to a preferred embodiment of the invention, achieve numerous additional advantages over the known technology. Among those advantages are the following:

1. Geographically sampling the coordinates of pre-existing roadway marks using GPS technology;
2. Computing a continuous function to determine the mark path from the mark samples;
3. Automatically duplicating and re-painting the roadway mark patterns depending upon the previous mark pattern;
4. Accurately depositing roadway mark patterns such as continuous or dashed lines independent of the speed of the vehicle 1;
5. Providing for automatic and semi-automatic vehicle alignment and/or movement on the mark path;
6. Automatically determining pre-existing mark geometric characteristics;
7. Coordinating the material spray dispensing rate in response to vehicle speed;
8. Protecting workers completely from vehicular traffic and weather;

9. Reducing work force requirements because only one operator is required both to determine the geographical coordinates of existing roadway marks and to re-paint the marks;

10. Converting the mark samples and geometric characteristics into a pattern;

11. Automatically adding a positional offset to re-paint other roadway marks which can be mathematically offset from the sampled mark path; and 12. Providing for a smooth and continuous mark path.

The apparatus and method for placing marks on a resurfaced roadway 2, according to a preferred embodiment of the invention, use a GPS-based location system to sample the geographical position of an existing roadway mark. Although many of the known patents use GPS for positional information to determine the location of vehicles, the apparatus and method of the present invention singularly use GPS to determine the geographical position of an existing roadway mark. The advantages of determining the roadway mark before repaving or re-painting include: (1) determining the exact location of the mark; and (2) from this information, using a mathematical model to form a continuous geometrical function of the mark path. The GPS-based location system includes any GPS pseudolite or GPS-like, self-calibrating, pseudolite array system and is not restricted to any one GPS technology.

Geographical sampling requires discrete geographical data along the mark path. A continuous geographical path is not required. A vehicle 1 equipped with the apparatus of the present invention will be able to travel at moderate speed with respect to the current traffic flow and will only need to sample the roadway mark along the mark path at discrete points.

The apparatus of the present invention uses the sampled positions of the roadway mark to determine a continuous mathematical function which provides a smoothly varying function representing the actual mark path. Although the Manning patents disclose that the designer of a drawing pattern can use linear interpolation between two points for a roadway mark, and then these individual line segments can be joined to make a relatively long continuous painted line, or the designer may use a pre-existing equation using known geographical location coordinates as independent variables within the drawing pattern, no mathematical computation is disclosed which determines a "best fit" continuous geographical location equation based upon the actual sampled roadway mark locations. The apparatus of the present invention calculates a "best fit" equation.

The apparatus also automatically re-paints roadway marks depending upon the previous mark type. The mark type and dimensional characteristics are used in combination with the determined vehicle speed to control the paint dispensing unit. Thus, the unit accurately and uniformly re-paints the prior existing mark onto the repaved or milled roadway surface.

The apparatus provides for automatic and semi-automatic vehicle alignment and movement on a path. A vehicle navigation system (an "auto-pilot") maintains the vehicle 1 on the roadway mark path 470. The desired mark location is mathematically determined using sampled geographical positions from the old mark. A comparison is then made between the actual mark location and the desired mark location. An error signal is determined based upon this difference which is used by the auto-pilot to correct the position of the vehicle 1.

A visual indication of the position of the vehicle 1 with respect to the roadway mark path 470 is also provided. The display 32 helps the driver of the vehicle 1 in steering and maintaining the position of the vehicle 1 on the desired roadway mark path 470. The display 32 preferably illustrates the actual mark path of the vehicle 1 as computed by the previously sampled mark path, and therefore a conventional guide wheel and guide wheel support bracket or other assistive pointer devices are not required. The visual indication of the position of the vehicle 1 with respect to the roadway mark path can also assist the driver of a snow plow to maintain the proper position on the roadway.

During the sampling process for determining the geographical location of the roadway mark path 470, the apparatus also automatically determines the type and dimensional characteristics (for example the length and width and, if appropriate, the spacing distance between marks) of the roadway mark. For example, the mark may be a dashed sequence or may be a solid line. If the mark is a dashed line, the apparatus is capable of determining the spacing between the dashes. Thus, the apparatus of the present invention automatically determines existing roadway mark characteristics.

The material spray dispensing rate is responsive to vehicle speed. This feature of the apparatus is important toward depositing a consistent and uniform amount of paint onto the road 2. If the dispensing rate is held constant, a different amount of paint could be deposited onto the road 2 depending upon the speed of the vehicle 1. For example, a slow moving vehicle 1 would deposit a greater amount of paint than a faster moving vehicle 1 with a constant dispensing rate.

Like known devices, the apparatus of the present invention uses a predetermined path, map, or image for the paint dispenser of vehicle 1 to follow. A significant difference between the apparatus and known devices, however, is how the predetermined path is obtained. The apparatus creates a digital image of the surface before painting or marking the surface. A crude image is scanned (the image is mapped) and then an enhanced version is reprinted over the original crude image. The apparatus also mathematically models the predetermined path using sampled geographical data of the original mark path. The sampled data are obtained using a GPS.

The apparatus also uses any conventional paint (or other material) to place (paint or deposit or apply) the marking on the road 2. The material need not be modified. Some conventional devices modify the marker material in order to function. For example, U.S. Pat. No. 4,219,092 discloses using a radioactive paint as the marker material. The radioactive emission of the paint is then differentially detected by the vehicle and used to guide the vehicle along the predetermined path. It is an advantage of the apparatus according to the present invention, of course, that the material need not be modified.

Other conventional devices convert a drawing pattern produced from an application drawing program into a geographically defined image in suitable form for being deposited onto a surface using GPS technology. Still other conventional devices use a drawing tool to draw polygons to define geographical areas of interest for farming or other applications. The apparatus according to the present invention does not require a drawing pattern, and in fact can create the actual mark path for other purposes.

One of those other purposes is the creation of another parallel path which is derived from the original continuous mark path. The apparatus calculates a parallel path displaced from the calculated continuous mark path which was derived from the sampled original roadway mark. For example, having the calculated continuous mark path such as the center line of a roadway, a positional offset can be used to calculate another mark path which parallels the center line. This second mark path could be the roadway side mark line. An advantage of the apparatus is that only one roadway mark is required.

Potential applications for the apparatus and method of the present invention are many and varied. The primary application is, of course, re-painting of demarcation line marks on roads. Related applications include the deposition of replacement marks on highways, parking lots, air landing fields, pathways, or walkway structures designed for vehicular, foot, or other traffic. In addition to marking pavement, the apparatus and method can re-mark a playing field for a sport such as football.

The apparatus and method can also be applied to assist snow plows, specifically by providing a snow plow truck guidance system. Such a system can guide a vehicle 1 having a snow plow along a roadway. The GPS-based locator samples discrete geographical location data of a pre-existing roadway mark. The computer determines a continuous smooth geographical location function fitted to the sampled geographical location data. An actuator responsive to the GPS-based locator and geographical location function then positions the snow plow.

Another application for the apparatus and method is re-applying or re-depositing a demarcation line mark as a coating on a surface. The coating may be hard or soft, permanent or transitory. The mark may be formed by causing a coating material to extend, impregnate, or penetrate into the surface material; the term "coating" is used in the general sense to include both surface coating and impregnation. Preparatory treatments of the surface material, subsequent treatments of the coated surface material, and other ancillary non-coating operations are also envisioned. Such operations include processes like etching to make the surface more compatible with, or adherent to, the coating. The coating can form lines, stripes, or indicative markings and can contain material particularly adapted to reflect light.

Roadway Mark Locator and Inspection Apparatus

According to another embodiment of the invention, an apparatus for determining the geographical location of a roadway mark 20, 25, 30 from a moving vehicle 1 may include at least one vehicle mounted imager 50, 60 responsive to a trigger signal for imaging at least one roadway mark located substantially parallel to the direction of travel of the vehicle 1; GPS antenna 510; a GPS receiver 22 responsive to the GPS antenna 510 for determining the geographical location of the GPS antenna 15; an apparatus for providing a GPS receiver synchronized image trigger signal to the imager 50, 60; and an apparatus for determining the GPS geographical location of the roadway mark 20, 25, 30 from the triggered roadway mark image and the geographical location of the GPS antenna 510.

Figure 6:
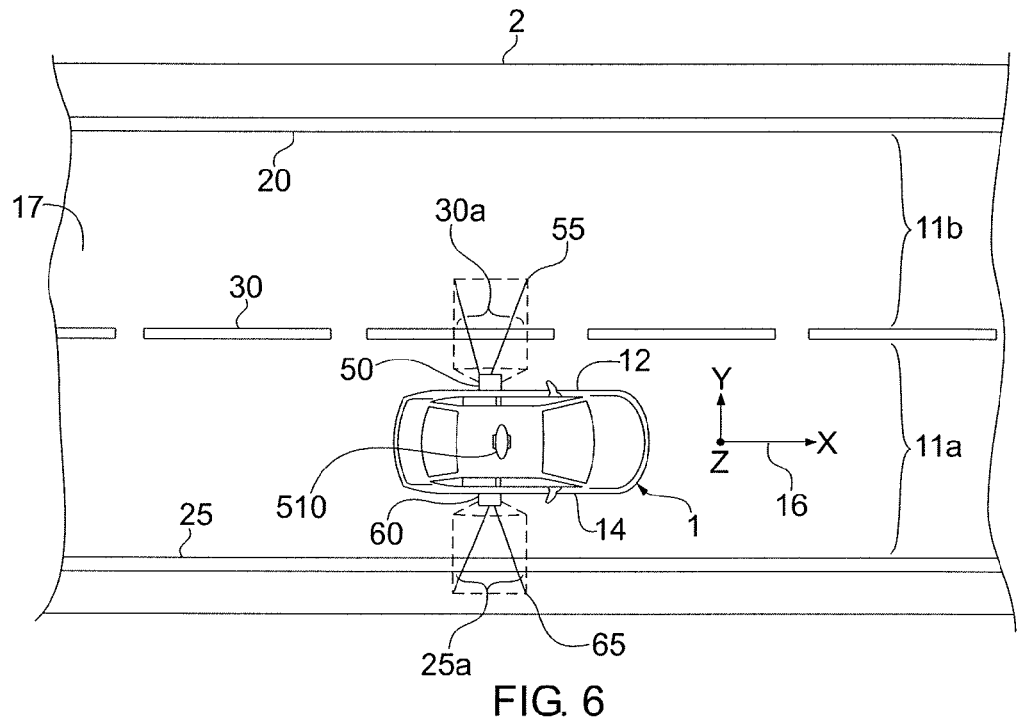
FIG. 6 is a top view of a vehicle having one embodiment of the invention and moving along a roadway lane defined by roadway marks.

FIG. 6 illustrates a top view of a moving vehicle 1 travelling along the x-axis defined by Cartesian coordinate system 16 and within a demarcated traffic lane 11a of roadway 2. Roadway 2 has a paved top surface 17. Traffic lane 11a is demarcated with pre-existing roadway dashed center mark 30 and pre-existing roadway edge mark 25. In addition, a traffic lane 11b is demarcated also by the dashed center mark 30 and roadway edge mark 20. Mark 30 and marks 20 and 25 are located on top surface 17 of roadway 2 and are usually composed of epoxy, paint (with or without reflective glass beads), thermoplastic markings, or other materials commonly used in the roadway marking industry. Marks 30 and 25 are visible from the moving vehicle 1. A left side panel 12 (conventionally referred to as the driver's side for American-built vehicles) of vehicle 1 faces mark 30 and a right side panel 14 (conventionally referred to as the passenger's side for American-built vehicles) of vehicle 1 faces edge mark 25.

Figure 7:
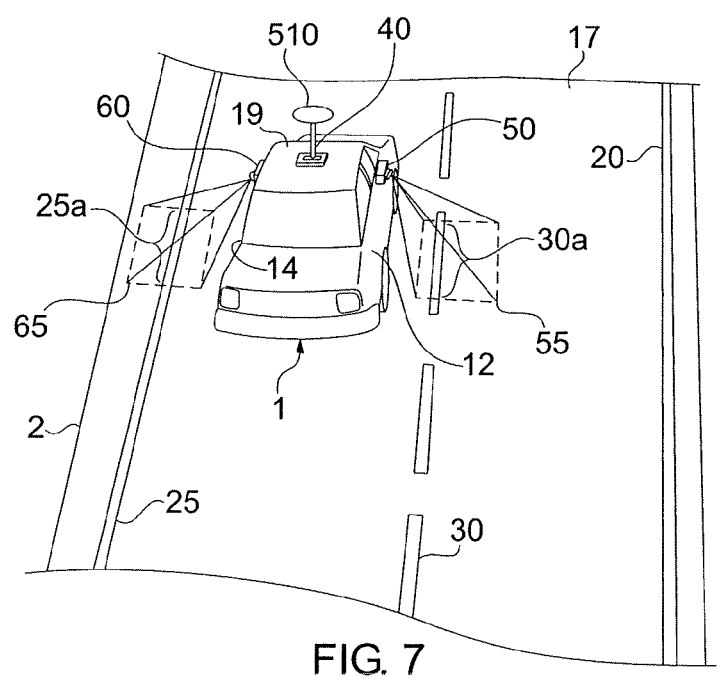
FIG. 7 is a front view of the vehicle shown in FIG. 6 illustrating the placement of the GPS antenna and side mounted imagers.

Referring now to FIGS. 6 and 7, vehicle 1 has a fixed GPS antenna 510 supported above the roof 19 of vehicle 1 by a support 40. The first imager 50 is mounted on the left side of vehicle 1 and is adjustably positioned to image an area 55 of the roadway top surface 17 to the left of the direction of travel of vehicle 1 which includes a section 30a of mark 30. The second side mounted imager 60 is adjustably positioned onto the right side of vehicle 1 to image an area 65 of roadway top surface 17 which includes a section 25a of edge mark 25. Further, it is understood that imagers 50 and 60 could be mounted in any suitable location (e.g., on roof 19 of vehicle 1 in close proximity to the left and right sides of vehicle 1 and similarly positioned to image areas 55 and 65, respectively). The GPS receiver 22 is electrically connected to GPS antenna 510 and is contained within vehicle 1 (GPS receiver 22 is not explicitly shown in FIG. 6 or 7).

The description above refers to the standard direction for vehicular traffic defined for United States roadways. The preferred embodiment also applies to roadways 2 having the direction of vehicle traffic defined opposite that of the United States such as that found in Europe. In this case, second imager 60 would image center mark 30 and imager 50 would image edge mark 20. Further, lane 11b could carry traffic in the opposite direction of vehicle 1, or could be a second lane of a multi-lane highway carrying additional traffic in the same direction as vehicle 1.

Figure 8:
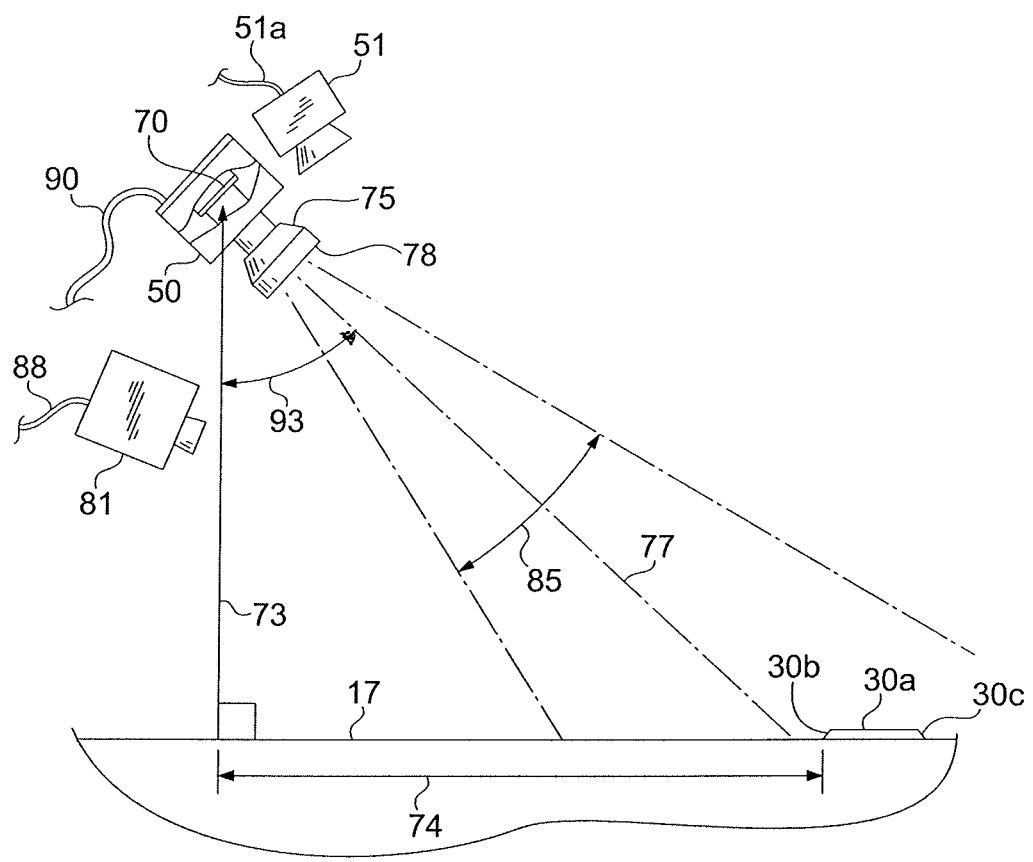
FIG. 8 is a detailed side view of a first imager positioned to image a roadway mark.

Referring now to FIG. 8, a partially cut away side view of imager 50 is shown imaging roadway top surface 17. The adjustable mounting system affixing first imager 50 to vehicle 1 is not shown in FIG. 8 but is further discussed in reference to FIG. 9. The following discussion specifically refers to first imager 50; it should be understood, however, that the discussion also pertains to second imager 60.

Mounted within first imager 50 is an imaging sensor 70. The center of imaging sensor 70 is vertically displaced from roadway top surface 17 by a vector 73 which is normal to roadway top surface 17 and a distance 74 from mark edge 30b. Imaging sensor 70 is preferably a conventional charge-coupled device (CCD) or may be an active pixel complementary metal-oxide-semiconductor (CMOS) sensor, having a square or rectangular array of sensor pixels (not shown). A CCD is a device for the movement of electrical charge, usually from within the device to an area where the charge can be manipulated, for example conversion into a digital value. This movement is achieved by "shifting" the signals between stages within the device one at a time. CCDs move charge between capacitive bins in the device, with the shift allowing for the transfer of charge between bins.

Figure 11:
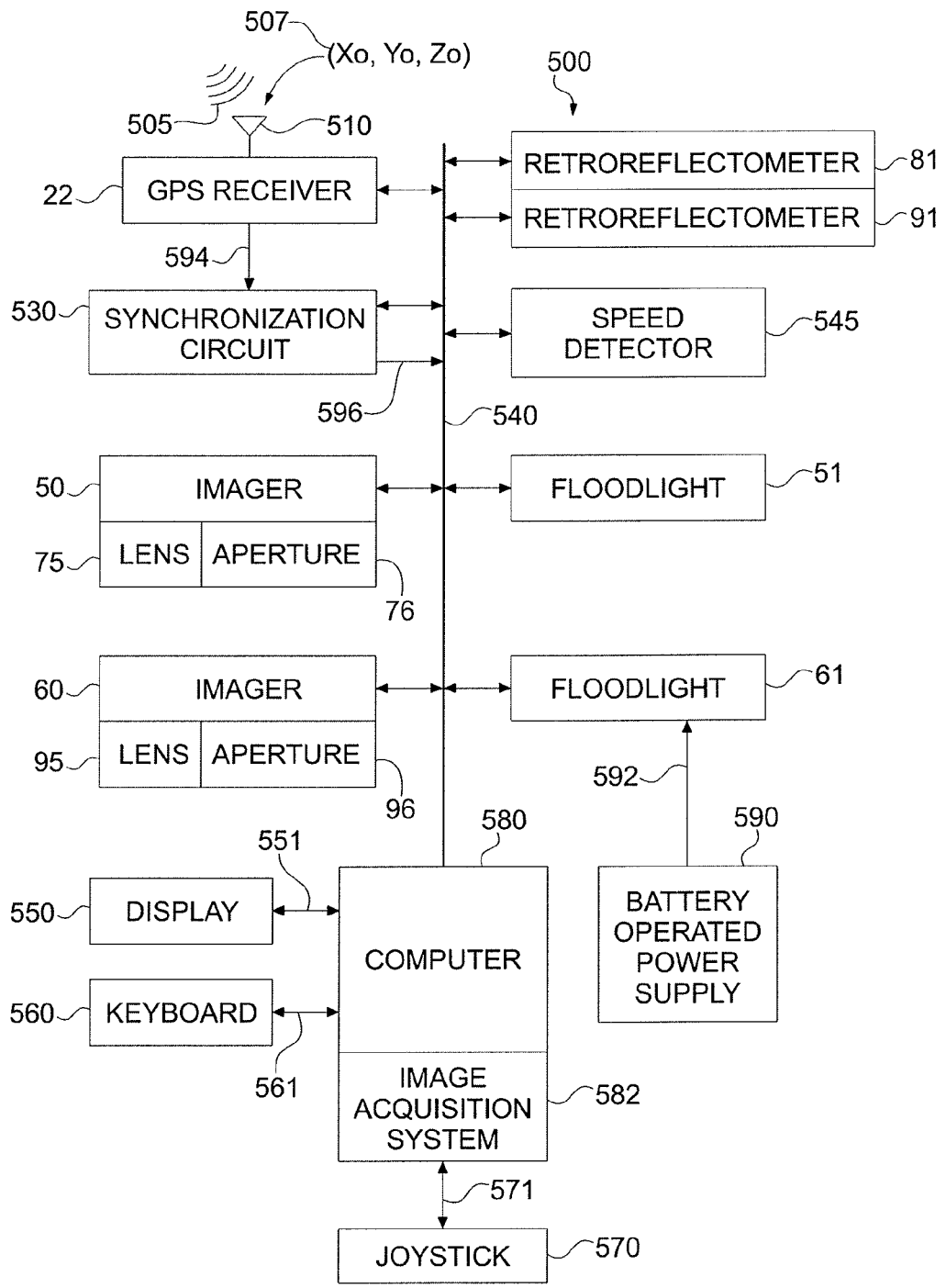
FIG. 11 is a block diagram of one embodiment of the invention.

Affixed to first imager 50 is an electronically adjustable optical lens element 75 having an optical axis 77 and an electronically adjustable aperture 76 (see FIG. 11). Further affixed to lens element 75 is an optical filter 78. An angle 93 defines the acute angle between normal vector 73 and optical axis 77. Preferably, the center of sensor element 70 coincides with optical axis 77. Likewise, affixed to second imager 60 are an electronically adjustable optical lens element 95 (see FIG. 11), an electronically adjustable aperture 96 (see FIG. 11), and an optical filter 97 (not shown but corresponding to the optical filter 78 affixed to first imager 50).

Data and control signals are able to communicate with first imager 50, lens element 75, and adjustable aperture 76 via a flexible cable 90. Cable 90 also includes power cables to supply the necessary electrical power to first imager 50 and electronically adjustable lens element 75 and aperture 76.

Lens element 75 and aperture 76 define an angular field of view 85 of first imager 50 and focus objects within angular field of view 85 onto imaging sensor 70. Angular field of view 85 preferably includes section 30a of roadway mark 30 including mark edges 30b and 30c. Likewise, lens element 95 and aperture 96 define the angular field of view of second imager 60 and focus objects within this angular field of view onto the imaging sensor of second imager 60.

It is noted that roadway mark 30 shown in FIGS. 6 and 7 is a dashed line. Roadway mark 30 could be a solid line, a double solid line, or any mark type currently used on roadways. Likewise, edge marks 20 or 25 could be any mark type currently used on roadways.

Also shown in FIG. 8 is conventional floodlight 51. Floodlight 51 is positioned above first imager 50 and is affixed to left side panel 12 by a conventional mechanism. Floodlight 51 illuminates image area 55 in low ambient light conditions (such as at dusk or night time) so that first imager 50 can distinctly image roadway mark section 30*a* including edges 30*b* and 30*c*.

Another floodlight 61 (see FIG. 11) may be positioned above second imager 60 and affixed to right side panel 14. Floodlight 61 correspondingly illuminates area 65 in low ambient light conditions (such as at dusk or night time). Power to both floodlights 51 and 61 may be provided via power cables 51*a* and 61*a* (power cable 61*a* is not shown), and the on/off state for each floodlight 51, 61 is electrically controlled by conventional mechanisms. When floodlights 51 and 61 are turned on, image areas 55 and 65 are respectively illuminated.

Also shown in FIG. 8 is a retroreflectometer 81. Retroreflectometer 81 is a device capable of measuring the retroreflectivity of materials, for example, by measuring retroreflected light and retroreflective surfaces. Retroreflectivity is an optical phenomenon, well known to one of ordinary skill in the art, in which reflected rays of light are returned in directions close to the opposite of the direction from which the light originated. Retroreflectometer 81 may be positioned below first imager 50 and affixed to left side panel 12 by conventional mechanisms. Retroreflectometer 81 measures the retroreflection of roadway mark section 30*a* and is calibrated to yield accurate and equivalent 30-meter geometry, or any other applicable industry standard, retroreflection measurements. Another retroreflectometer 91 (see FIG. 11) may be positioned below second imager 60 and affixed to the right side panel 14 by conventional mechanisms. Retroreflectometer 91 provides calibrated retroreflection measurements of roadway mark section 25*a*, for example.

Data and control signals communicate with retroreflectometer 81 via flexible cable 88. Cable 88 also includes power cables to supply the necessary electrical power to retroreflectometer 81. A similar cable 98 (not shown) provides data and control signal communication and electrical power to retroreflectometer 91.

The relative position of imaging sensor 70 with respect to GPS antenna 510 is assumed known by conventional mechanisms (e.g., vectorial offsets are determined by conventional mechanisms). Therefore, the GPS position of imaging sensor 70 may be determined by one of ordinary skill in the art. In addition, the relative position of the imaging sensor within second imager 60 with respect to GPS antenna 510 is assumed known by conventional mechanisms, and likewise therefore, the GPS position of the imaging sensor within second imager 60 is known.

Imagers 50 and 60 are calibrated so that the relative location of an actual object within the angular field of view 85 on roadway top surface 17 can be determined with respect to imaging sensor 70. For example, the relative location of edge 30*b* of roadway mark 30 with respect to imaging sensor 70 can be determined. Dimensions of an actual object from its image can also be determined. Conventional camera calibration techniques are known in the art for calibrating imagers to yield accurate object dimensions, locations, and distances of objects to image sensors from images using conventional coordinate transformation algorithms.

Therefore, knowing the relative location of the object (e.g., mark 30) with respect to imaging sensor 70, and the relative location of imaging sensor 70 with respect to the GPS location of GPS antenna 510, allows for the determination of the absolute GPS geographical position of an imaged object (or parts thereof) on roadway top surface 17, such as a roadway mark. Further, the length and width dimensions of the actual object imaged onto imaging sensor 17 can also be determined, such as the length and width dimensions of section 30*a* of roadway mark 30. It is therefore understood that every image pixel has an associated absolute GPS geographical position. For example, all four corners of the image of area 55 have an associated absolute GPS geographical position which corresponds to the actual corners of area 55.

The instant GPS location of any object within the angular field of view 85 of a calibrated first imager 50 is determined assuming that the GPS location data are instantly available when the image from calibrated first imager 50 is acquired. The GPS location of any object within the field of view of a calibrated second imager 60 is also instantly determined in a similar fashion. If the GPS location data are not instantly known when the images from imagers 50 and 60 are acquired because of GPS receiver latency or for other reasons, positional interpolation based upon the known time the images were captured is required.

Figure 9A:
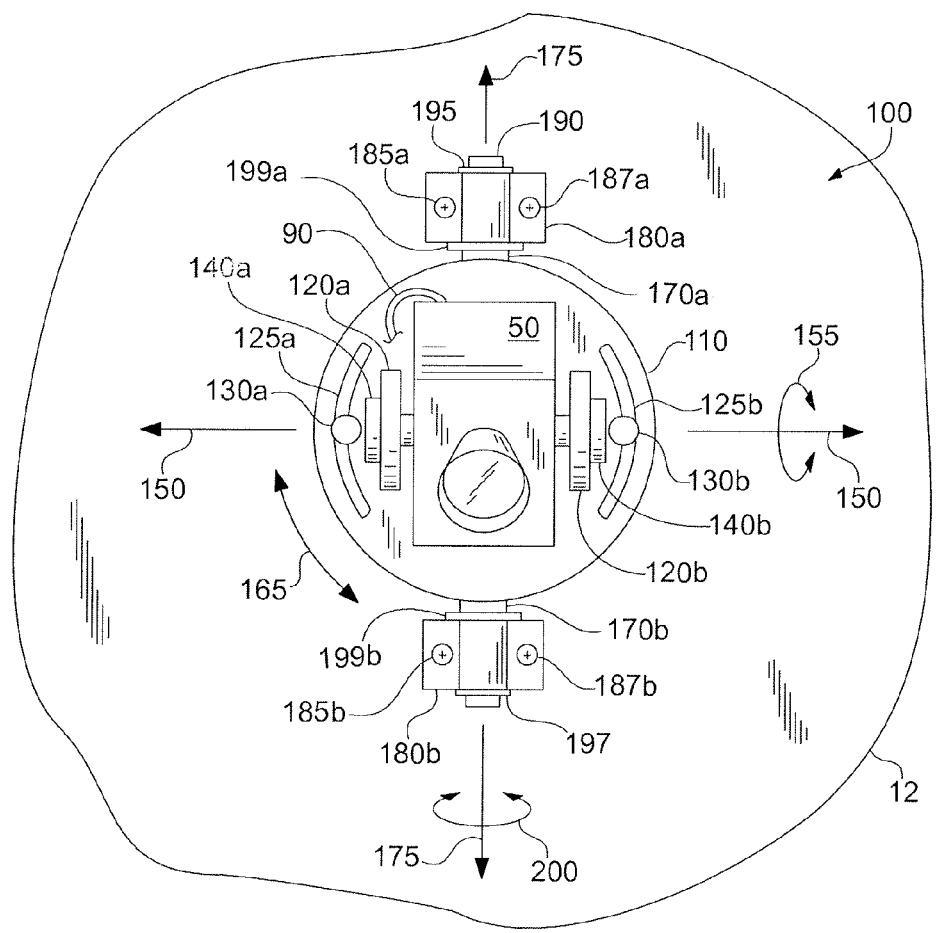
FIG. 9a is a front view of the adjustable imager mount.
Figure 9B:
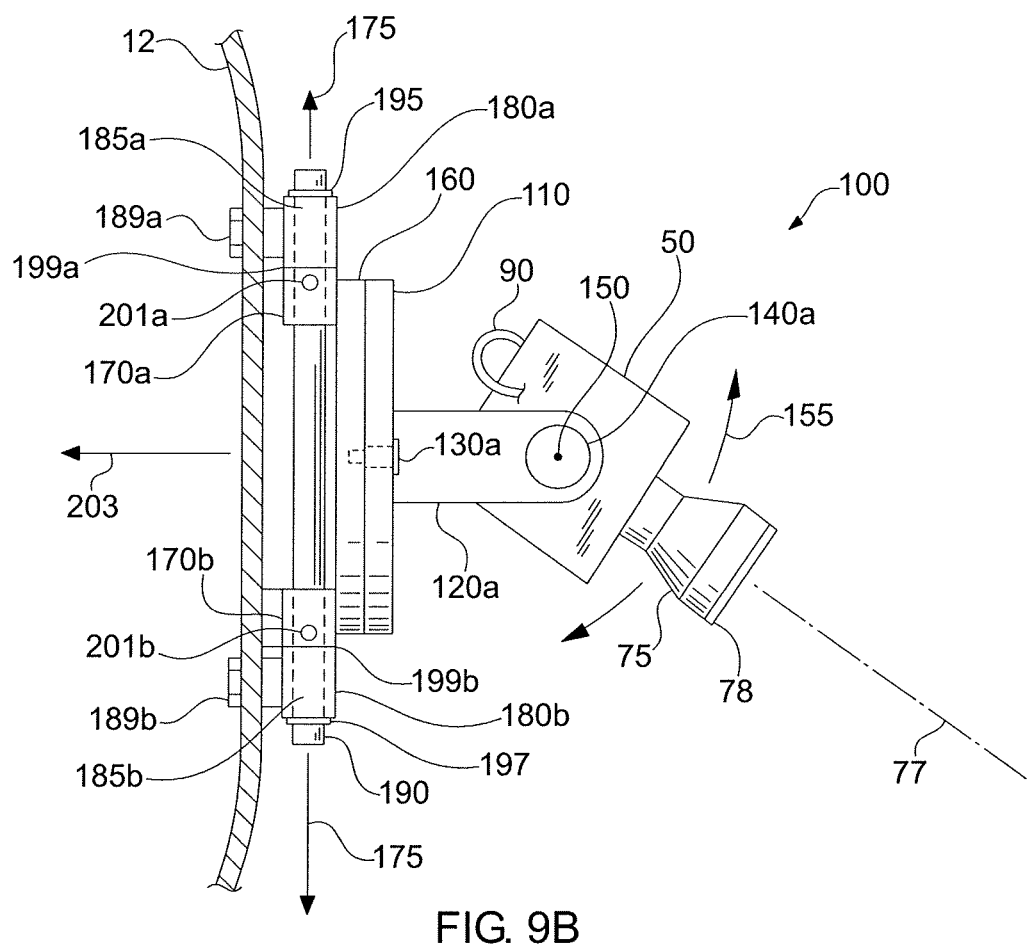

Referring now to FIGS. 9*a* and 9*b*, first imager 50 may be mounted to vehicle left side panel 12 with an adjustable angular mount 100. Angular mount 100 includes cylindrically shaped rotatable mounting plate 110 having fixed imager support brackets 120*a* and 120*b*. Brackets 120*a* and 120*b* extend outwardly from the surface of rotatable mounting plate 110, and are affixed to rotatable mounting plate 110 using conventional attachment mechanisms such as screws, or they may be welded into place (not shown).

Rotatable mounting plate 110 additionally has through slots 125*a* and 125*b* formed to accept shoulder screws 130*a* and 130*b*. First imager 50 is positioned between brackets 120*a* and 120*b* and is held in place with conventional rotatable mounts 140*a* and 140*b*, such that first imager 50 is rotatable around an axis 150 as indicated by rotational arrows 155. First imager 50 is affixed to rotatable mounts 140*a* and 140*b* using conventional attachment mechanisms such as screws (not shown).

Rotatable mounting plate 110 is axially aligned with, and rotatably mounted to, a cylindrically shaped support plate 160. Rotatable mounting plate 110 is affixed to support plate 160 with shoulder screws 130*a* and 130*b*. Loosening screws 130*a* and 130*b* allows rotatable mounting plate 110 to rotate around an axis 203 as indicated by rotational arrows 165. Tightening screws 130*a* and 130*b* affixes rotatable mounting plate 110 to support plate 160 and prevents rotation of rotatable mounting plate 110 with respect to support plate 160.

Support plate 160 has further affixed on its surface facing vehicle left side panel 12 two conventional bearings 170*a* and 170*b*. Bearings 170*a* and 170*b* are aligned along an axis 175 and are affixed to support plate 160 using conventional mechanisms such as screws (not shown). Bearings 170*a* and 170*b* also have through set screws 201*a* and 201*b*.

Affixed to vehicle side panel 12 are two conventional shaft support brackets 180*a* and 180*b*. Conventional machine screws 185*a*, 187*a*, 185*b*, and 187*b* and respective nuts 189*a*, 189*b*, 189*c* (not shown), and 189*d* (not shown) are used to affix shaft support brackets 180*a* and 180*b* to vehicle side panel 12.

Support brackets 180a and 180b, and bearings 170a and 170b, are all aligned along axis 175. A shaft 190 (preferably stainless steel) is inserted through bearings 170a and 170b, and support brackets 180a and 180b, and is affixed to shaft support brackets 180a and 180b by conventional clamps 195 and 197, respectively.

Washers 199a and 199b minimize the frictional contact between the upper outer face of bearing 170a and the bottom outer face of support bracket 180a, and the bottom outer face of bearing 170b and the upper outer face of support bracket 180b, respectively.

Support plate 160 is prevented from rotating around shaft 190 by tightening set screws 201a and 201b. Thus, support plate 160 is able to fixedly rotate about axis 175 as indicated by rotational arrow 200.

Adjustable angular mount 100 provides for three adjustable orthogonal rotations for first imager 50 around axes 150, 175, and 203. First imager 50 can therefore be mounted on a contoured side panel 12 and subsequently aligned to image area 55 and then secured in this aligned position. In addition, adjustable angular mount 100 can be motorized and electronically controlled using a conventional motorized camera mount and externally controlled via a computer and joystick.

It is further understood that other equipment could be used to affix shaft support brackets 180a and 180b to vehicle side panel 12. For example, machine screws 185a, 187a, 185b, and 187b along with respective nuts 189a, 189b, 189c, and 189d could be replaced with other types of attachments for securing shaft support brackets 180a and 180b, and hence adjustable angular mount 100, to left side panel 12 of vehicle 1.

Figure 9C:
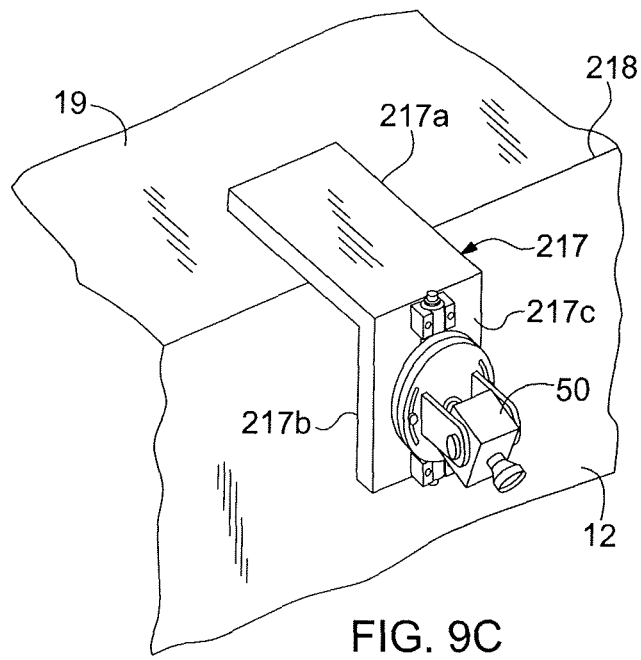
FIG. 9c is a perspective view of an L-shaped bracket used for affixing the adjustable imager mount to the roof of a vehicle.

Still referring to FIG. 9c, adjustable angular mount 100 may also be affixed to vehicle 1 (e.g., to the left side of roof 19 of vehicle 1) using a conventional L-shaped bracket 217. A leg 217a of bracket 217 is attached to roof 19 by a conventional mechanism (for example, by screws or welded into place, not shown). Leg 217a extends beyond a roof line 218 of vehicle 1. A leg 217b of bracket 217 is vertically positioned and provides an outside surface 217c for affixing shaft support brackets 180a and 180b, using conventional attachment mechanisms.

Figure 10:
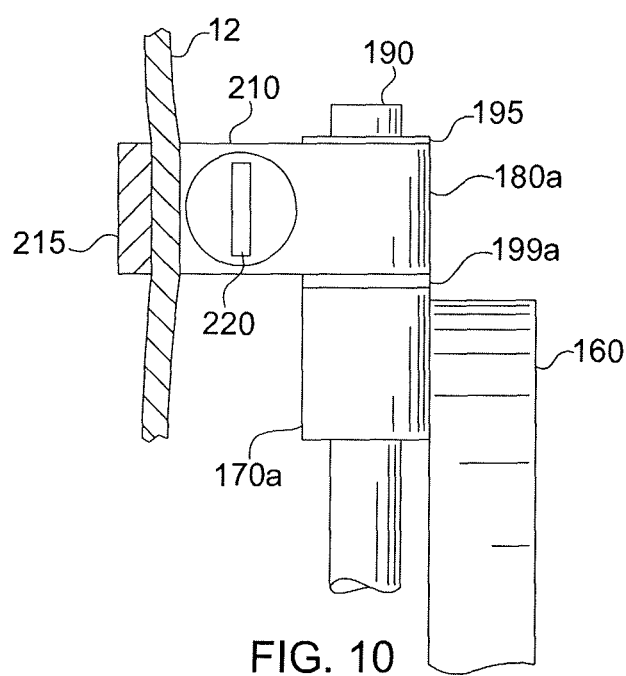
FIG. 10 is a side view of a magnetic clamp for affixing the imager mount to the side of a vehicle.

Referring now to FIG. 10, an example of another mechanism for attaching adjustable angular mount 100 to left side panel 12 is shown. The mechanism includes a conventional releasable magnetic clamp 210 affixed to shaft support bracket 180a. A turning switch 220 directs the magnetic field of magnetic clamp 210 to forcibly attract magnetic clamp 210 to the ferromagnetic metallic vehicle left side panel 12. If the side panel 12 of vehicle 1 is constructed of non-ferromagnetic material, a ferromagnetic strip 215 placed on the inside surface of side panel 12 and oppositely aligned with magnetic clamp 210 is used in combination with the magnetic field of magnetic clamp 210 to affix support bracket 180a. Another magnetic clamp 216 (not shown) is similarly affixed to shaft support bracket 180b. In addition, ferromagnetic strip 215 could also be placed behind window glass of vehicle 1 allowing magnetic clamp 210 to fix adjustable angular mount 100 to the glass surface.

Suction cups could also be used in place of releasable magnetic clamps 210, 216, and are especially advantageous for affixing adjustable angular mount 100 to side window glass. Also, a combination of one magnetic clamp (for affixing to a metallic side of vehicle 1) and one suction cup (for affixing to glass) could be used to affix adjustable angular mount 100. Suction cups could also be used to affix adjustable angular mount 100 on smooth surfaces. A combination of ferromagnetic material and magnetic clamp 210 along with suction cups could also be used to affix adjustable angular mount 100 to side panel 12. It is noted that bracket 217 may also be affixed to roof 19 using one or more magnetic clamps similar in construction to clamp 210, or one or more suction cups, or a combination thereof, in place of the conventional attachment mechanisms.

It is also understood second imager 60 is affixed to right side panel 14 or on the right side of roof 19 of vehicle 1 using similarly constructed mounts (not shown).

Referring now to FIG. 11, a schematic block diagram 500 of a preferred embodiment is shown. The embodiment includes a number of components and systems: GPS antenna 510, GPS receiver 22, programmable synchronization circuit 530, first imager 50, lens element 75, aperture 76, floodlight 51, second imager 60, lens element 95, aperture 96, floodlight 61, a bi-directional communication bus 540, a display 550, a keyboard 560, a joystick 570, a computer 580, a vehicle speed detector 545, retroreflectometers 81 and 91, and a power supply 590 (e.g., battery operated).

GPS receiver 22, synchronization circuit 530, imagers 50 and 60, lens elements 75 and 95, apertures 76 and 96, speed detector 545, floodlights 51 and 61, retroreflectometers 81 and 91, and computer 580 are electrically interconnected, and in communication with each other, for example, via bi-directional bus 540.

Computer 580 is a conventional computer having an image acquisition system 582 for controlling and triggering imagers 50 and 60, and a real-time clock for calculating accurate time intervals (not shown).

In addition, keyboard 560 connects to computer 580 via a dedicated bi-directional connection 561 and provides a way for a user to input data into computer 580. Display 550 connects to computer 580 via dedicated bi-directional bus 551 and provides the user with a visualization of mark images generated by computer 580 and visually displays other information to the user. Joystick 570 connects to computer 580 via a wired connection 571 and is used to control a motorized adjustable angular mount 100.

Display 550, keyboard 560, and joystick 570 are conventional computer peripherals. A conventional mouse is also connected to computer 580 via a cable (not shown). Keyboard 560, display 550, joystick 570, and the mouse could also communicate with computer 580 via a wireless connection or a combination of cable and wireless connections, or connect directly to bus 540 for communicating with computer 580.

GPS antenna 510 receives GPS radio waves or signals 505 which originate from a remote GPS satellite system and/or a GPS-pseudolite array. GPS antenna 510 is conductively connected to the input of GPS receiver 22. Radio waves 505 could also include real time kinematic (RTK) service provider signals (not shown). RTK satellite navigation is a technique used to enhance the precision of position data derived from satellite-based positioning systems. The technique can be used in conjunction with GPS, GLONASS, and/or Galileo. It uses measurements of the phase of the signal's carrier wave, rather than the information content of the signal, and relies on a single reference station to provide real-time corrections, providing up to centimeter-level accuracy. With reference to GPS in particular, the system is commonly referred to as Carrier-Phase Enhancement, or CPGPS.

GPS receiver 22 determines the time and geographical location 507 of antenna 510 at a periodic rate programmed by computer 580, or receiver 22 can be polled by computer 580 for positional and time information. Positional and time information from GPS receiver 22 is placed onto bus 540.

Figure 12:
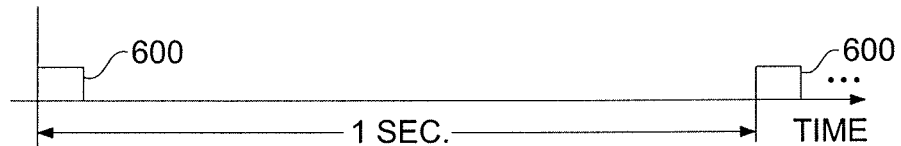
FIG. 12 is a timing diagram illustrating a periodic GPS receiver timing pulse.

Referring to FIG. 12, GPS receiver 22 also outputs a periodic pulse signal 600 onto line 594 which flows to an input connection of synchronization circuit 530. The time of occurrence of periodic pulse signal 600 is accurately known. For example, the Trimble GPS receiver model number BD982 provides a one pulse per second (1 pps) signal 600 with a corresponding ASCII formatted Universal Time Coordinated (UTC) time tag (i.e., the exact time of pulse occurrence).

Figure 13:
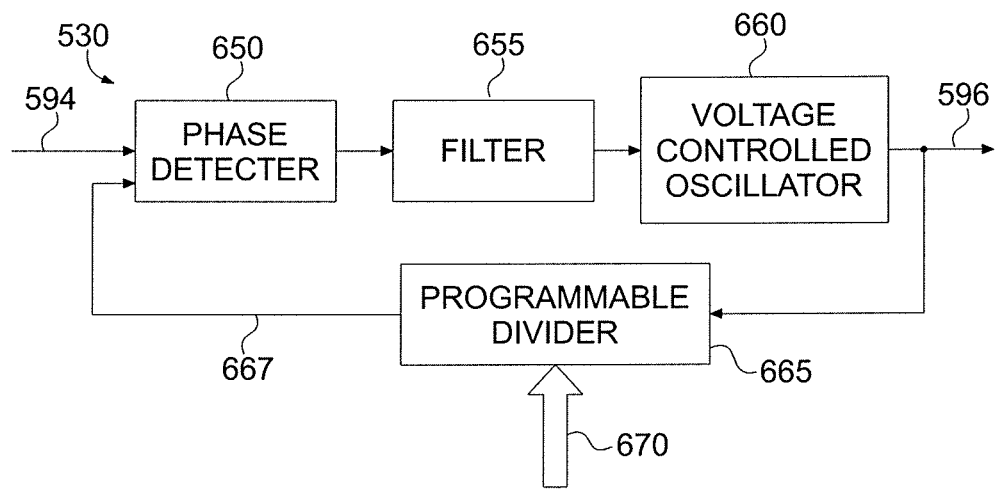
FIG. 13 is a block diagram of a phase lock loop having a programmable divider inserted into the phase lock loop feedback signal path.

Referring to FIG. 13, synchronization circuit 530 comprises a conventional phase lock loop circuit (having a phase detector 650, a low pass filter 655, and a voltage controlled oscillator 660) and a programmable divider circuit 665 inserted into the phase lock loop feedback path 667.

Programmable divider 665 is programmed to divide the period of signal 600 placed onto line 594 by an integer number represented by a binary digital signal 670 input from bus 540. Signal 670 is placed onto bus 540 by computer 580. The output signal from the voltage controlled oscillator 660 is placed onto a line 596 which then flows via bus 540 to the trigger input of image acquisition system 582 contained within computer 580.

Figure 14:
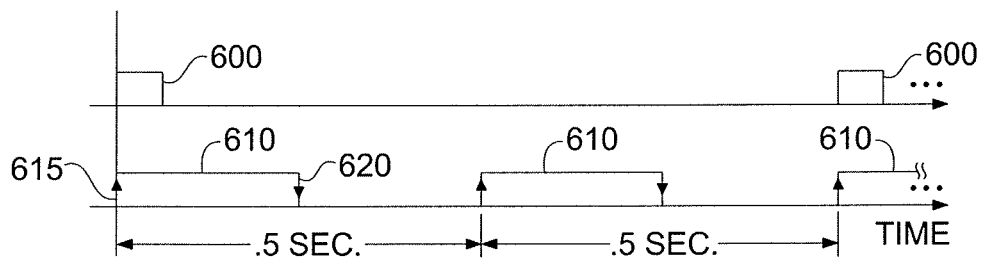
FIG. 14 is a timing diagram illustrating a periodic GPS receiver timing pulse and synchronization circuit output.

For example and referring now to FIG. 14, an eight-bit programmable divider (divide by N counter) 665 programmed with binary digital signal "00000010" (which represents a divider integer value of 2) causes programmable divider 665 to divide the period of signal 600 by 2. This produces a periodic signal 610 which is twice the frequency of signal 600. For example, for a one pulse per second signal 600 and a divide by 2 integer value programmed into programmable divider 665 a periodic signal 610 is produced having a frequency of 2 pulses per second (period equals 0.5 seconds) which will be output from voltage controlled oscillator 660 and placed onto line 596.

The phase lock loop also maintains excellent frequency tracking to strobe periodic pulse signal 600. Thus knowing the time of occurrence of signal 600 and the divider integer defines the exact time of when the rising edge 615 of periodic pulse signal 610 occurs. Thus, synchronization circuit 530 can be programmed via computer 580 for producing periodic signals 610 having an equal or higher frequency as, and synchronized with, signal 600.

An example of a phase lock loop is a 74HC4046 integrated circuit. The phase lock loop function can also be implemented in software, or a combination of software and hardware.

In response to trigger signal 610, image acquisition system 582 simultaneously triggers imagers 50 and 60 to capture images of areas 55 and 65, respectively. Captured images of areas 55 and 65 are then subsequently stored in a computer data memory 720 (see FIG. 15). As discussed below, along with each captured image are an image index number, time, and an interpolated GPS geographical position. It is assumed that the imagers 50 and 60 are triggered on the rising edge 615 of signal 610, although imagers 50 and 60 could also be triggered on the falling edge 620 of signal 610.

Triggering imagers 50 and 60 at an equal or higher frequency than the frequency of signal 600 provides for one or multiple images 55 and 65 of roadway surfaces for every pulse 600. As an example, having computer 580 program divider circuit 665 with an equivalent integer value of 2 results in synchronization circuit 530 producing a triggering signal 610 which is twice the frequency of signal 600 as shown in FIG. 14.

Speed detector 545 determines the speed of vehicle 1 which may be determined by conventional mechanisms such as an electronic speedometer. The speed of vehicle 1 may also be determined by computer 580 from the known distance travelled using GPS coordinates and the time it takes for vehicle 1 to travel the known distance.

Battery operated power supply 590 provides electrical power to all block diagram 500 components via a power bus 592 and is preferably operated from an internal battery (not shown) of the vehicle 1. Power supply 590 may provide both AC and DC power.

Figure 15:
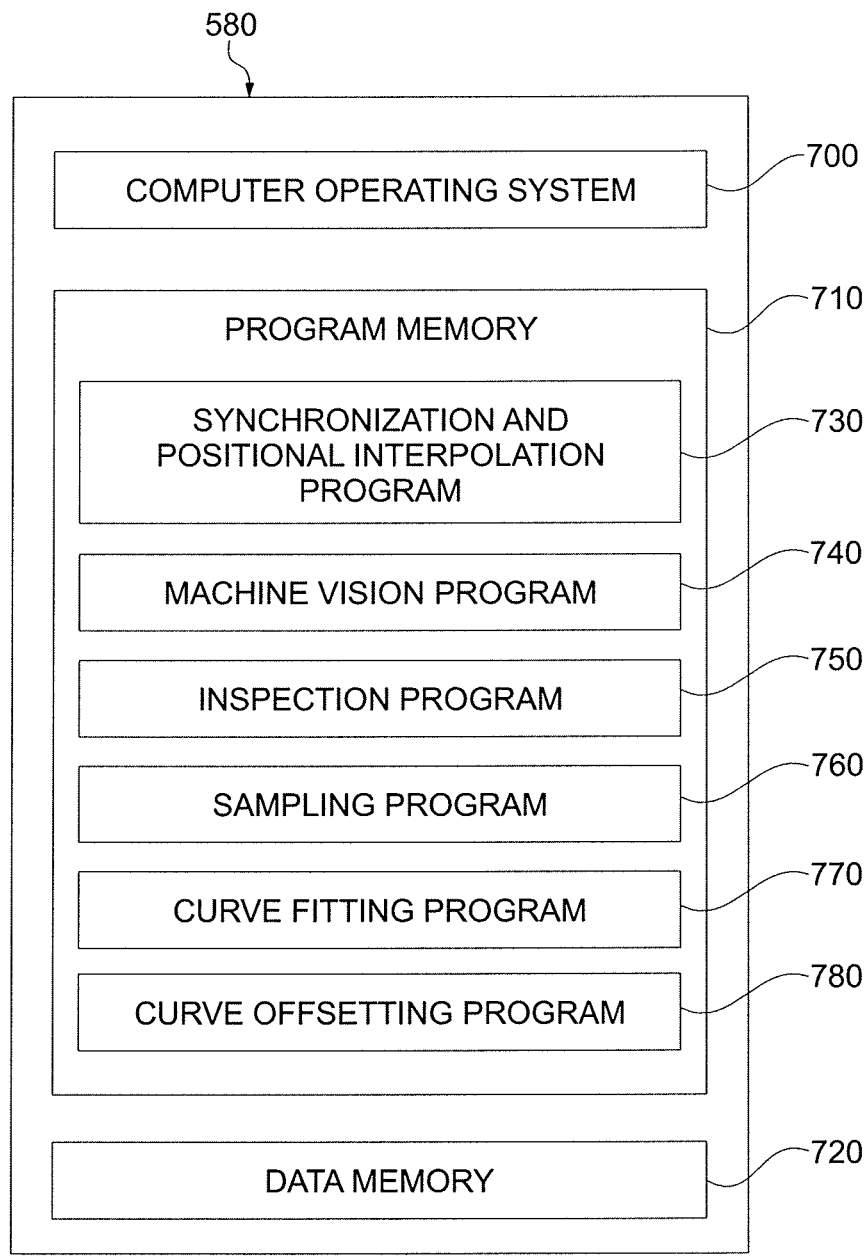
FIG. 15 is a block diagram illustrating a computer used in the present invention, which includes a computer operating system, program memory, and data memory.

Referring now to FIG. 15, computer 580 further includes a computer operating system software 700, program memory 710, and data memory 720. Operating software 700 is a conventional operating system (OS) such as Windows 7 manufactured by Microsoft, a Unix-based OS, or an Apple Computer OS system. Data memory 720 is a conventional computer read-write memory. For example, data memory 720 could include separately or in combination conventional solid state drive(s), high-speed hard disk drive(s), and/or random access memory (RAM). Program memory 710 comprises a synchronization and positional interpolation program 730, a machine vision program 740, an inspection program 750, a sampling program 760, a curve fitting program 770, and a curve offsetting program 780.

Synchronization and positional interpolation program 730 corrects for time latency in GPS receiver 22 (discussed below and with reference to FIG. 16) and therefore determines the accurate GPS geographical position for each captured image. In addition, synchronization and positional interpolation program 730 determines the GPS derived time-tag and provides a sequential image index number for each captured image. These data are then stored into data memory 720.

Figure 16:
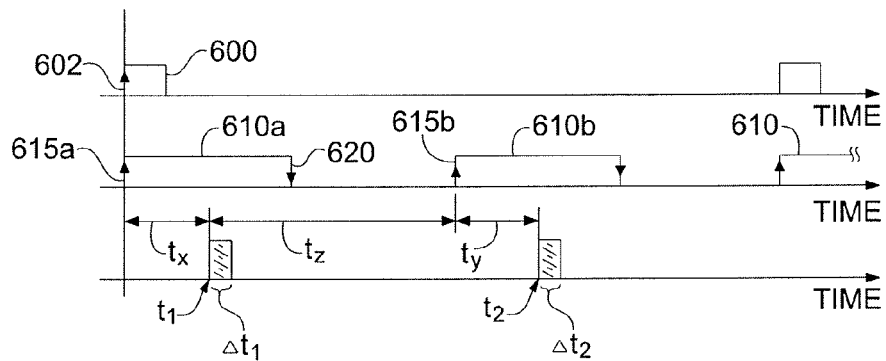
FIG. 16 is a timing diagram showing GPS receiver time latency.

Referring now to FIG. 16, periodic pulse signal 600 along with synchronized periodic signal 610 is shown. The rising edges (first two rising edges 615a and 615b are shown) of synchronized periodic signal 610 (the first two pulses are indicated as 610a and 610b) are used to trigger image acquisition system 582 thereby acquiring images of areas 55 and 65 from imagers 50 and 60, respectively. At instant time t1 GPS receiver 22 acquires GPS geographical positional and GPS time data. These data are available during time interval $\Delta t1$ after the positional and time data are acquired at instant time t1. Instant time t1 could occur at the rising edge 602 of periodic pulse signal 600 and would therefore be synchronized to periodic pulse signal 600, or it could be delayed by time interval tx from rising edge 602 of periodic pulse signal 600. The time interval $\Delta t1$ is defined as the time latency which occurs because GPS receiver 22 needs calculation time to compute the GPS time and GPS geographical location values from satellite signals 505, or for other reasons.

Likewise, at instant time t2 GPS receiver 22 acquires GPS geographical positional and GPS time data. Instant time t2 could be delayed by time interval ty from rising edge 615b of trigger signal pulses 610b. The time interval $\Delta t2$ is defined as the time latency associated with instant time t2. These data are available during time interval $\Delta t2$ after the positional and time data are acquired at instant time t2. Instant time t2 could occur at a preset time interval after t1, or instant times t2 and t1 could occur periodically. In either case, there is a possibility that image trigger signal pulses 610a and 610b are not synchronized with instant time t1 or instant time t2, and therefore the exact GPS geographical position of the image is not known within a high degree of positional accuracy.

Accurate GPS coordinates for the images of areas 55 and 65 from imagers 50 and 60, respectively, are determined at rising edge 615b by first determining the time interval (t2−t1) and the GPS geographical positional difference (or equivalent positional differences in ENU coordinates). Knowing the UTC time-tag of rising edge 615b of pulse 610b yields the time interval tz. Knowing tz and the time interval (t2−t1), a simple linear interpolation is used to determine the geographical position of the images which are triggered by rising edge 615b.

The GPS location of images triggered by rising edge 615b equals the time interval tz divided by the time interval (t2−t1) times the geographical positional difference corresponding to times t2 and t1, plus the geographical position at t1. This process is repeated for subsequent images.

Figure 17:
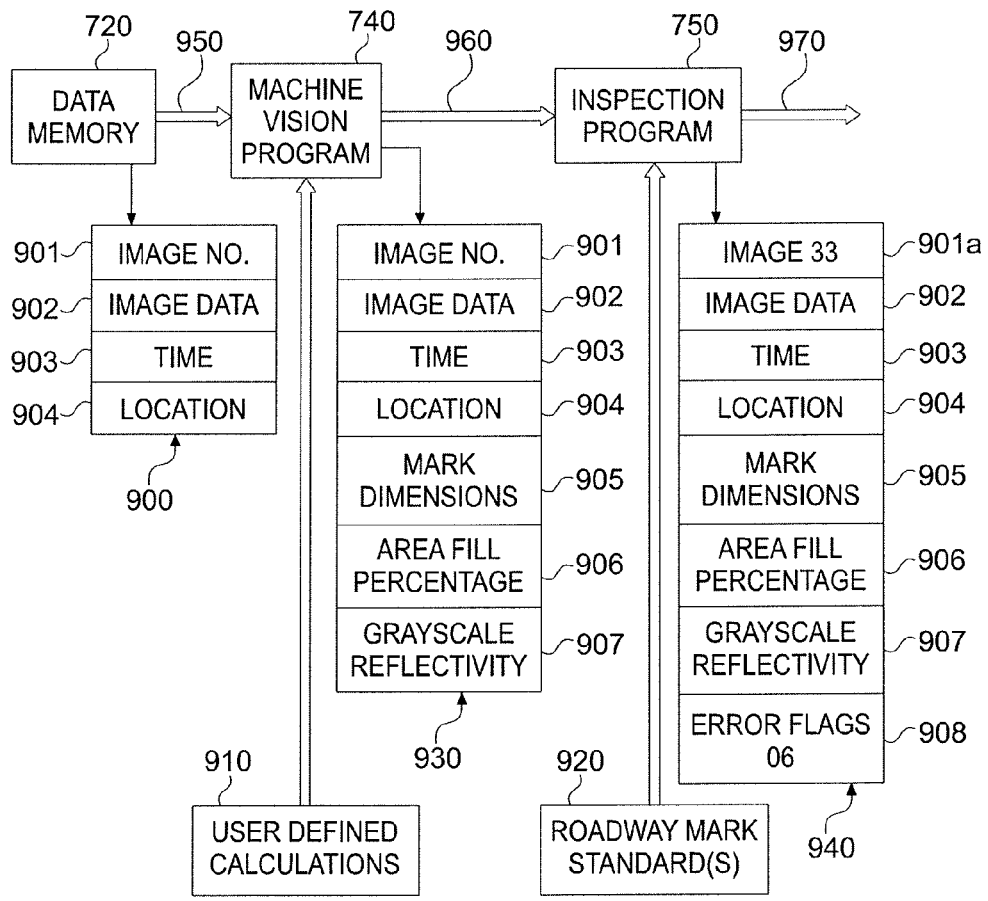
FIG. 17 is a schematic block diagram showing the data input and data output of the machine vision and inspection programs.

Referring to FIG. 17, each triggered image from imagers 50 and 60 therefore has a data block 900. Data block 900 includes an associated image index number 901 sequentially identifying the captured images, the actual captured image data 902 of the roadway area (which may or may not include a roadway mark), a GPS derived time-tag 903 (i.e., the time the images were acquired), and an associated accurate GPS geographical location 904—all of which are stored in data memory 720 by synchronization and positional interpolation program 730. Data block 900 is then passed to machine vision program 740 as indicated by arrow 950.

Machine vision program 740 includes a number of machine vision algorithms which are selected by the user-defined calculations input 910 to perform desired calculations on image data 902. The calculations may include, for example, edge detection, geometric computations and distance computations of imaged objects, and other generic machine vision calculations. For example, machine vision program 740 includes algorithms which the user selects by user-defined calculations input 910 to determine the roadway mark edges within the field of view of imagers 50 and 60 (for example edges 30b and 30c); the actual width and length dimensions and the absolute GPS location of the roadway mark from the roadway mark image; and other roadway mark characteristics such as the area of the roadway mark.

Machine vision program 740 also includes algorithms which the user may select using user-defined calculations input 910 to determine, using the grayscale values of the acquired images, the reflectivity of the roadway mark, the reflectivity of the surrounding roadway surface, and the relative difference between the reflectivity of the roadway mark and reflectivity of the surrounding roadway surface. Grayscale images may include images where the value of each pixel is a single value which will ultimately be interpreted by some rendering platform as values (such as intensities) to be displayed (or analyzed). Displayed images of this sort are typically composed of shades of gray (hence the moniker "grayscale") although any color (or, indeed, different colors) can serve in this regard. For any particular grayscale standard, there is a given available range of grayscale level values. For example, a given grayscale standard might represent a range of black at the weakest intensity to white at the strongest intensity. Thus, for example, an image of section 30a of roadway mark 30 may have a value of 220 (very "white") based upon a grayscale value of 0-255 (assuming an 8-bit intensity quantization), while the surrounding roadway surface (such as asphalt-macadam) may have a value of 20 (very "black"), yielding a grayscale contrast difference of 200 between roadway mark section 30a and the surrounding roadway surface.

Machine vision program 740 also includes algorithms to compare the grayscale values of the images of the roadway and roadway mark with a predetermined threshold value. If the grayscale values are below this predetermined threshold value, machine vision program 740 turns on floodlights 51 and 61 to better image the roadway and roadway marks under low ambient light conditions.

Other roadway mark characteristics include the reflectivity of the roadway mark 20, 25, 30, the reflectivity of the surrounding roadway top surface 17, and the relative difference between the reflectivity of the roadway mark 20, 25, 30 and the reflectivity of the surrounding roadway top surface 17. As used in this document, "reflectivity" may refer to the fraction of incident light that is reflected by the surface (e.g., the roadway mark 20, 25, 30 or the roadway top surface 17).

Machine vision program 740 further includes algorithms which may also be selected by user-defined calculations input 910 to determine the area "fill percentage" using the grayscale values of the roadway mark. For example, the "fill percentage" may be defined as:

$$\frac{\text{Total area of roadway mark} - \text{missing area}}{\text{Total area of roadway mark}}$$

In other words, the fill percentage may be based on the relationship between the portion of the mark 20, 25, 30 that is not filled (e.g., without paint) as compared to the total area of the mark 20, 25, 30 that should be completely filled (e.g., defined by the outer perimeter of the intended or original mark 20, 25, 30).

Figure 18A:
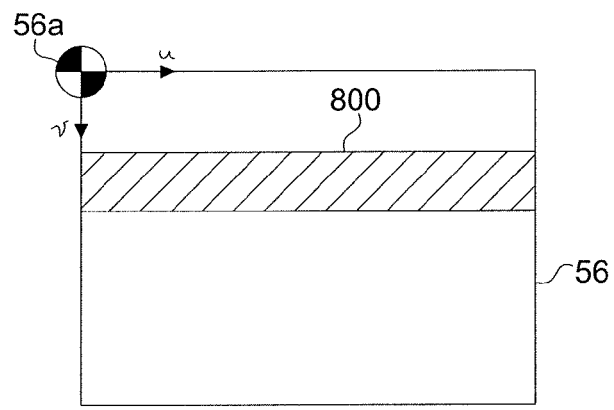
FIG. 18a is an image of a roadway mark having 100% area fill.
Figure 18B:
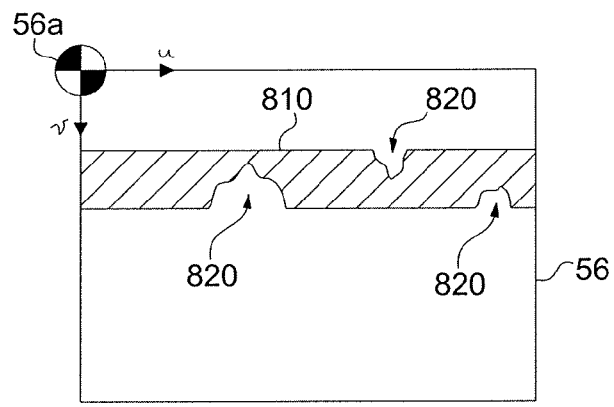
FIG. 18b is an image of a roadway mark having less than 100% area fill.

For example, FIG. 18a illustrates an image 56 of area 55 having an imaged roadway mark segment 800 having an imaged roadway mark area fill percentage of 100%. FIG. 18b illustrates an image 56 of area 55 having an imaged roadway mark segment 810 with partially worn-away portions 820 and having an imaged roadway mark area fill percentage of less than 100%.

Machine vision program 740 additionally includes algorithms to define the equivalent absolute GPS coordinates of the corners of the image (and hence the absolute GPS coordinates of the corners of area 55). For example, in FIG. 18a the absolute GPS coordinates of the upper left hand corner of image 56 is determined and an image corner referenced coordinate system 56a having image axes u-v can be defined.

Machine vision program 740 additionally includes algorithms which may also be selected by user-defined calculations input 910 to compute the lateral distances (i.e., in the y direction of coordinate system 16) between roadway marks and can determine, for example, the width of lane 11a and/or the lateral spacing between double roadway marks, or the widths of the roadway marks. Machine vision program 740 may also be programmed by user calculations input 910 to input retroreflection data from retroreflectors 81 and 91.

Machine vision program 740 subsequently expands the original data block 900 to now include the desired user-defined calculations 910 in addition to the original data contained within data block 900. For example, data block 900 is now expanded to include roadway mark dimensions 905 (for example, roadway mark width and length), area fill percentage 906, and grayscale reflectivity values 907, all of which are now grouped within a data block 930 and subsequently stored in data memory 720. If retroreflection data are required, data block 930 is further expanded to include retroreflection data. Other data may be included in data block 930, such as lane width etc. Data block 930 and user defined calculations 910 can be further stored in memory 720.

Figure 19:
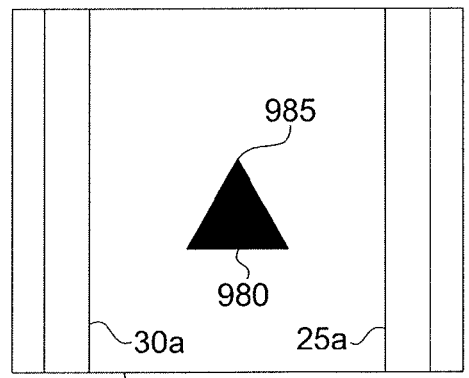
FIG. 19 illustrates the computer display showing an image of the roadway center and edge marks along with an arrow representing the vehicle location relative to the two marks.

Referring to FIG. 19, machine vision program 740 also combines the captured images from imagers 50 and 60 and outputs merged image 990 to display 550 via computer 580 using the absolute GPS coordinates of the roadway marks and the location of GPS antenna 510 with respect to the center of vehicle 1. Positional offsets between GPS antenna 510 and imagers 50 and 60 have been previously determined by conventional mechanisms.

The merged image 990 consists, for example, of roadway mark 30 imaged section 30a and roadway mark 25 imaged section 25a with vehicle 1 being represented as a triangle 980 having a tip 985 indicating the direction of travel of vehicle 1. As vehicle 1 moves laterally between sections 30a and 25a, triangle 980 likewise laterally moves between imaged sections 30a and 25a. Merged image 990 correctly represents the lateral distance between sections 30a and 25a with respect to the lateral location of vehicle 1.

Data block 930 is then passed to inspection program 750 as indicated by an arrow 960.

Inspection program 750 inputs both data block 930 and user-defined roadway mark standards data 920, and further performs a comparison between the data stored in data block 930 and roadway mark standards data 920. Any roadway mark which does not meet the defined roadway mark standards data 920 is flagged with a code and stored in error flags section 908 of a data block 940.

For example, data block 940 is shown as the output of inspection program 750 having the image index number 901a as number "33." Appended to data block 930 is error flags section 908. Stored within error flags section 908 is the error flag "06," which indicates that the roadway mark derived from image 33 did not meet, for example, the roadway mark width standard. All data which fail the comparison between the data stored in data block 930 and the roadway mark standards data 920 are stored in data memory 720 as indicated by an arrow 970 for later analysis and remedial work.

Sampling program 760 receives a GPS reference location from GPS receiver 22 and constructs an orthogonal Cartesian (or other conventional) coordinate system (grid system) having the origin defined at the reference location. For example, Cartesian coordinate system 16 could be a conventional ENU coordinate system. Sampling program 760 samples the geographical location of the pre-existing roadway mark based upon either a distance or time sampling interval. The distance sampling interval can be determined by computer 580 from the GPS coordinates of GPS antenna 510 computed by GPS receiver 22 or by other mechanisms described in this document or known in the art. The time sampling interval can be determined either from the internal time base of computer 580 or from GPS time computed by GPS receiver 22, or other time bases.

Curve fitting program 770 inputs discrete GPS coordinate data previously stored in data memory 720 and determines a first continuous mathematical function which best fits the discrete GPS coordinate data. Curve offsetting program 780 inputs the continuous function determined by curve fitting program 770 and generates a second continuous function similar and parallel to the first function but offset from the first function by a given distance. For example, the first function may represent the roadway mark 30 on roadway 2. A second function defining a line for roadway edge mark 25 may be derived from the first function by offsetting the first function by a distance, or the first function may represent a roadway edge mark 20 and the roadway mark 30 may be derived from the first function by offsetting the first function by a distance.

In operation, the operator of vehicle 1 inputs the desired user-defined calculations 910 using keyboard 560 and begins to travel on roadway 2 maintaining vehicle 1 within lane 11a defined by roadway demarcation marks, for example, center mark 30 and roadway side mark 25. It is assumed at this point that power supply 590 is turned on and supplying power via bus 592 to the respective components discussed above. With power applied via bus 592, all components begin operating. In response to supplied power, GPS receiver 22 begins to input signals 505 from GPS antenna 510 and starts to calculate GPS geographical location 507 and time-tag information. GPS receiver 22 also generates periodic pulse signal 600 which flows onto line 594 to synchronization circuit 530.

At a chosen position for beginning to inspect the left and/or right side roadway marks and/or determine the geographical location of the pre-existing roadway marks, the user depresses a "Start" key on keyboard 560 which communicates this key selection to computer 580 via connection 561. Computer 580 then inputs speed data of vehicle 1 from speed detector 545 (or alternatively uses the differences in vehicle GPS position and time data from GPS receiver 22 to compute vehicle speed).

In response to the speed of vehicle 1, computer 580 programs programmable divider circuit 665 of synchronization circuit 530 via signals 670 placed onto bus 540. In response to programmed divider circuit 665, synchronization circuit 530 outputs periodic signal 610 onto line 596 which flows via bus 540 to image acquisition system 582 contained within computer 580. In response to periodic signal 610, image acquisition system 582 triggers imagers 50 and 60 to capture roadway mark areas 55 and 65, respectively.

In response to the speed of vehicle 1, programmed divider circuit 665 insures that the frequency of the trigger periodic signal 610 is sufficient to trigger imagers 50 and 60 at a rate to acquire overlapping images so that a continuous image of the roadway mark path is obtained so that there are no missing sections of the roadway mark.

It is further noted that by having the frequency of image-triggering periodic signal 610 programmable and dependent upon the speed of vehicle 1 insures that efficient use of data memory 720 occurs when storing image data. For example, vehicle 1 may be stopped at a traffic light or experience significant variations in vehicle speed as might occur in stop-and-go traffic. Adjusting the frequency of image-triggering periodic signal 610 as a function of the speed of vehicle 1 insures that at lower vehicle speeds fewer roadway images are taken while at higher vehicle speeds many more roadway images are taken while still maintaining sufficient image overlap so that there are no missing sections of the roadway mark and the complete and entire roadway mark and mark path has been imaged.

Synchronization and positional interpolation program 730 corrects the positional data of each roadway image for GPS receiver 22 latency to insure an accurate geographical position for each roadway image, sequentially numbers each captured image with image index number 901, and then stores index number 901, captured image data 902, time of image acquisition 903, and corrected GPS geographical location 904 of the roadway mark as data block 900 into data memory 720.

Machine vision program 740 then inputs the images stored in data block 900 format indicted by arrow 950, performs geometric calculations and determines the width and length of the roadway mark, grayscale reflectivity, fill percentages, and other roadway mark characteristics as defined by user-defined calculations input 910. The original data stored in data block 900 for each image are now expanded to include mark dimensions 905, area fill percentage 906, and grayscale reflectivity values 907 and any other user-defined calculations input 910 forming data block 930. Data block 930 may also be stored in memory 720. In addition, machine vision program 740 displays merged image 990 which is subsequently viewed by the operator.

Inspection program 750 inputs data block 930 as indicated by arrow 960 and also inputs user-defined roadway mark standards data 920. Inspection program 750 then compares the data contained within data block 930 with the corresponding data contained within roadway mark standards data 920. Any roadway mark not meeting the desired standards is flagged and saved to data memory 720 as indicated by arrow 970.

Sampling program 760 then samples the geographical position of the imaged roadway mark. Curve fitting program 770 inputs the sampled GPS coordinate data previously stored in data memory 720 and determines a first continuous mathematical function which best fits the discrete GPS coordinate data. Curve offsetting program 780 inputs the continuous function determined by curve fitting program 770 and generates a second continuous function similar and parallel to the first function but offset from the first function by a given distance. For example, the first function may represent the roadway mark 30 on roadway 2. A second function defining a line for roadway edge mark 25 may be derived from the first function by offsetting the first function by a distance, or the first function may represent roadway edge mark 20 and roadway mark 30 may be derived from the first function by offsetting the first function by a distance.

The continuous function(s) determined by curve fitting program 770 and/or curve offsetting program 780, along with roadway mark characteristics, are then used by a GPS roadway marker as previously described to replicate the original roadway mark 20, 25, 30 onto the repaved roadway top surface 17.

Thus, the geographical position of roadway marks 20, 25, 30 which do not meet the desired roadway mark standards can be identified and the GPS geographical position known and later used for remedial work. The roadway mark GPS geographical position can also be used to remark the repaved roadway top surface 17.

Acquisition and Remote Analysis

The apparatus and methods described in this document and the related co-pending applications can quickly accumulate large amounts of data. In particular, the amount of roadway image data created and the memory required to store these data can be significant. Accordingly, the present invention also provides apparatus, systems, and methods suitable for not only acquiring the data but also managing the data in an effective and efficient way, for example, by filtering and compressing the image data and utilizing a remote location for analyzing the data.

Co-pending application Ser. No. 13/351,829 describes an apparatus which automatically determines the GPS coordinates of pre-existing marks on roadway surfaces using machine vision and subsequently generates a best-fit continuous curve for defining the mark path. Then, after the roadway has been repaved and using the continuous mark path function, the apparatus re-creates the pre-existing roadway marks onto the resurfaced roadway.

Co-pending application Ser. No. 13/728,062 describes a GPS-based machine vision locator and inspection apparatus mounted on a moving vehicle for automatically determining the GPS coordinates of pre-existing marks on roadway surfaces at highway speeds and generates a best-fit continuous geographical location curve for the mark path. The roadway mark path is then used by a roadway marker (commonly referred to as a painting or striping truck) to re-create the previous roadway marks onto the resurfaced roadway. One of the primary advantages of this system is the speed at which these tasks can be accomplished over current practices.

For example, current practices require a significant amount of manual labor to re-create a roadway mark path onto the surface of a newly repaved roadway. This re-created mark path usually consists of manually determining the center of a roadway and then applying small visible marks on the repaved roadway surface along the defined center mark path (this practice is commonly referred to as "laying out" the roadway). These visual marks are then used as a visual guide by a paint truck operator for depositing the desired roadway mark material along the re-created roadway mark path.

Using currently accepted practices, laying out one mile of the roadway mark path may take an hour or more and require two or more workers. Application Ser. No. 13/728,062 teaches an apparatus which significantly decreases both the amount of time required for defining the roadway mark path and the amount of manual labor required to perform this task. As an example, the apparatus described in application Ser. No. 13/728,062 images one mile of roadway and determines the GPS location of the roadway mark path and mark characteristics at speeds far in excess of currently accepted practices. Another advantage is that the hazards associated with manually laying out a roadway mark path are reduced by diminishing the need to expose workers to vehicular traffic. Further, only a single worker seated and protected within the vehicle is required to operate the apparatus.

As an indication of the speed advantage, a vehicle having a speed of 60 miles per hour requires only one minute to travel one mile. A vehicle travelling at a speed of 60 miles per hour and having a single imager capturing images at an image acquisition rate of, for example, 100 frames per second will image the roadway surface at a sampling distance interval of 0.88 feet. The sampling distance is chosen to insure that there is sufficient overlap in acquiring roadway mark segments to faithfully capture the entire roadway mark and mark path. The GPS location of each roadway image and of any objects captured within the image, for example, the roadway mark segments parts thereof, is also determined.

To maintain high vehicle speeds and thus decrease the amount of time required to define the roadway mark path, a significant amount of roadway image data is produced. For example, the data rate for acquiring the roadway image data at 100 frames per second, assuming a 640 by 480 pixel imager and an 8 bit intensity quantization for each pixel, requires an image data transfer rate in excess of 30 million bytes per second and does not include other data and software overhead. This data rate doubles for vehicles equipped with two imagers.

The amount of image and other data produced is further compounded as the number of imaging vehicles increases. For example, it may be advantageous to have two or more vehicles imaging all of the roadways in a large geographical area, such as an entire state, to decrease the total amount of time required to image and inspect all of the roadway marks.

Slower vehicle speeds require fewer frames per second to maintain a given sampling distance interval and therefore produce less roadway image data. For example, to image every 0.88 feet at 30 miles per hour requires 50 frames per second and approximately one half of the amount of data is generated over the 100 frames per second rate. A slower vehicle tends to obstruct the normal flow of traffic, however, and can present a roadway hazard to vehicular traffic, especially if the slow moving vehicle is in the passing lane of a multi-lane highway imaging the center roadway mark, for example. It is thus preferable that the vehicle maintain a speed consistent with the flow of highway and interstate traffic, which can exceed 60 miles per hour. Therefore, the amount of roadway image data created and the memory required to store these data for later image analysis from one or more imagers per vehicle, and further compounded for multiple imaging vehicles, can be significant at highway speeds.

The amount of roadway image data created and the memory required to store these data, however, may be minimized if the image data is first filtered to remove superfluous data and then compressed using lossless image compression algorithms.

One example of image filtering is the technique known as "cropping" an image. Because the entire imaged roadway area contains a large amount of imaged unmarked roadway surface area with respect to the imaged roadway mark area, eliminating a substantial portion of the imaged unmarked roadway surface area reduces the amount of image data which needs to be stored in memory. The imaged roadway area is cropped (e.g., filtered) to include only the imaged roadway mark, and the remaining imaged unmarked roadway area (superfluous image data) surrounding the roadway mark image eliminated. In other words, most of the unmarked roadway area is removed from the image except for a small portion surrounding the roadway mark (e.g., to provide for contrast from the roadway mark or to ensure the entire roadway mark is captured in the image).

Another example of an image filtering process which may prove useful in some applications compares the current imaged roadway area pixel intensity value to a predetermined value, commonly referred to as "image thresholding." If the pixel intensity value exceeds or equals the threshold intensity value, it is assigned a value of 255 (pure white), and if the pixel intensity value is below the threshold intensity value, it is assigned a value of 0 (pure black). Restricting the pixel intensity value to only 0 (with an assigned binary digit "0") and 255 (with an assigned binary digit "1") and eliminating the other remaining (in-between) intensity values further simplifies the image data.

Image thresholding proves an effective imaging filtering process especially for roadway area images by using the already built-in reflection difference between the imaged roadway mark area and the imaged unmarked roadway area. For example, the imaged roadway mark range of pixel intensity values may be between 240-255 (i.e., the roadway mark material is purposely made reflective), and the imaged roadway unmarked area range may be between 10-100 (i.e., the roadway unmarked area surrounding the mark is purposely made non-reflective). Thus, having a pixel intensity threshold value between the lowest reflective value (240) of the roadway mark image area and the highest non-reflective value (100) of the surrounding roadway unmarked area easily separates the imaged roadway mark area from the imaged roadway unmarked area.

The amount of roadway mark image data and the memory required to store may be further reduced by using lossless image compression algorithms or techniques, such as the two stage conventional portable network graphics (PNG) compression process. PNG is a conventional lossless image compression process which preserves the exact pixel intensity valves of the roadway mark image without loss of image fidelity. Also, image thresholding along with run-length encoding (RLE) compression algorithms can further reduce the amount of image data, although the exact pixel intensity values are now set to one of the two binary digit values (0 or 1).

Thus, a two-step process of image filtering followed by image lossless compression greatly reduces the amount of roadway image data and therefore the amount of memory required to store these data without the loss of image fidelity.

Also, another advantage of minimizing the amount of image data without losing the roadway mark image fidelity is that it now becomes feasible to quickly and efficiently upload roadway mark image data from one or more moving imaging vehicles to a remotely located repository and processing facility using conventional communication channels, such as the internet or wireless (RF) modem technology.

The remote repository and processing facility subsequently stores all roadway mark image data from multiple vehicles and performs the required machine vision image processing computations using high performance computing resources. Extensive memory storage on each vehicle could be minimized. Also, having a centralized processing facility eliminates the need to have high performance computing resources in each imaging vehicle.

In addition, image data from multiple vehicles imaging opposite ends of a long roadway (such as an interstate highway) can be easily combined by having all roadway image data located within a central location. Thus, a continuous best-fit roadway mark function for the entire length of the roadway mark can be computed from data uploaded and subsequently processed and combined from multiple imaging vehicles. The central location can also archive all data including roadway mark images and generated best-fit roadway mark paths for future access.

The roadway mark image data and the subsequent machine vision image processing analyses can then be remotely accessed (i.e., downloaded) by other users and for other applications from the remote repository and processing facility. For example, a roadway marker striping truck can access and download the continuous best-fit roadway mark path function computed at the remote facility from previously uploaded roadway mark image data and use this path function to re-create the original roadway mark onto a repaved roadway. Also, other construction equipment such as pavers and snow plows can access and use the roadway mark path function for their respective functions.

It is therefore more efficient for all image data acquired from multiple vehicles to be uploaded to the central facility and the desired machine vision image processing analyses completed at this single facility instead of at the individual vehicles.

In addition, encrypting the filtered and compressed roadway image data before the uploading process also prevents unauthorized access and provides enhanced security during the transmission process to the remote repository and processing facility.

According to one embodiment, the present invention provides a system for determining characteristics of a roadway mark at a remote location including a vehicle having at least one imager for producing image data containing at least one actual roadway mark evident on a roadway surface; a GPS antenna mounted on the vehicle; a GPS receiver responsive to the GPS antenna for determining a GPS location of the GPS antenna; an apparatus responsive to the imager and the GPS receiver for determining a GPS location of the roadway mark and filtering and compressing the image data, the filtered and compressed image data containing the image data of the roadway mark; and an apparatus for communicating the filtered and compressed image data to the remote location for analyzing the roadway mark characteristics from the image data.

Referring with reference to the drawing and as described in detail above, FIG. 6 illustrates the moving vehicle 1 at a first position travelling along the x-axis defined by Cartesian coordinate system 16 and within demarcated traffic lane 11a of the roadway 2. Referring additionally to FIG. 7, the vehicle 1 is shown at the first position shown in FIG. 6 and has fixed GPS antenna 510 supported above the roof 19 of the vehicle 1 by support 40. Imager 50 is mounted on the left side 12 of the vehicle 1 and is adjustably positioned to image area 55 of the roadway surface 17 to the left of the direction of travel of vehicle 1 which includes section 30a of center mark 30. A second side mounted imager 60 is adjustably positioned on the right side of the vehicle 1 to image an area 65 of the roadway 17 which includes section 25a of edge mark 25. In both FIGS. 6 and 7, the position of the vehicle 1 is such that the entire roadway segment 30a is imaged by the imager 50 and the entire roadway segment 25a is imaged by the imager 60. The imagers 50 and 60 may be aligned and affixed to their respective positions on the vehicle 1 using the adjustable imager mounts as described in this document.

Figure 20:
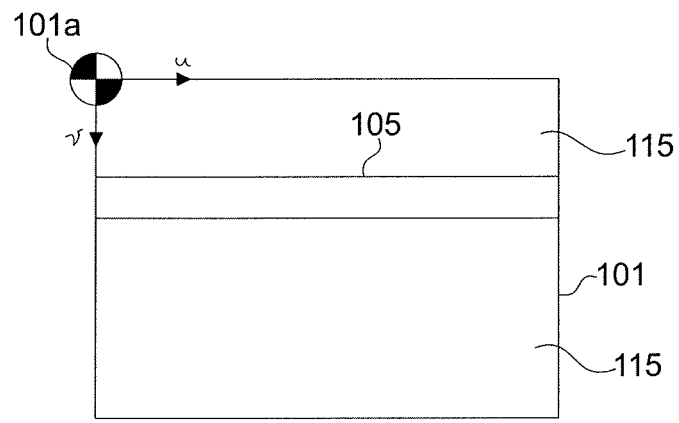
FIG. 20 is an example of a left or right side image of the first position roadway area having a continuous roadway mark element.

Referring now additionally to FIG. 20, captured image 101 of the imager 50 is shown having the vehicle 1 in its first position (as indicated in FIGS. 6 and 7) and includes a captured image 105 of the roadway segment 30a extending longitudinally across the entire captured imaged area 101. An image Cartesian coordinate system 101a with u-v perpendicular axes and having its origin in the upper left hand corner is also defined for each captured image 101. For aligned imagers 50 and 60, their respective image u axes will be substantially parallel to the roadway coordinate axis x.

The captured image 105 of the roadway segment 30a is continuous in the u axis direction. The entire captured image 100 also includes substantial amounts of imaged unmarked roadway surface 115 corresponding to the unmarked roadway surface contained within area 55. A similar image is captured by imager 60 having an image of roadway mark segment 25a along with substantial amounts of imaged unmarked roadway surface surrounding mark segment 25a.

Figure 21:
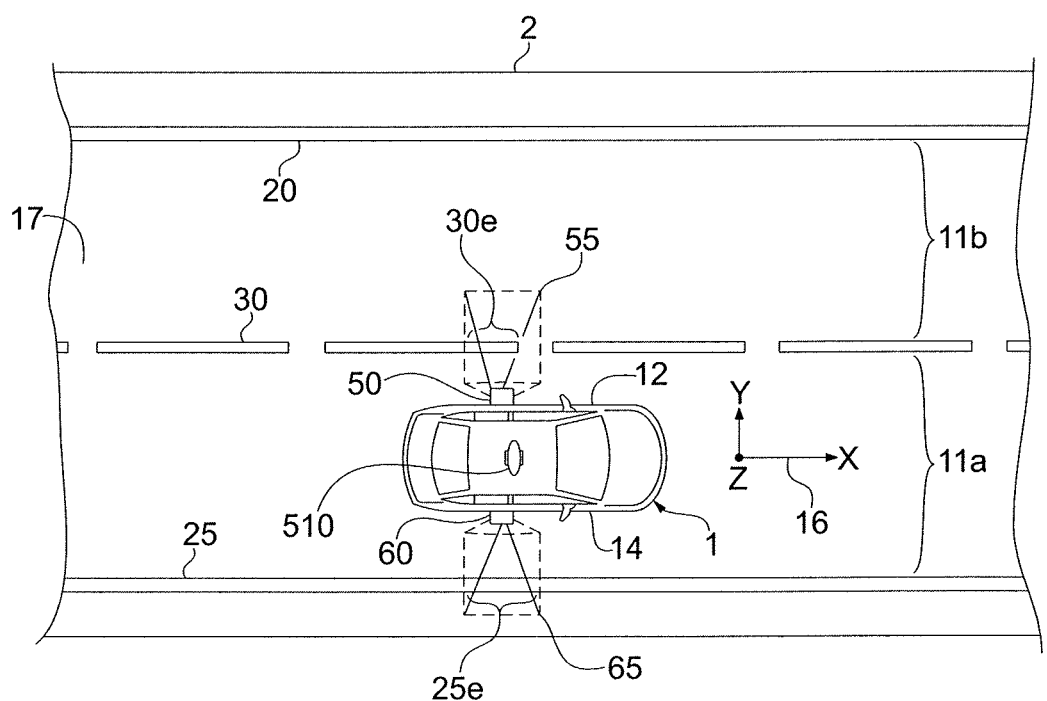
FIG. 21 is a top view of the vehicle shown in FIG. 6 but at a second position longitudinally displaced from the first position in the direction of vehicle travel.
Figure 22:
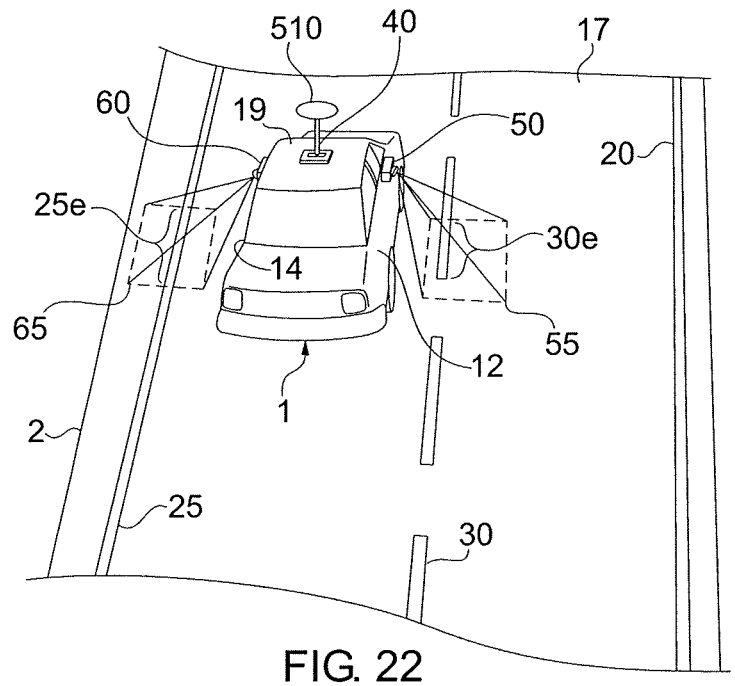
FIG. 22 is a perspective front view of the vehicle of FIG. 21 illustrating the placement of the GPS antenna and side mounted imagers.

FIGS. 21 and 22 illustrate the same moving vehicle 1 as shown in FIGS. 6 and 7, respectively, but now at a second position longitudinally displaced from the first position in the positive x-direction of coordinate system 16. The imager 50 still images the same roadway area 55 but, because the vehicle 1 has moved, a new segment 30e of the roadway mark 30 is now imaged. The imager 60 similarly images roadway area 65 which now includes a new segment 25e of the roadway mark 25.

Figure 23:
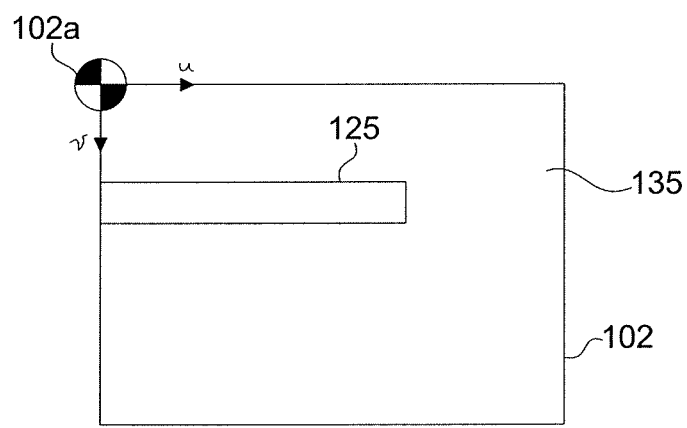
FIG. 23 is a left or right side image of the second position roadway area illustrating the image of a discontinuous roadway mark element.

Referring additionally to FIG. 23, the captured image 102 of the imager 50 with vehicle 1 in the second position (as indicated in FIGS. 21 and 22) is shown and includes an image 125 of the roadway segment 30e. The imaged roadway segment 125 in this case does not extend longitudinally across the entire image area as does image 105 of FIG. 20 (this, of course, depends on the position of the vehicle 1 with respect to the imaged roadway segment 125). The captured image 102 also includes substantial amounts of imaged unmarked roadway surface 135 corresponding to the unmarked roadway surface imaged in area 55. As for all images, an image referenced Cartesian coordinate system 102a is defined and is shown positioned having its origin in the upper left hand corner of image 102.

Figure 24A:
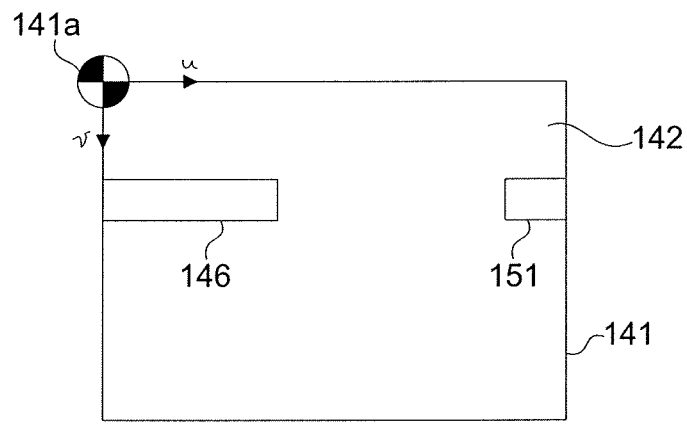
FIG. 24a is a left or right side image of another roadway area showing the end of one roadway mark segment and the beginning of the next roadway mark segment.

Referring now to FIG. 24a, image 141 shows images 146 and 151 of two roadway segments occurring if roadway area 55 (or 65) includes the respective roadway mark elements and unmarked roadway 142. In other words, as captured in image 141, a gap of unmarked roadway 142 occurs between the two roadway segments 146 and 151. A substantial amount of unmarked roadway 142 also exists around the roadway segments 146 and 151. As for all images, an image referenced Cartesian coordinate system 141a is shown.

Figure 24B:
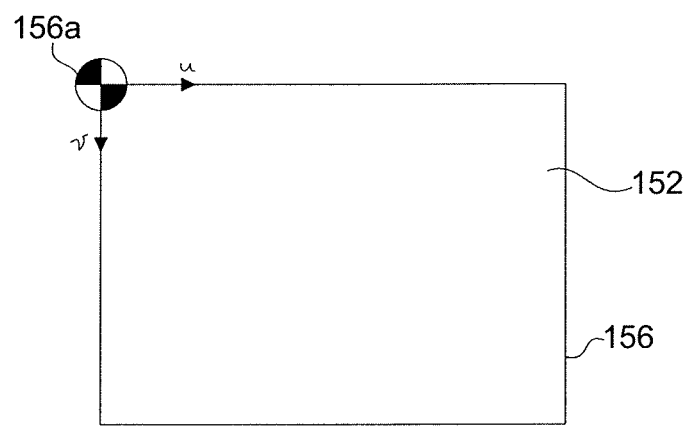
FIG. 24b is an image of another roadway area having no roadway mark segments.

Referring to FIG. 24b, image 156 shows an image of unmarked roadway 152 of roadway mark area 55 (or 65) without any roadway mark elements. In other words, as captured in image 156, no roadway marks are captured. Thus, the entire image 156 is of unmarked roadway 152. As for all images, an image referenced Cartesian coordinate system 156a is shown.

For all of the above images having imaged roadway mark segments, large amounts of unmarked roadway surface areas 115, 135, 142, and 152 exist in the respective images of the surface areas 55 and 65 as the vehicle 1 longitudinally moves along and within lane 11a. Also, there may be areas imaged by imagers 50 and/or 60 which contain no roadway mark elements (e.g., unmarked roadway 152). One reason for providing a large amount of unmarked roadway surface area is to allow for some latitude for the imaging. In particular, the vehicle 1 may be operated at high speeds and the roadway marks may be positioned along curves, hills, and the like. Thus, imaging a larger area ensures that the marks are captured in the images.

Figure 25:
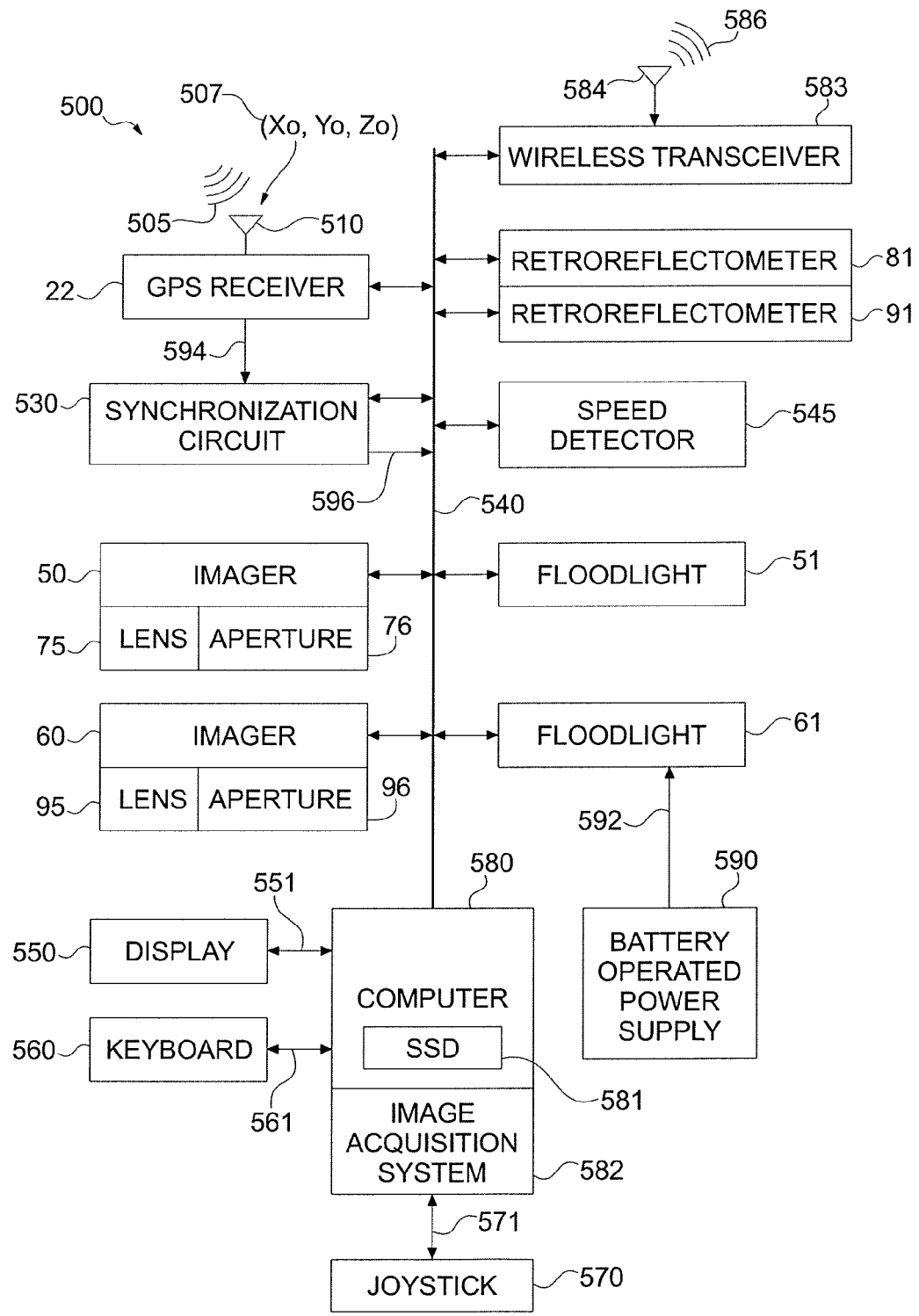
FIG. 25 is a block diagram of the components provided in or affixed to the moving vehicle according to one preferred embodiment of the invention.

Referring now to FIG. 25, a schematic block diagram 500 of one preferred embodiment contained within the vehicle 1 is shown which comprises a number of components and systems. Included are the GPS antenna 510, the GPS receiver 22, the programmable synchronization circuit 530, the imager 50, the lens 75, the aperture 76, the floodlight 51, the imager 60, the lens 95, the aperture 96, the floodlight 61, the bi-directional communication bus 540, the display 550, the keyboard 560, the joystick 570, the computer 580, the vehicle speed detector 545, the retroreflectometers 81 and 91, the wireless transceiver (RF modem) 583, the wireless transceiver antenna 584, and the battery operated power supply 590. The GPS receiver 22, the synchronization circuit 530, the imagers 50 and 60, the lenses 75 and 95, the apertures 76 and 96, the speed detector 545, the floodlights 51 and 61, the retroreflectometers 81 and 91, the wireless transceiver 583, and the computer 580 are electrically interconnected, and in communication with each other, via bi-directional bus 540.

Computer 580 is a conventional computer having an image acquisition system 582 for controlling and triggering the imagers 50 and 60, a real-time clock for calculating accurate time intervals (not shown), a solid state drive (SSD) 581, USB ports, internet connectivity, and wireless communication capability. Solid state drive 581 may be removable from, and/or fixed to, computer 580.

In addition, the keyboard 560 connects to the computer 580 via dedicated bi-directional bus 561 and provides a way for a user of the preferred embodiment to input data into computer 580. Display 550 connects to the computer 580 via dedicated bi-directional bus 551 and provides the user with a visualization of mark images generated by the computer 580 and visually displays other information to the user of the preferred embodiment. Joystick 570 connects to computer 580 via wired connection 571 and is used to control a motorized imager mount.

Display 550, the keyboard 560, and the joystick 570 are conventional computer peripherals. Moreover, a conventional mouse is also connected to the computer 580 via a cable (not shown). Keyboard 560, the display 550, the joystick 570, and the mouse could also communicate to the computer 580 via a wireless connection or a combination of cables and a wireless connection, or connect directly to bus 540 for communicating with computer 580.

GPS antenna 510 receives GPS radio waves 505 which originate from a remote GPS satellite system and/or a GPS-pseudolite array. GPS antenna 510 is conductively connected to the input of the GPS receiver 22. Radio waves 505 could additionally include real time kinematic (RTK) service provider signals (not explicitly shown).

GPS receiver 22 determines the time and the geographical location 507 of the antenna 510 at a periodic rate programmed by the computer 580, or the receiver 22 can be polled by the computer 580 for positional and time information. Positional and time information from the GPS receiver 22 is placed onto bus 540.

Figure 29:
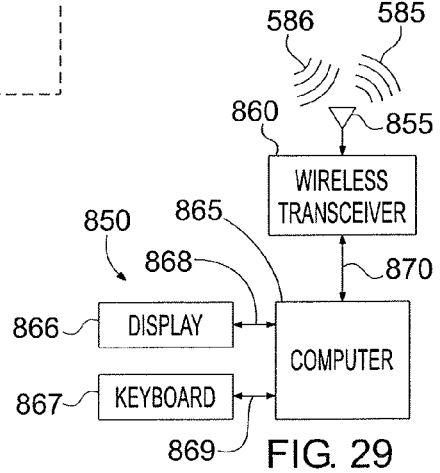
FIG. 29 is a block diagram of components provided at a remote repository and processing facility.

Wireless transceiver 583 connects to the wireless antenna 584 and is able to receive incoming radio waves 585 from, and transmit outgoing radio waves 586 to, one or more remote locations, such as a remote repository and processing facility 850 (shown in FIG. 29). The remote repository and processing facility 850 may be a building or the like, which is located a distance away from the vehicle 1.

Referring additionally to FIG. 12, the GPS receiver 22 also outputs a periodic pulse signal 600 onto line 594 which flows to an input connection of synchronization circuit 530. The time of occurrence of periodic pulse signal 600 is accurately known. For example, the Trimble GPS receiver model number BD982 provides a one pulse per second (1 pps) signal 600 with a corresponding ASCII formatted Universal Time Coordinated (UTC) time tag (i.e., the exact time of pulse occurrence).

Referring additionally to FIG. 13, synchronization circuit 530 comprises a conventional phase lock loop circuit (having phase detector 650, low pass filter 655, and a voltage controlled oscillator 660), and a programmable divider circuit 665 inserted into the phase lock loop feedback path 667.

Programmable divider 665 is programmed to divide the period of signal 600 placed onto line 594 by an integer number represented by a binary digital signal 670 input from bus 540. Signal 670 is placed onto bus 540 by computer 580. The output signal from the voltage controlled oscillator 660 is placed onto line 596 which then flows via bus 540 to the trigger input of image acquisition system 582 contained within computer 580.

For example and referring now additionally to FIG. 14, an eight-bit divider (divide by N counter) 665 programmed with binary digital signal "00000010" (which represents a divider integer value of 2) causes divider 665 to divide the period of signal 600 by 2. This produces periodic signal 610 which is twice the frequency of signal 600. For example, for a one pulse per second signal 600 and a divide by 2 integer value programmed into divider 665 produces a periodic signal 610 having a frequency of 2 pulses per second (period equals 0.5 seconds) which will be output from voltage controlled oscillator 660 and placed onto line 596.

The phase lock loop also maintains excellent frequency tracking to strobe pulse 600. Knowing the time of occurrence of signal 600 and the divider integer defines the exact time when the rising edge 615 of periodic pulse signal 610 occurs. Thus, synchronization circuit 530 can be programmed via computer 580 for producing periodic signals 610 having an equal or higher frequency as, and synchronized with, signal 600.

An example of a phase lock loop is a 74HC4046 integrated circuit. The phase lock loop function can also be implemented in software, or a combination of software and hardware.

In response to the trigger signal 610, the image acquisition system 582 simultaneously triggers the imagers 50 and 60 to capture images of areas 55 and 65, respectively. Captured images of areas 55 and 65 are then subsequently stored in computer data memory 720 (see FIG. 26). Data memory also includes solid state drive memory 581. As discussed below, along with each captured image are an image index number, time, and an interpolated GPS geographical position of each image. It is assumed that the imagers 50 and 60 are triggered on the rising edge 615 of signal 610, although imagers 50 and 60 could also be triggered on the falling edge 620 of signal 610.

Triggering imagers 50 and 60 at a higher frequency than the frequency of signal 600 provides for one or multiple images of the roadway surfaces 55 and 65 for every pulse 600. As an example, having the computer 580 program divider 665 with an equivalent integer value of 2 results in synchronization circuit 530 producing a triggering signal 610 which is twice the frequency of signal 600 as shown in FIG. 14.

Speed detector 545 determines the speed of the vehicle 1 which may be determined by conventional mechanisms, such as an electronic speedometer. The speed of the vehicle 1 may also be determined by the computer 580 from the known distance travelled using GPS coordinates and the time it takes for the vehicle 1 to travel the known distance.

Battery operated power supply 590 provides electrical power to all block diagram 500 components via power bus 592 and is preferably operated from an internal battery (not shown) of the vehicle 1. Power supply 590 may provide both AC and DC power.

Figure 26:
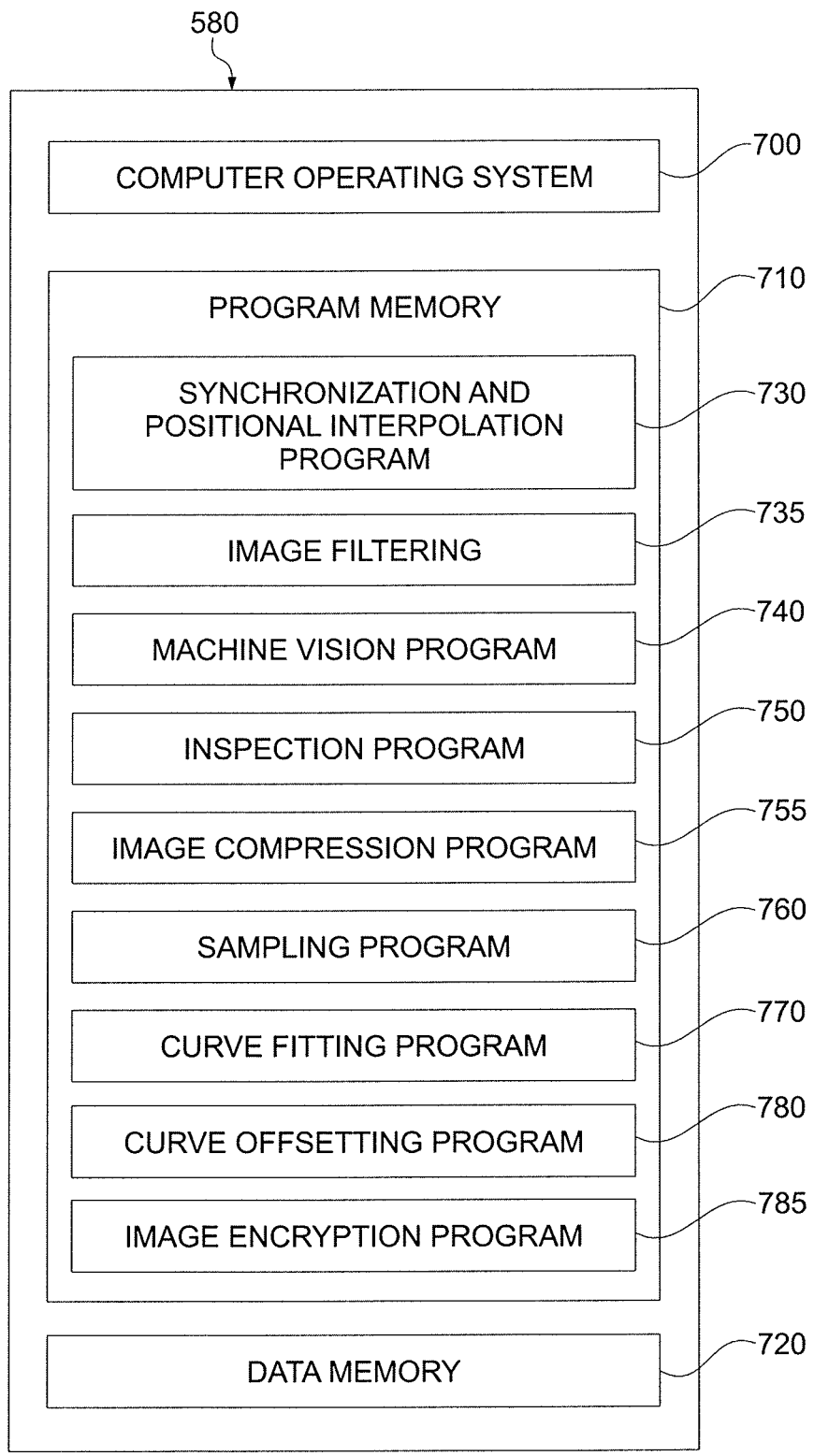
FIG. 26 is a block diagram of the computer memory having program memory software programs including the synchronization and interpolation, image filtering, machine vision, inspection and image compression and encryption programs.

Referring to FIG. 26, the computer 580 further includes computer operating system 700, program memory 710, and data memory 720. Computer operating system 700 may be a conventional operating system (OS) such as Windows 7 manufactured by Microsoft, a Unix-based OS, or an Apple Computer OS system. Data memory 720 is a conventional computer read-write memory. For example, memory 720 can include separately or in combination conventional solid state drive(s) 581, high-speed hard disk drive(s), and/or random access memory (RAM), or other computer memory technologies.

Program memory 710 comprises synchronization and positional interpolation program 730, image filtering program 735, image compression program 755, and image encryption program 785. Program memory 710 also includes machine vision program 740, inspection program 750, sampling program 760, curve fitting program 770, and curve offsetting program 780.

Synchronization and positional interpolation program 730 corrects for time latency in GPS receiver 22 (discussed below and with reference to FIG. 16) and therefore determines the accurate GPS geographical location for each captured image. In addition, program 730 determines the GPS derived time-tag and provides a sequential image index number and interpolated GPS location for each captured image (for example, the GPS location of the image referenced coordinate system 102a shown in FIG. 23). All of these data along with the raw image data are then stored into data memory 720.

Referring now to FIG. 16, pulse 600 along with synchronized periodic signal pulse 610 are shown. The rising edges (first two rising edges 615a and 615b are shown) of periodic pulse 610 (the first two pulses are indicated as 610a and 610b) are used to trigger image acquisition system 582 thereby acquiring images of roadway areas 55 and 65 from imagers 50 and 60, respectively. At instant time t1 receiver 22 acquires GPS geographical positional and GPS time data. These data are available during time interval Δt1 after the positional and time data acquisition is acquired at instant time t1. Instant time t1 could occur at the rising edge 602 of pulse 600 and would therefore be synchronized to pulse 600, or it could be delayed by time interval tx from the rising edge 602 of pulse 600. The time interval Δt1 is defined as the time latency which occurs because the GPS receiver needs calculation time to compute the GPS time and GPS geographical location values from satellite signals 505, or for other reasons.

Likewise, at instant time t2 receiver 22 acquires GPS geographical positional and GPS time data. The time interval Δt2 is defined as the time latency associated with instant time t2. These data are available during time interval Δt2 after the positional and time data are acquired at instant time t2. Instant time t2 could occur at a preset time interval after t1, or instant time t2 and t1 could occur periodically. In either case, there is a possibility that image trigger signals 610*a* and 610*b* are not synchronized with instant time t1 or instant time t2, and therefore the exact GPS geographical position of the image is not known within a high degree of positional accuracy.

Accurate GPS coordinates for the images of areas 55 and 65 from the imagers 50 and 60 respectively are determined at time 615*b* by first determining the time interval (t2−t1) and the GPS geographical positional difference (or equivalent positional differences in ENU coordinates). Knowing the UTC time-tag of the rising edge 615*b* of pulse 610*b* yields the time interval tz. Knowing tz and the time interval (t2−t1), a simple linear interpolation is used for determining the geographical position of the images which are triggered by rising edge 615*b*.

The GPS location of images triggered by rising edge of 615*b* equals the time interval tz divided by the time interval (t2−t1) times the geographical positional difference corresponding to times t2 and t1, plus the geographical position at t1. This process is repeated for subsequent images.

Figure 27:
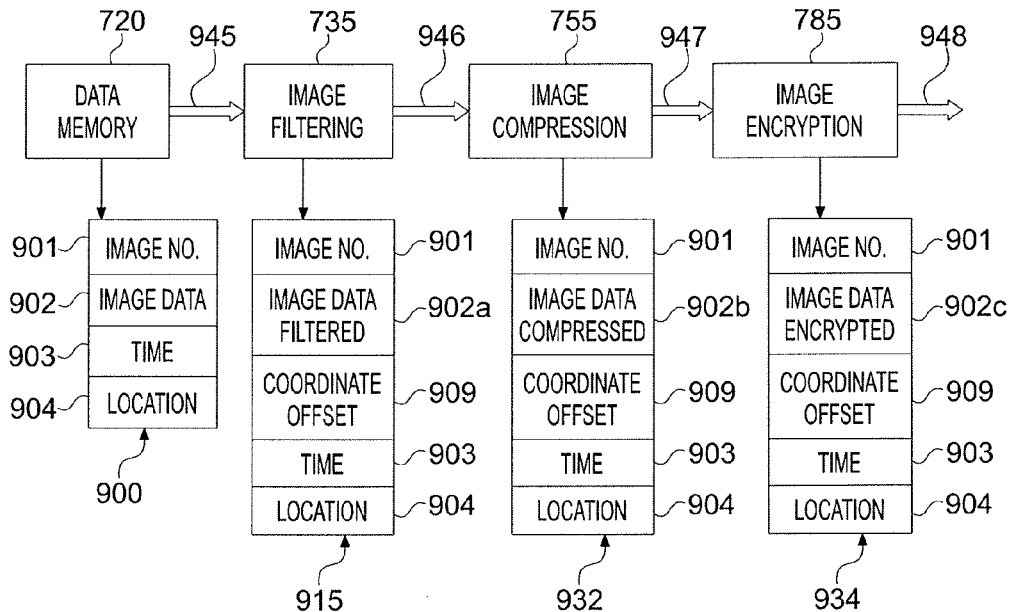
FIG. 27 is a flowchart schematic showing the image filtering, image compression, and image encryption programs along with their respective data blocks.

Referring additionally to FIG. 27, each triggered image from the imagers 50 and 60 has data block 900 which includes associated image index number 901 sequentially identifying the captured images, the actual captured images 902 of the roadway area in conventional bit mapped format (which may or may not include a roadway mark), GPS derived time-tag 903 (i.e., the time the images were acquired), and an associated GPS geographical location 904 of the image, all of which are stored in the data memory 720 by the program 730. Data from the retroreflectometers 81 and 91 are also input by the computer 580 via data bus 540 with each image and are appended to data block 900 (not shown). Data block 900 is then passed to image filtering program 735 as indicated by arrow 945.

Image filtering program 735 filters each image by removing those parts of the image which contain large amounts of images of the unmarked roadway surface areas by cropping the image. Cropping maintains the desired roadway mark segment image and a small portion of the unmarked roadway surface surrounding the roadway mark segment image but eliminates the large amounts of the surrounding imaged unmarked roadway surface.

Figure 28:
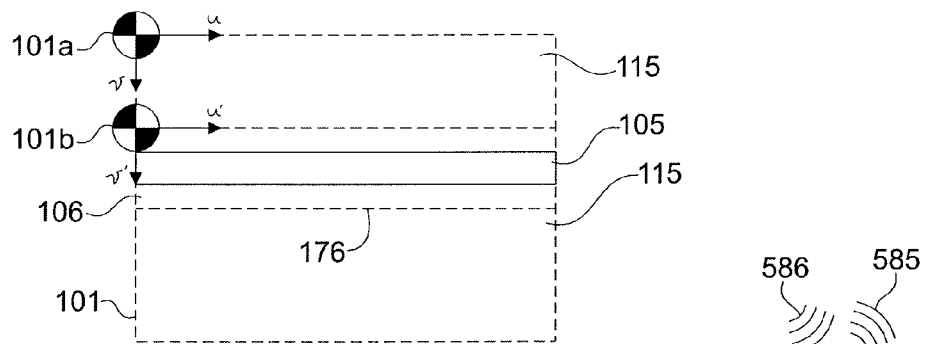
FIG. 28 is a view of a cropped roadway image overlaid upon the original roadway image.

Referring to FIG. 28, a cropped image 176, depicted as a dotted line surrounding the roadway mark image 105, is shown overlaid onto the original image 101 (FIG. 20). The cropped image 176 is a rectangular shaped window area which extends across the entire image 101 and contains the original roadway mark segment image 105 of the roadway mark element 33*a* and a small portion of the image area 106 surrounding image 105, but does not include those images of unmarked roadway surface 115. The small portion of the image area 106 surrounding image 105 provides enough of the unmarked roadway image so that a grayscale pixel intensity value comparison between the roadway mark image 105 and the surrounding roadway unmarked surface 115 can be determined. In addition, a coordinate offset is determined which defines the location of the coordinate system 101*b* (u'-v' axes) of the cropped image 176 with respect to the original coordinate system 101*a* (u-v axes) of the original image 101. This is stored as the cropped image coordinate offset 909. The cropped image coordinate offset 909 allows repositioning of the cropped image 176 within the original image 101. For double roadway mark element images, the cropping rectangle would be expanded in the v direction to include both roadway mark elements.

Cropping the roadway area image reduces the amount of memory necessary to store image 105 of the roadway mark element 33*a* over the original unfiltered image data 902, and also minimizes the amount of roadway image mark data which must be analyzed increasing the speed of subsequent image analysis algorithms. Other image filtering algorithms may be further applied to the cropped roadway mark element image 176 and include conventional image processing segmentation algorithms such as global or adaptive optimal image thresholding.

This technique works well with roadway mark image 105 being substantially contrasted against the surrounding roadway surface image 106, thereby producing a gray-level bimodal distribution of image pixel intensity values. Pixel intensity values below the threshold value are set to 0 (black) and assigned a binary digit of "0," and pixel intensity values equal to or above the threshold value are set to 255 (white) and assigned a binary digit of "1." For example, a white roadway mark element 105 would have all of its imaged pixels set to 255 and the surrounding macadam roadway surface 106 would have all of its imaged pixels set to 0. The threshold value is optimally chosen by conventional methods and could include, for example, taking the average between the lowest reflective value of the roadway mark image area and the highest non-reflective value of the surrounding roadway unmarked area for each image.

For low image contrast instances between the roadway mark element 105 and surrounding roadway surface 106, the floodlights 51 and 61 are turned on by computer 580 to illuminate the image roadway area above that provided by ambient light which further enhances the grayscale contrast between the images 105 and 106. Externally controlling the illumination of the roadway areas 55 and 65 with the floodlights 51 and 61, respectively, provides a constant illumination standard for comparing the grayscale values of the roadway mark element image 105 with respect to the surrounding roadway surface image 106.

Threshold filtering the cropped roadway image 176 loses the variation in grayscale values for both the roadway mark element image 105 and the surrounding roadway surface image 106, but can further reduce the amount of roadway image data.

For those images absent any roadway mark elements such as shown in FIG. 24*b*, a null indicator is appended to the image number 901. For example, if the image shown in FIG. 24*b* has an image number "536" and has no discernible roadway mark element image, the image number would then be changed to "536x" after being processed by image filtering program 735, the "x" indicating that no roadway mark element is detected in the image. The input data block 900 is modified by image filtering program 735 by having the image data 902 filtered and becoming filtered image data 902*a* and further expanded to include coordinate offset 909 now defined as data block 915. The filtered image is then passed onto the image compression program 755, as indicated by arrow 946, and may also be stored in data memory 720.

Image compression program 755 inputs data block 915 and compresses the filtered image data 902*a* using lossless image compression algorithms. Typical lossless compression formats include the Portable Network Graphics format (commonly having the file extension .png). Image compression techniques can also be applied to a threshold filtered image. Lossless compression allows the exact duplication of the pixel intensity values of the original imaged roadway mark section 105 and the surrounding imaged roadway surface area 106 without any generation loss, i.e., without the progressive degradation of image quality after repeated compression and decompression cycles which may be experienced using "lossy compression algorithms," such as the Joint Photographic Experts Group (JPEG) (commonly having the file extension .jpg) compression algorithm.

The image compression program 755 outputs data block 932 having image number 901, image compressed (and filtered) data 902b, coordinate offset 909, time of image acquisition 903, and GPS image location 904. Data block 932 is passed to image encryption program 785 as indicated by arrow 947, and may be further stored in data memory 720. Image encryption program 785 inputs data block 932 and encrypts the compressed image data into image encrypted data 902c. Image encryption program 785 may use private-key or public-key encryption. One reason for encrypting the image compressed data 902b is to prevent unauthorized data access by a third party.

Image encryption program 785 then outputs data block 934 via arrow 948 to wireless transceiver 583 where data block 934 is then transmitted via the antenna 584 to a remote location, such as a remote repository and processing facility 850, via radio waves 586, and data block 934 may be further stored in the data memory 720. It is understood that the data block 934 can be transmitted during the time of image acquisition, or can be transmitted at a later time. Also, if encryption is not required, then the data block 932 can be sent to the wireless transceiver 583 where it is then transmitted via antenna 584.

Referring now to FIG. 29, a schematic block diagram of a remote repository and processing facility 850 of a preferred embodiment is shown which comprises a number of components and systems. The components and systems include wireless transceiver antenna 855, wireless transceiver (RF modem) 860, bi-directional communication bus 870, computer 865, display 866, and keyboard 867. The remote repository and processing facility 850 could be at a fixed location or could be located on a moving vehicle. In either case, it is assumed that electrical power is supplied to all elements of facility 850.

Wireless transceiver 860 and computer 865 are in bi-directional communication with each other via bus 870. In addition, the keyboard 867 connects to computer 865 via dedicated bi-directional bus 869 and provides a way for a user of the preferred embodiment to input data into computer 865. Display 866 connects to computer 865 via dedicated bi-directional bus 868 and provides the user with a visualization of roadway mark images generated by computer 865 (such as shown in FIG. 33b) and visually displays other data and information to the user of a preferred embodiment.

Display 866 and keyboard 867 are conventional computer peripherals. A conventional mouse is also connected to computer 865 via a cable (not shown). Keyboard 867, display 866, and the mouse could also communicate to computer 865 via a wireless connection or a combination of cables and a wireless connection, or connect directly to bus 870 for communicating with computer 865.

Wireless transceiver 860 connects to wireless antenna 855 and is able to receive incoming radio waves 586 from, and transmit outgoing radio waves 585 to, one or more remote locations, including one or more systems 500 (FIG. 25). Wireless transceiver 860 sends data contained in the radio waves 586 to computer 865 via bus 870. It is anticipated that wireless transceiver 860 will receive incoming radio waves 586 from more than one vehicle 1 and will be able to simultaneously process these incoming radio waves 586 using conventional communication techniques. Facility 850 has the ability to service any number of imaging vehicles 1 receiving and sending data via antenna 855 using conventional communication techniques.

Figure 30:
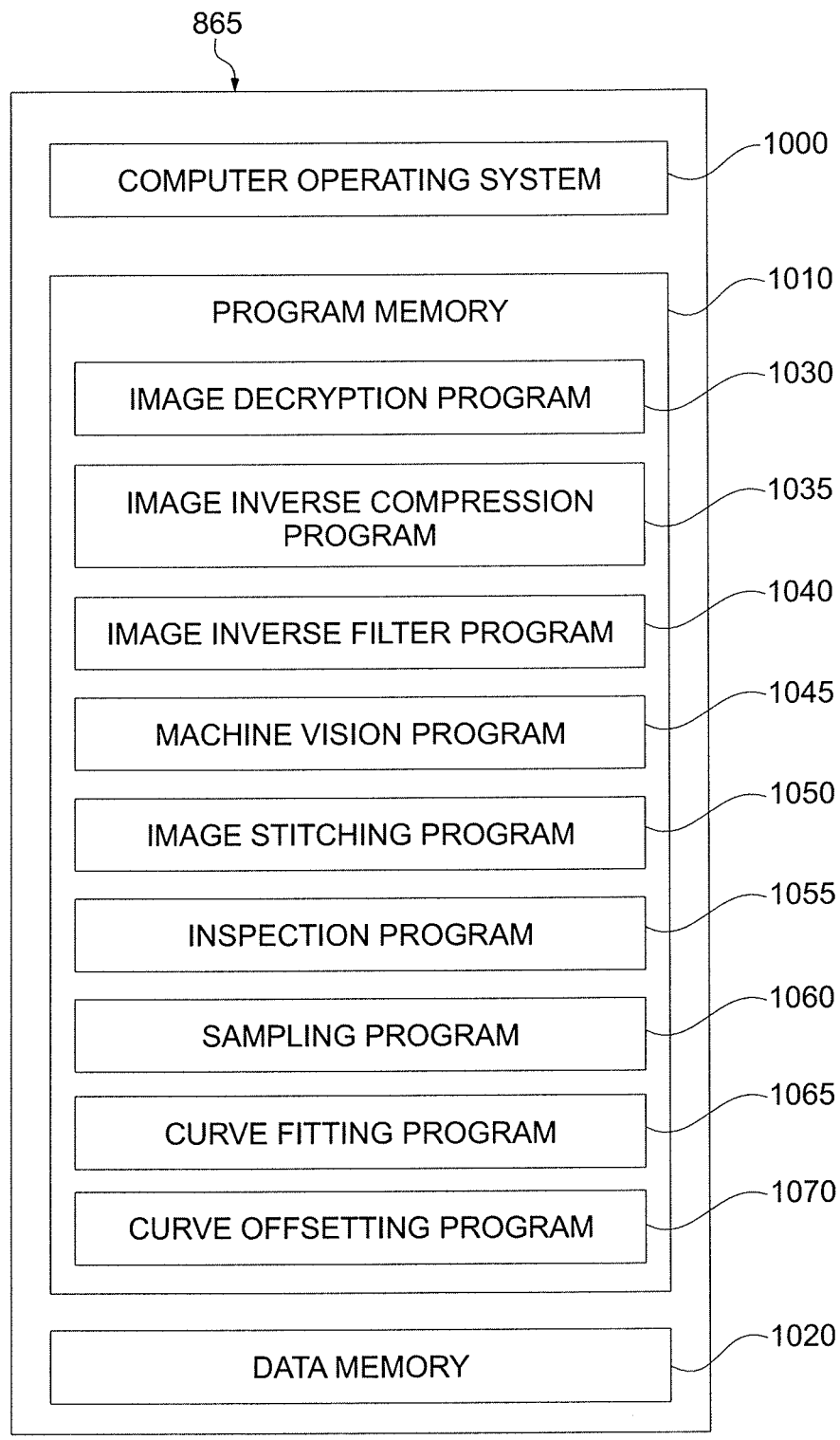
FIG. 30 is a block diagram of the computer memory having program memory software programs including the image decryption program, image inverse compression program, image inverse filter program, image stitching program and inspection program of the remote repository and processing facility.

Referring now to FIG. 30, the computer 865 further includes a computer operating system 1000, a program memory 1010, and a data memory 1020. Computer operating system 1000 may be a conventional operating system (OS), such as Windows 7 manufactured by Microsoft, a Unix-based OS, or an Apple Computer OS system. Data memory 1020 is a conventional computer read-write memory. For example, data memory 1020 could include separately or in combination conventional solid state drive(s), high-speed hard disk drive(s), and/or random access memory (RAM) or other computer memory technologies. Program memory 1010 comprises image decryption program 1030, image inverse compression program 1035, image inverse filter program 1040, machine vision program 1045, image stitching program 1050, inspection program 1055, sampling program 1060, curve fitting program 1065, and curve offsetting program 1070.

Figure 31:
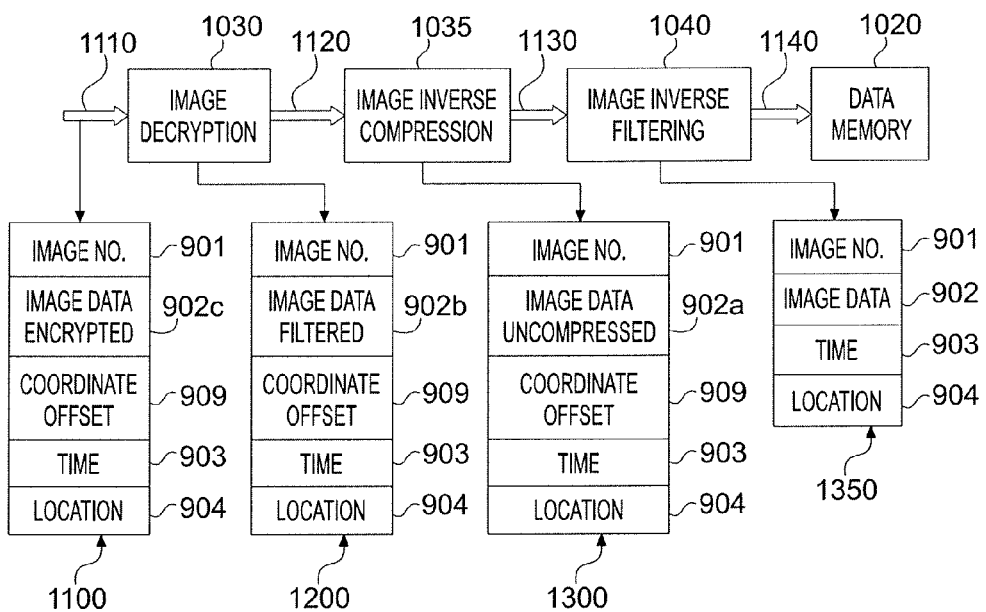
FIG. 31 is a flowchart schematic showing the image decryption, image inverse compression and image inverse filtering programs along with their respective data blocks of the remote repository and processing facility.

Referring additionally to FIG. 31, wireless transceiver 860 passes data block 1100 contained within radio waves 586 (which is either data block 932 unencrypted data or encrypted data block 934) to computer 865 via bus 870 and noted as arrow 1110. Data block 1100 (for encrypted data block 934) includes image number 901, encrypted image data 902c, coordinate offset 909, time 903 at which the image was captured, and the corresponding GPS image location 904 at the time the image was captured, and any retroreflection data.

Data block 1100 is then input to image decryption program 1030 which decrypts the encrypted image data 902c into image decrypted data 902b reversing the encryption of image encryption program 785. Image decryption program 1030 forms data block 1200 which now includes the image number 901, decrypted (but still compressed and filtered) image data 902b, coordinate offset 909, time 903, and GPS image location 904. Data block 1200 is then passed to image inverse compression program 1035 noted by arrow 1120.

Image inverse compression program 1035 inputs data block 1200 and reverses the image compression which was previously applied by program 755, i.e., restores the previously compressed cropped image 902a and forms data block 1300. The uncompressed cropped image 902a is the actual cropped image with or without the cropped image having image thresholding applied.

Data block 1300 now includes image number 901, uncompressed (but still cropped) image data 902a, coordinate offset 909, time 903, and GPS image location 904. Data block 1300 is then passed onto image inverse filtering program 1040 noted by arrow 1130. Data block 1300 is also passed onto machine vision program 1045 (see FIG. 32).

Machine vision program 1045 therefore processes the cropped image and, hence, interacts with a much reduced amount of image data to perform image process calculations such as edge finding, geometric calculations, and other calculations. This diminishes the amount of computational time required. Image inverse filtering program 1040 uses the coordinate offset data 909 to position the cropped image within the entire view of the image of the roadway surface area, although the actual grayscale values of the previously cropped image of the surrounding roadway surface will not be exactly duplicated.

Data block 1350 includes image number 901, image data 902 (although the grayscale values of the surrounding previously cropped roadway surface area are not exactly duplicated), time 903, and GPS image location 904. Data block 1350 is then stored in data memory 1020 noted by arrow 1140.

Figure 32:
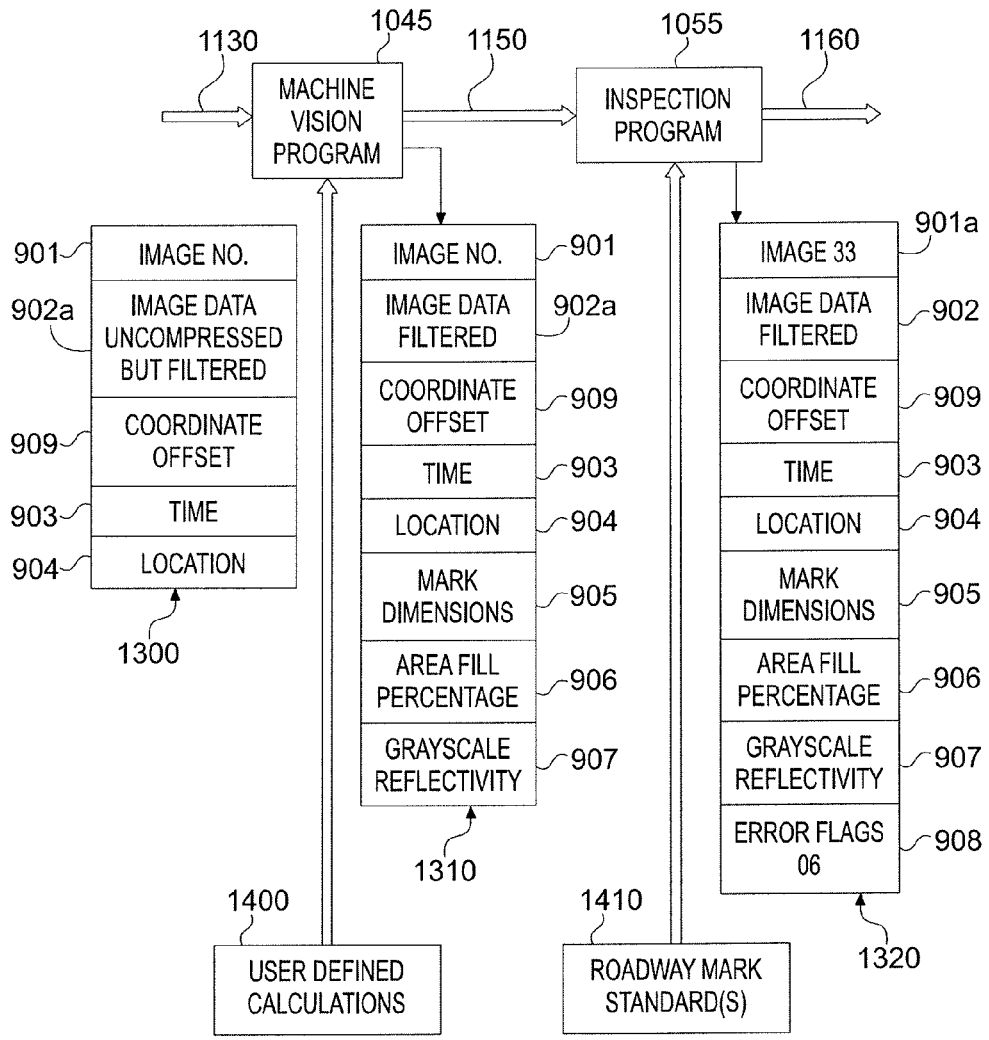
FIG. 32 is a flowchart schematic showing the machine vision program and inspection program along with their respective data blocks of the remote repository processing facility.

Referring now to FIG. 32, the machine vision program 1045 includes a number of machine vision algorithms which are selected by the user defined calculations input 1400 to perform desired calculations on image data 902a. These calculations may include, for example, edge detection, geometric computations, distance computations of imaged objects, and other generic machine vision calculations. The user selects the defined calculations by using the keyboard 867.

For example, the machine vision program 1045 includes algorithms which the user selects by user defined calculations input 1400 to determine the GPS location of the roadway mark edges within the field of the filtered (cropped) image, the actual width and length dimensions of the roadway mark elements, the GPS location of the cropped roadway image referenced coordinate system (for example, coordinate system 101b in FIG. 28) from the GPS roadway mark image location 904 and coordinate offset 909, and other roadway mark characteristics such as the area of the roadway mark.

Moreover, the machine vision program 1045 also includes algorithms which the user may select applying user-defined user calculations input 1400 to determine, using the grayscale values of the filtered (cropped) roadway mark element images and the surrounding roadway unmarked image (for example, roadway mark element image 105 and area 106 shown in FIG. 28), the reflectivity of the roadway mark, the reflectivity of the surrounding roadway surface, and the relative difference between the reflectivity of the roadway mark and the reflectivity of the surrounding roadway surface. For example, an image of section 30a of roadway mark 30 may have a value of 220 (very "white") based upon a grayscale value of 0 to 255 (assuming an 8 bit intensity quantization), while the surrounding roadway surface (such as asphalt-macadam) may have a value of 20 (very "black"), yielding a grayscale contrast difference of 200 between roadway mark section 30a and the surrounding roadway surface. Using the threshold filtered image does not produce grayscale variations (pixel intensity values are either 0 or 255) and would not produce the desired results for this reflectivity calculation.

Machine vision program 1045 further includes algorithms which may also be selected by user-defined calculations input 1400 to determine the area "fill percentage" using the grayscale values of the roadway mark. Machine vision program 1045 still further includes algorithms which may also be selected by user-defined calculations input 1400 to compute the lateral distances (i.e., in the y direction of coordinate system 16) between roadway marks and can determine, for example, the width of lane 11a and/or the lateral spacing between double roadway marks. Machine vision program 1045 may also be programmed by user input 1400 to input retroreflection data from the retroreflectometers 81 and 91 which were previously appended to data block 1300.

Machine vision program 1045 subsequently expands the original data block 1300 to now include the desired user-defined calculations 1400 in addition to the original data contained within block 1300. For example, data block 1300 is expanded to include the roadway mark dimensions 905 (for example, roadway mark width and length), the area fill percentage 906, and the grayscale reflectivity values 907, all of which are now grouped within data block 1310 and subsequently stored in data memory 1020. If retroreflection data are required, data block 1310 is further expanded to include retroreflection data. Other data may be included in data block 1310, such as lane width, etc.

Data block 1310 is then passed to inspection program 1055 as indicated by arrow 1150, and also passed to image stitching program 1050. Inspection program 1055 inputs both data block 1310 and user-defined roadway mark standards data 1410, and further performs a comparison between the data stored in data block 1310 and the roadway mark standards data 1410. Any roadway mark which does not meet the defined roadway mark standards data 1410 is flagged with a code and stored in error flags section 908 of data block 1320.

For example, data block 1320 is shown as the output of inspection program 1055 having the image index number 901a as number "33." Appended to data block 1320 is error flags section 908. Stored within section 908 is the error flag 06 which indicates that the roadway mark derived from image "33" did not meet, for example, the roadway mark width standard. All data which fail the comparison between the data stored in data block 1310 and the roadway mark standards data 1410 are stored in data memory 1020 as indicated by arrow 1160 for later analysis and/or remedial work. Data blocks 1310 and 1320 can also be downloaded to other remote locations or vehicles, such as striping trucks, pavers, or other construction vehicles via wireless transceiver 860 and radio waves 585.

Figure 33A:
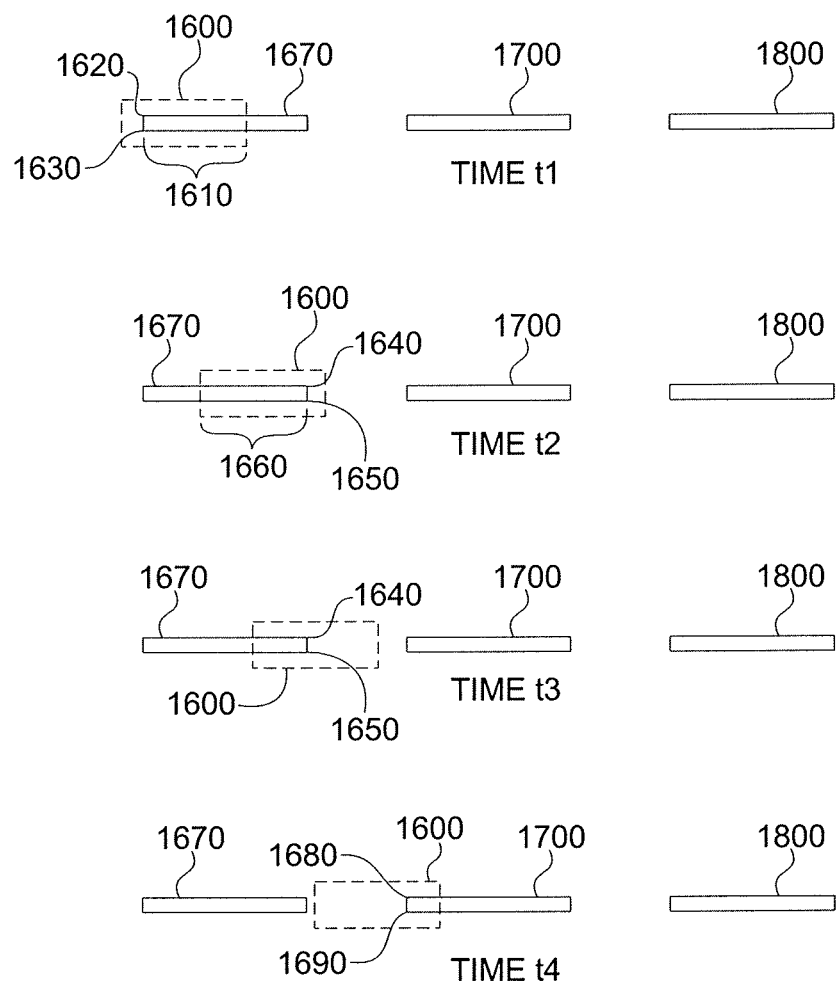
FIG. 33a is a diagram showing a time sequence of cropped roadway images.
Figure 33B:
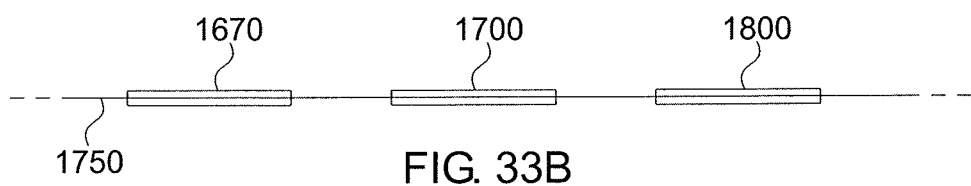
FIG. 33b is a diagram showing the recreated roadway mark and mark path produced from an image stitching program.

Referring now to FIG. 33a, a progressive time sequence of cropped roadway mark images is shown for roadway marks 1670, 1700, and 1800. Specifically, at time t1 the rectangular cropping window image 1600 is shown which includes roadway mark element image 1610. The GPS coordinates of the roadway mark element 1610 endpoints 1620 and 1630 have been previously determined by the machine vision program 1045.

At time t2, the cropping window has now moved (vehicle 1 has moved) and includes roadway mark element 1660. The GPS coordinates of the roadway mark element 1660 endpoints 1640 and 1650 have also been determined by machine vision program 1045. Thus, the beginning and ending location and the width of the roadway mark 1670 are now determined. This process continues for the entire roadway mark path. For example, at time t3 machine vision program 1045 again determines the locations of endpoints 1640 and 1650, and at time t4 the endpoints 1680 and 1690 of the new roadway mark 1700 are determined. This process would be repeated for the next roadway mark 1800.

Referring to FIG. 33b, conventional image stitching program 1050 uses the GPS location of roadway mark element endpoints and forms a continuous replication of the complete imaged roadway mark maintaining the correct distance between roadway marks and the dimensions of the roadway marks. Curve fitting program 1065 inputs discrete GPS coordinate data previously stored in data memory 1020 and determines a first continuous mathematical function which best-fits the discrete GPS coordinate data. For example, curve 1750 represents the continuous function determined by the curve fitting program 1065 for the roadway marks 1670, 1700, and 1800. The curve 1750 defines the complete roadway mark path.

The curve offsetting program 1070 inputs the continuous function determined by the curve fitting program 1065 and generates a second continuous function similar and parallel to the first function but offset from the first function by a given distance. The user inputs this distance into program 1070 via keyboard 560. For example, the first function may represent the roadway mark 30 on roadway 2. A second function defining a roadway edge mark line 25 may be derived from the first function by offsetting the first function by a distance, or the first function may represent a roadway edge mark 20 and the roadway mark 30 may be derived from the first function by offsetting the first function by a distance.

In operation, the operator of vehicle 1 begins to travel on roadway 2 maintaining vehicle 1 within lane 11a defined by roadway demarcation marks, for example, center mark 30 and roadway side mark 25. It is assumed at this point that power supply 590 is turned on and supplying power via bus 592 to the respective components of the system. With power applied via bus 592, all components begin operating. In response to supplied power, GPS receiver 22 begins to input GPS signals 505 from GPS antenna 510 and starts to calculate GPS geographical position 507 and time-tag information. GPS receiver 22 also generates periodic signal 600 which flows onto line 594 to synchronization circuit 530.

At a chosen position for beginning to inspect the left and/or right side roadway marks and/or determine the geographical location of the pre-existing roadway marks, the user depresses a "Start" key on keyboard 560 which communicates this key selection to computer 580 via connection 561. Computer 580 then inputs speed data of the vehicle 1 from speed detector 545 (or alternately uses the differences in vehicle GPS position and time data from the receiver 22 to compute vehicle speed).

In response to the speed of the vehicle 1, the computer 580 programs programmable divider 665 of synchronization circuit 530 via signals 670 placed onto bus 540. In response to a programmed divider 665, synchronization circuit 530 outputs signal 610 onto line 596 which flows via bus 540 to image acquisition system 582 contained within computer 580. In response to signal 610, image acquisition system 582 triggers the imagers 50 and 60 to capture the roadway mark areas 55 and 65, respectively. Programming divider 665 in response to the speed of the vehicle 1 insures that the frequency of the trigger signal 610 is sufficient for triggering the imagers 50 and 60 at a rate to acquire overlapping images so that a continuous and complete image of the roadway mark path is imaged so that there are no missing sections of the roadway mark.

By having the frequency of image triggering signal 610 programmable and dependent upon the speed of vehicle 1 insures that efficient use of data memory 720 occurs when storing image data. For example, the vehicle 1 may be stopped at a traffic light or experience significant variations in vehicle speed as might occur in stop-and-go traffic. Adjusting the frequency of image triggering signal 610 as a function of the speed of the vehicle 1 insures that at lower vehicle speeds fewer roadway images are taken while at higher vehicle speeds many more roadway images are taken while still maintaining sufficient image overlap so that there are no missing sections of the roadway mark and the complete and entire roadway mark (and mark path) has been imaged.

Synchronization and positional interpolation program 730 corrects the positional data of each roadway image for GPS receiver 22 latency to insure the accurate geographical position for each roadway image, sequentially numbers each captured image with an image index number 901, and then stores the index number 901, captured image data 902, time of image acquisition 903, and the GPS location of the roadway image 904 (for example, the GPS location of the origin of coordinate system 101*a* in FIG. 28) as a data block 900 into data memory 720. Image filtering program 735 then crops the image data 902 forming filtered image data 902*a* (for example, cropped image 176 in FIG. 28). Program 735 calculates a coordinate offset 909 and forms data block 915.

In addition or in the alternative, the cropped image 902*a* can be further filtered using image thresholding. If image thresholding is desired, computer 580 turns on the floodlights 51 and 61 illuminating the roadway areas 55 and 65 respectively with a constant and uniform light and, based upon the grayscale values of the imaged roadway mark element and the surrounding strip of imaged roadway surface (for example roadway mark element image 105 and surrounding roadway area 106 in FIG. 28), determines an optimal threshold value if desired, and further processes the cropped image. In either case data block 915 is then passed onto image compression program 755.

Image compression program then compresses the filtered image data and forms compressed image data 902*b*. Data block 932 can be stored into data memory 720 and/or sent to wireless transceiver 583 if encryption is not desired and is further passed to image encryption program 785. Image encryption program 785 encrypts the compressed image data 902*b* and forms encrypted image data 902*c*. At this point, data block 934 can be saved to memory 720 and/or sent to wireless transceiver 583. Upon receiving data block 934, wireless transceiver 583 transmits data block 934 via antenna 584 as radio waves 586 to remote repository and processing facility 850.

Antenna 855 of repository and processing facility 850 thereby receives radio waves 586 and conductively passes this radio frequency signal to wireless transceiver 860. Wireless transceiver 860 then demodulates the radio wave signal 586 and passes data block 934 as data block 1100 to the computer 865 via bus 870 noted by arrow 1110. Upon receiving data block 1100, the image decryption program 1030 decrypts the encrypted image data 902*c* and forms data block 1200. If data block 932 is received, image decryption program is bypassed and data block 932 passed directly to image inverse compression program 1035. Data block 1200 is then passed to image inverse compression program 1035.

Image inverse compression program 1035 inputs data block 1200 and decompresses image data 902*b* into image 902*a* and forms data block 1300. Image 902*a* is either the actual cropped image (including for example roadway mark image 105 and the surrounding imaged unmarked roadway area 106 in FIG. 28) or the threshold filtered cropped image. Data block 1300 is then passed to image inverse filtering program 1040.

Inverse filtering program 1040 then uses coordinate offset 909 and location 904 to form image 902 of the entire image of the roadway area 55 and/or 65 including the original roadway mark 105 and the original area 106 with the other surrounding roadway image area 115 set to a grayscale value of 0 (see FIG. 28) (or modified to account for complete thresholding if applicable, i.e., the roadway element image will have a grayscale value of 255 and the image of the surrounding roadway image will have a grayscale value of 0) and forms data block 1350 which is subsequently stored into data memory 1020. Data block 1350 can then be accessed remotely through wireless transceiver 860 via radio waves 585.

Data block 1300 is further passed to the machine vision program 1045. The machine vision program 1045 then inputs the images stored in data block 1300 format indicted by arrow 1130, performs geometric calculations, and determines the width and length of the roadway mark, grayscale reflectivity, fill percentages, and other roadway mark characteristics as defined by user-defined calculations input 1400.

The original data stored in data block 1300 for each image is now expanded to include mark dimensions 905, area fill percentage 906, and grayscale reflectivity 907 and any other user-defined calculations 1400 forming data block 1310 as shown in FIG. 32. The machine vision program 1045 also determines beginning 1620 and 1630 coordinates and ending 1640 and 1650 coordinates for each roadway mark 1670, and can also from these and subsequent coordinates determine the relative spacing between the actual roadway marks. For example, the coordinates 1640 and 1650 and the coordinates 1680 and 1690 define the corner coordinates for the rectangular-shaped unmarked space between the roadway marks 1670 and 1700.

Inspection program 1055 inputs the data block 1310 as indicated by arrow 1150 in FIG. 32 and also inputs user-defined roadway mark standards 1410. Inspection program 1055 then compares the data contained within the data block 1310 with the corresponding data contained within roadway mark standards 1410. Any roadway mark not meeting the desired standards is flagged and saved to the memory 1020 as indicated by the arrow 1160 as the data block 1320.

Data block 1310 is also passed to the image stitching program 1050. Image stitching program 1050 uses beginning and ending coordinates of each roadway mark (for example, beginning coordinates 1620 and 1630 and ending coordinates 1640 and 1650 for roadway mark 1670) to stitch together an entire contiguous roadway mark along the roadway mark path as defined by the curve fitting program 1065. Curve fitting program 1065 inputs the sampled GPS coordinate data previously stored in the data memory 1020 and determines a first continuous mathematical function which best-fits the discrete GPS coordinate data to define the roadway mark path.

Curve offsetting program 1070 inputs the continuous function determined by the curve fitting program 1065 and generates a second continuous function similar and parallel to the first function but offset from the first function by a given distance. For example, the first function may represent the roadway mark 30 on roadway 2. A second function defining a roadway edge mark line 25 may be derived from the first function by offsetting the first function by a distance, or the first function may represent a roadway edge mark 20 and the roadway mark 30 may be derived from the first function by offsetting the first function by a distance.

The continuous function(s) determined by curve fitting program 1065 and/or curve offsetting program 1070, along with roadway mark characteristics, are then used by a GPS roadway marker to replicate the original roadway mark onto a repaved roadway. In addition, remote users may access data contained within any of the blocks 1300, 1310, 1320 and the outputs from curve fitting program 1065 and curve offsetting program 1070. Thus, the geographical position of roadway marks which do not meet the desired roadway mark standards can be identified and the GPS geographical position known and later used for remedial work by a work crew. The roadway mark GPS geographical position can also be used to remark a repaved roadway.

Although illustrated and described above with reference to certain specific embodiments, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. A system for determining characteristics of a roadway mark or portion thereof at a remote location, comprising:
    a vehicle having at least one GPS-calibrated, downwardly directed imager for automatically producing roadway image data containing at least one actual roadway mark or portion thereof evident on a roadway surface;
    a GPS antenna mounted on the vehicle;
    a GPS receiver responsive to the GPS antenna for determining a GPS location of the GPS antenna;
    an apparatus responsive to the imager and the GPS receiver for filtering the roadway image data and producing GPS-referenced filtered image data; and
    an apparatus responsive to the GPS-referenced filtered image data for compressing the GPS-referenced filtered image data; and
    an apparatus for communicating the GPS-referenced filtered and compressed image data to the remote location for analyzing the roadway mark or portion thereof characteristics from the GPS-referenced filtered and compressed image data.

2. The system according to claim 1, wherein the filtered and compressed image data comprises cropped versions of the roadway image data.

3. The system according to claim 1, wherein the roadway image data comprises a plurality of images of the roadway surface including at least a portion of the roadway mark and unmarked roadway surface, and the images are cropped to include at least a portion of the roadway mark and a portion of the unmarked roadway surface surrounding the roadway mark.

4. The system according to claim 1, wherein the roadway image data comprises at least one pixel intensity value, and the filtered and compressed image data comprises the pixel intensity value as compared to a predetermined value.

5. The system according to claim 1 further comprising a wireless transceiver and a wireless antenna adapted to receive incoming radio waves from, and transmit outgoing radio waves to, the remote location.

6. The system according to claim 1, wherein the remote location is a remote repository and processing facility comprising a wireless transceiver antenna, a wireless transceiver, a bi-directional communication bus, a computer, and a display.

7. The system according to claim 6, wherein the remote repository and processing facility comprises an inverse compression program and an inverse filtering program.

8. The system according to claim 1, wherein the GPS antenna, adapted to receive GPS radio wave signals originating from a GPS satellite system or a GPS-pseudolite array, is connected to the GPS receiver which decodes the GPS signals for determining the GPS location of the GPS antenna.

9. The system according to claim 1 further comprising a speed detector.

10. The system according to claim 1 further comprising a vehicle navigation and control system controlling the direction, speed, and acceleration of the vehicle along a predetermined path.

11. A system for determining characteristics of a roadway mark at a remote location, comprising:
    a vehicle having at least one imager for producing image data containing at least one actual roadway mark evident on a roadway surface, wherein the at least one imager comprises a first imager and a second imager, the first imager mounted on the vehicle and aligned to image the at least one roadway mark substantially parallel to, and to the left of, a direction of travel of the vehicle, and the second imager mounted on the vehicle and aligned to image the at least one roadway mark substantially parallel to, and to the right of, the direction of travel of the vehicle;
    a GPS antenna mounted on the vehicle;
    a GPS receiver responsive to the GPS antenna for determining a GPS location of the GPS antenna;
    an apparatus responsive to the imager and the GPS receiver for determining a UPS location of the roadway mark and filtering and compressing the image data, the filtered and compressed image data containing the image data of the roadway mark; and an apparatus for communicating the filtered and compressed image data to the remote location for analyzing the roadway mark characteristics from the image data.

12. A system for determining characteristics of a roadway mark at a remote location, comprising:
   a vehicle having at least one imager for producing image data containing at least one actual roadway mark evident on a roadway surface;
   a mount for affixing the at least one imager to the vehicle comprising:
      (a) an adjustable mount for positioning the at least one imager to image at least one roadway mark and including at least one fixably adjustable axis of rotation substantially parallel to the roadway surface, and
      (b) at least one magnetic clamp affixed to the adjustable mount for removably affixing the adjustable mount to the vehicle;
   a GPS antenna mounted on the vehicle;
   a GPS receiver responsive to the UPS antenna for determining a GPS location of the GPS antenna;
   an apparatus responsive to the imager and the UPS receiver for determining a GPS location of the roadway mark and filtering and compressing the image data, the filtered and compressed image data containing the image data of the roadway mark; and
   an apparatus for communicating the filtered and compressed image data to the remote location for analyzing the roadway mark characteristics from the image data.

13. A method for determining characteristics of a roadway mark or portion thereof at a remote location, comprising:
   producing roadway image data containing an actual roadway mark or portion thereof evident on a roadway surface automatically from a GPS-calibrated, downwardly directed imager mounted on a moving vehicle;
   producing GPS-referenced filtered image data;
   compressing the GPS-referenced filtered image data; and
   communicating the GPS-referenced filtered and compressed image data to the remote location for analyzing the characteristics of the roadway mark or portion thereof from the GPS-referenced filtered and compressed image data.

14. The method of claim 13, wherein the producing step comprises cropping images of the image data.

15. The method of claim 13, wherein the producing step comprises image thresholding.

16. The method according to claim 13, wherein the compressing step comprises applying lossless image compression algorithms.

17. The method according to claim 13, wherein the compressing step comprises portable network graphics compression.

18. The method according to claim 13 further comprising, at the remote location, reversing the filtered and compressed image data.

19. The method according to claim 13 further comprising encrypting the filtered and compressed image data to form encrypted image data.

20. The method according to claim 19 further comprising, at the remote location, decrypting the encrypted image data, reversing the filtered and compressed image data to restore the filtered image, and reversing the filtered image data.

21. A system for determining characteristics of a roadway mark or portion thereof at a remote location, comprising:
   a vehicle having at least one GPS-calibrated, downwardly directed imager for automatically producing, either directly or indirectly, GPS-referenced image data containing at least one actual roadway mark or portion thereof evident on a roadway surface;
   a GPS antenna mounted on the vehicle;
   a GPS receiver responsive to the GPS antenna for determining a GPS location of the GPS antenna;
   an apparatus responsive to the imager and the GPS receiver for producing GPS-referenced filtered and compressed image data, the GPS-referenced filtered and compressed image data containing the image data of the roadway mark or portion thereof; and
   an apparatus for communicating the GPS-referenced filtered and compressed image data to the remote location for analyzing the roadway mark or portion thereof characteristics from the GPS-referenced filtered and compressed image data.

22. A system for determining characteristics of a roadway mark or portion thereof at a remote location, comprising:
   a vehicle having at least one downwardly directed imager for automatically producing image data containing at least one actual roadway mark or portion thereof evident on a roadway;
   a GPS antenna mounted on the vehicle;
   a GPS receiver responsive to the GPS antenna for determining a GPS location of the GPS antenna;
   an apparatus responsive to the GPS receiver and imager for (a) producing GPS-referenced image data of the at least one roadway mark or portion thereof, and (b) filtering and compressing the GPS-referenced image data of the at least one roadway mark or portion thereof; and
   an apparatus for communicating the filtered and compressed GPS-referenced image data to the remote location for analyzing the roadway mark or portion thereof characteristics from the GPS-referenced filtered and compressed image data.

23. The method according to claim 13, wherein the compressing step comprises lossy image compression algorithms.

24. The system according to claim 1, wherein the roadway mark or portion thereof characteristics comprise the length of the roadway mark or portion thereof.

25. The system according to claim 1, wherein the roadway mark or portion thereof characteristics comprise the width of the roadway mark or portion thereof.

26. The system according to claim 1, wherein the roadway mark or portion thereof characteristics comprise the area fill percentage of the roadway mark or portion thereof.

27. The system according to claim 1, wherein the roadway mark or portion thereof characteristics comprise the grayscale reflectivity of the roadway mark or portion thereof.

28. A system for determining characteristics of a roadway mark or portion thereof at a remote location, comprising:
   a vehicle having at least one imager for producing image data containing at least one actual roadway mark or portion thereof evident on a roadway surface;
   an adjustable mount for affixing the at least one imager to the vehicle and for positioning the at least one imager to image the at least one roadway mark or portion thereof, the mount including at least one fixably adjustable axis of rotation substantially parallel to the roadway surface;
   a GPS antenna mounted on the vehicle;
   a GPS receiver responsive to the GPS antenna for determining a GPS location of the GPS antenna;
   an apparatus responsive to the imager and the GPS receiver for (a) producing GPS-referenced image data of the at least one roadway mark or portion thereof, and (b) filtering and compressing the UPS-referenced image data of the at least one roadway mark or portion thereof; and an apparatus for communicating the GPS-referenced filtered and compressed image data to the remote location for analyzing the roadway mark or portion thereof characteristics from the GPS-referenced filtered and compressed image data.

29. The system according to claim 1, wherein the characteristics of the roadway mark or portion thereof comprise the GPS location of the roadway mark or portion thereof.

30. The method according to claim 13, wherein the characteristics of the roadway mark or portion thereof comprise the GPS location of the roadway mark or portion thereof.

31. The system according to claim 22, wherein the characteristics of the roadway mark or portion thereof comprise the GPS location of the roadway mark or portion thereof.

32. The system according to claim 28, wherein the characteristics of the roadway mark or portion thereof comprise the GPS location of the roadway mark or portion thereof.

* * * * *

UNITED STATES PATENT AND TRADEMARK OFFICE
CERTIFICATE OF CORRECTION

PATENT NO.        : 8,935,057 B2                                    Page 1 of 1
APPLICATION NO.   : 13/741573
DATED             : January 13, 2015
INVENTOR(S)       : Dolinar et al.

It is certified that error appears in the above-identified patent and that said Letters Patent is hereby corrected as shown below:

In the Claims

Claim 11, Column 50, Line 64 should read:
for determining a GPS location of the roadway mark and Claim 12, Column 51, Line 20 should read:
a GPS receiver responsive to the GPS antenna for deter- Claim 12, Column 51, Line 22 should read:
an apparatus responsive to the imager and the GPS receiver Claim 28, Column 52, Line 66 should read:
tering and compressing the GPS-referenced image data Signed and Sealed this
Fourth Day of August, 2015

Michelle K. Lee
*Director of the United States Patent and Trademark Office*